US011980898B2

(12) United States Patent
Mizukami et al.

(10) Patent No.: US 11,980,898 B2
(45) Date of Patent: May 14, 2024

(54) SHOWERHEAD AND BUBBLE GENERATING UNIT

(71) Applicant: Science Co., Ltd., Osaka (JP)

(72) Inventors: Yasuhiro Mizukami, Osaka (JP); Masateru Hirae, Osaka (JP); Takahiro Okumura, Osaka (JP); Hidetake Tanaka, Osaka (JP)

(73) Assignee: SCIENCE CO., LTD., Osaka (JP)

( * ) Notice: Subject to any disclaimer, the term of this patent is extended or adjusted under 35 U.S.C. 154(b) by 641 days.

(21) Appl. No.: 16/981,443

(22) PCT Filed: Sep. 28, 2018

(86) PCT No.: PCT/JP2018/036465
§ 371 (c)(1),
(2) Date: Oct. 14, 2020

(87) PCT Pub. No.: WO2020/017066
PCT Pub. Date: Jan. 23, 2020

(65) Prior Publication Data
US 2021/0162429 A1 Jun. 3, 2021

(30) Foreign Application Priority Data
Jul. 20, 2018 (JP) ................................ 2018-136811

(51) Int. Cl.
*B05B 1/02* (2006.01)
*B05B 1/12* (2006.01)
(Continued)

(52) U.S. Cl.
CPC .................. *B05B 1/12* (2013.01); *B05B 1/02* (2013.01); *B05B 1/185* (2013.01); *B05B 1/34* (2013.01); *B05B 1/3405* (2013.01)

(58) Field of Classification Search
CPC .... B05B 1/12; B05B 1/02; B05B 1/18; B05B 1/185; B05B 1/34; B05B 7/005;
(Continued)

(56) References Cited

U.S. PATENT DOCUMENTS 4,211,368 A * 7/1980 Legros .................. B05B 7/2443 239/315
5,862,985 A * 1/1999 Neibrook .................. B05B 3/04 239/444
(Continued)

FOREIGN PATENT DOCUMENTS

GB 2553110 A 2/2018
JP 1999-267059 A 10/1999
(Continued)

OTHER PUBLICATIONS

European Search Report and Written Opinion filed in Application No. 18 926 446.8, 5 pages.
(Continued)

*Primary Examiner* — Qingzhang Zhou
*Assistant Examiner* — Juan C Barrera
(74) *Attorney, Agent, or Firm* — Vedder Price P.C.

(57) ABSTRACT

A shower head to jet an air bubble-liquid mixture by mixing air bubbles into the liquid includes a shower nozzle, a flow-adjustment piece, and air introduction passages. The shower nozzle includes an air bubble mixing space. The flow-adjustment piece is arranged in the air bubble mixing space. The air introduction passages cause air to flow into the air bubble mixing space therethrough.

1 Claim, 69 Drawing Sheets

(a)

(b)

(51) Int. Cl.
*B05B 1/18* (2006.01)
*B05B 1/34* (2006.01)

(58) Field of Classification Search
CPC ....... B05B 1/22; B05B 1/3086; B05B 1/3405; B05B 15/40; E03C 1/084; E03C 1/08; E03C 1/0404; E03C 1/102; E03C 2001/026; A47K 3/28
USPC ...................................... 239/461, 462, 428.5
See application file for complete search history.

(56) References Cited

U.S. PATENT DOCUMENTS

2015/0014447 A1* 1/2015 Akahira .................... B05B 1/16
239/556
2017/0197223 A1* 7/2017 Otoguro .................. E03C 1/084

FOREIGN PATENT DOCUMENTS

| | | | |
|---|---|---|---|
| JP | 2011-267059 | A | 10/1999 |
| JP | 2002-102100 | A | 4/2002 |
| JP | 2004-181328 | A | 7/2004 |
| JP | 2010-142336 | A | 7/2010 |
| JP | 2010-284619 | A | 12/2010 |
| JP | 2014-079328 | A | 5/2014 |
| JP | 3191351 | U | 5/2014 |
| JP | 2014-204796 | A | 10/2014 |
| JP | 2015-208527 | A | 11/2015 |
| JP | 2016-2196 | A | 1/2016 |
| JP | 2016-129634 | A | 7/2016 |
| JP | 2016-1296634 | A | 7/2016 |
| JP | 2017-63831 | A | 4/2017 |
| JP | 2018-58038 | A | 4/2018 |
| JP | 6315248 | A | 4/2018 |
| KR | 10-2013-0007107 | A | 1/2013 |

OTHER PUBLICATIONS

International Search Report for PCT/JP2018/036465; dated Dec. 25, 2018; 9 pages.
Notice of Reason for Refusal (First Office Action) relative to Application No. 10-2020-7006403 dated Jun. 12, 2020; 12 pages.
Notice of Reasons for Refusal (First Office Action) relative to Application No. 107137154; 13 pages.
International Preliminary Examination Report on Patentability filed in Application No. PCT/JP2018/036465; 2 pages.

* cited by examiner

[FIG. 1]
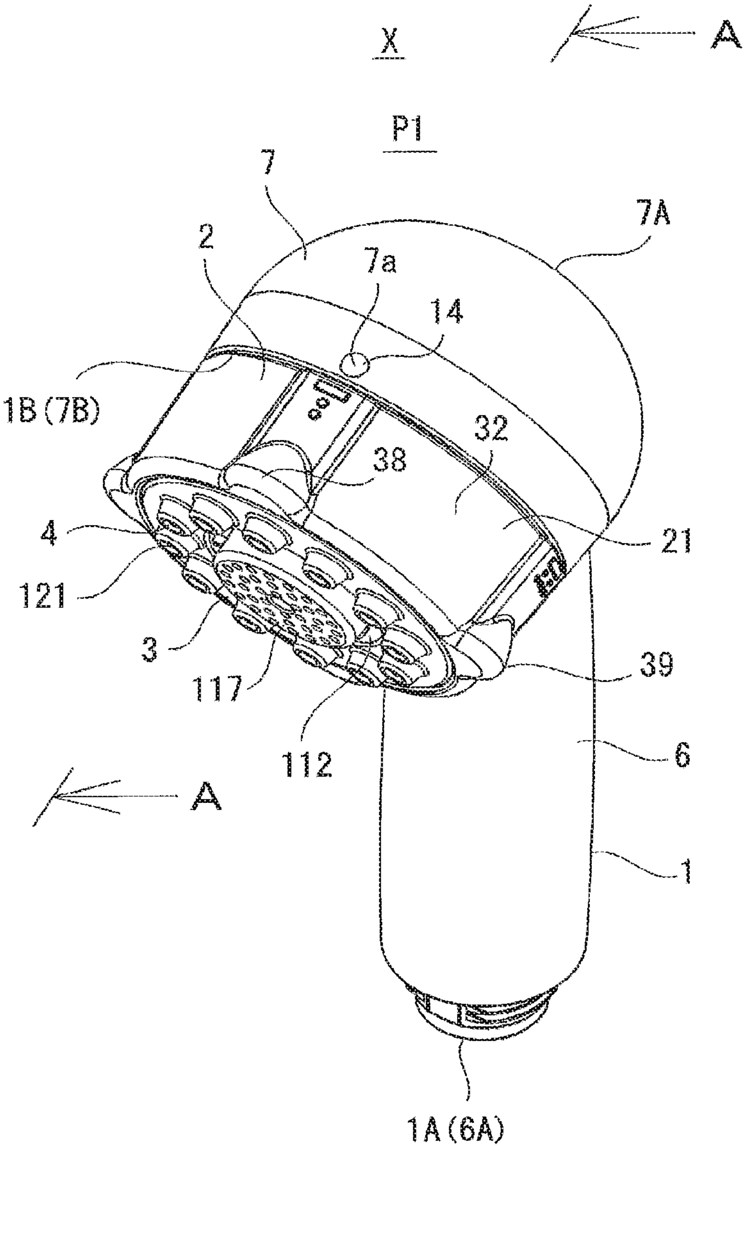

[FIG. 2]
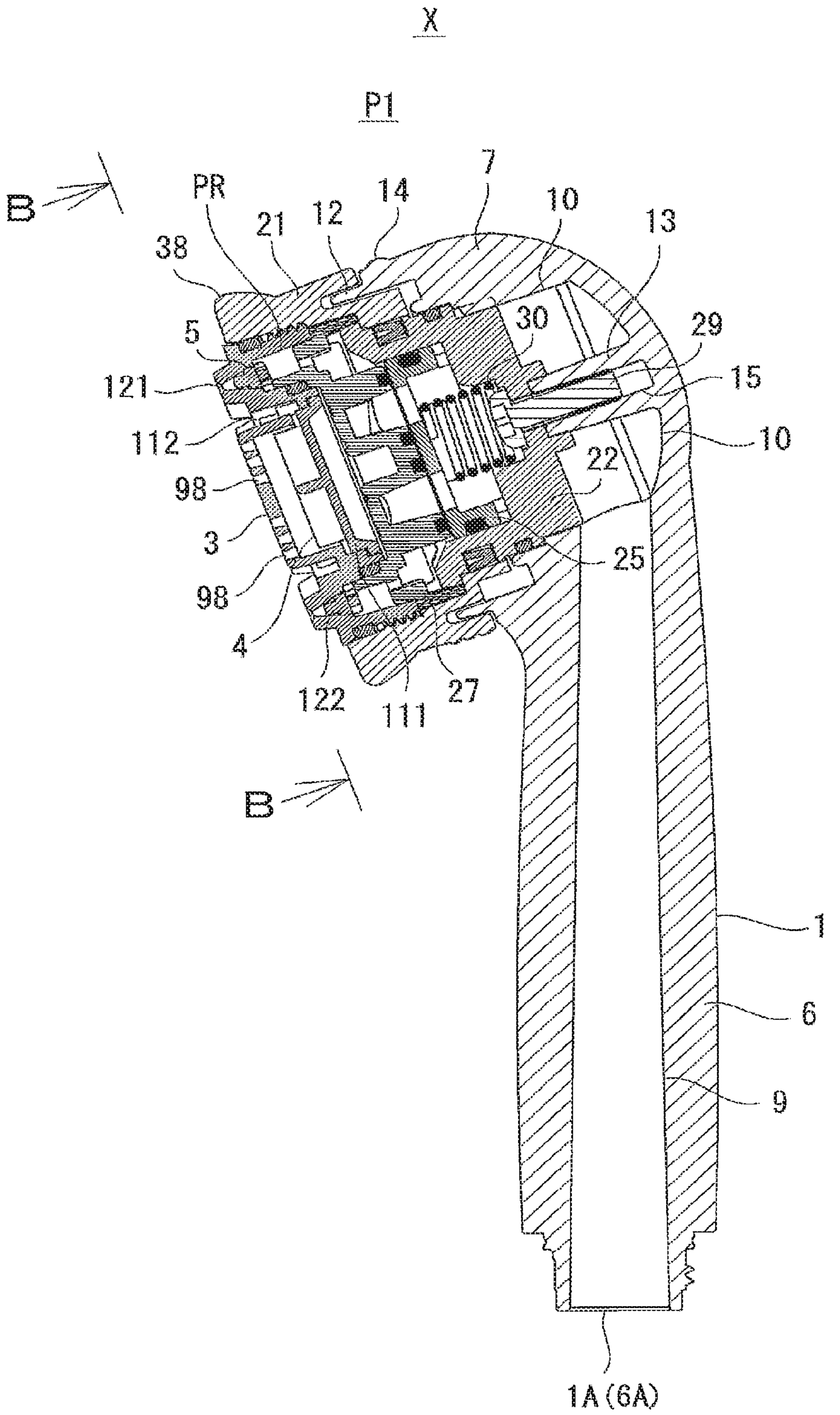

[FIG. 3]
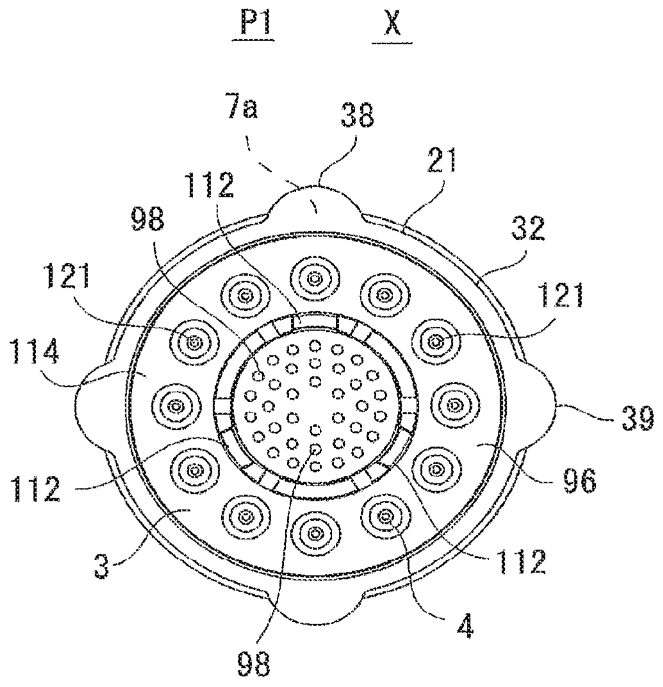

[FIG. 4]
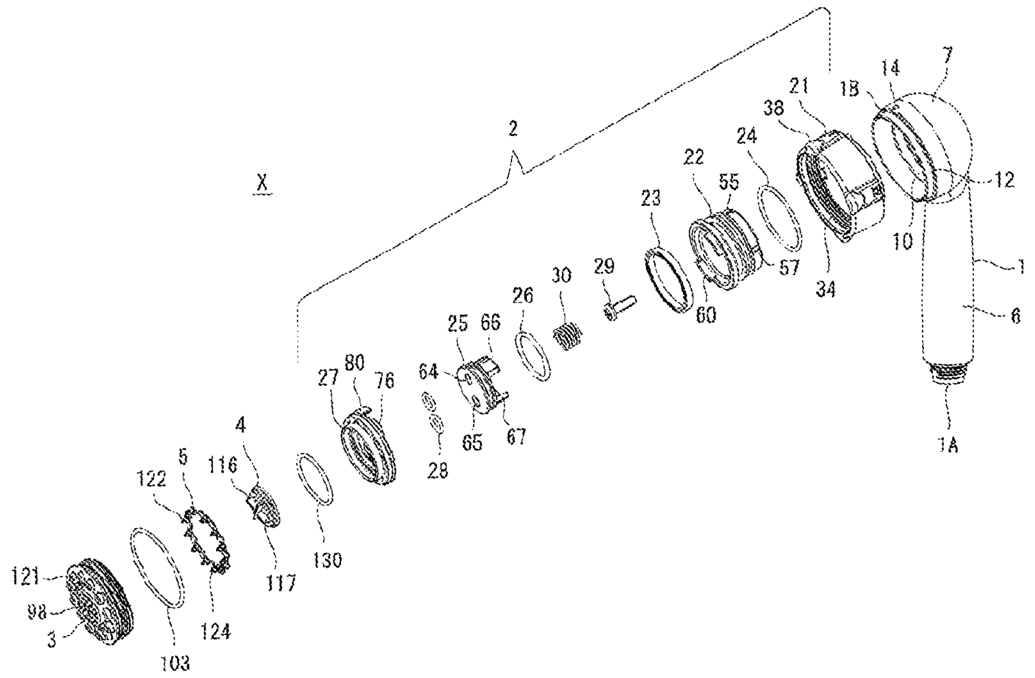

[FIG. 5]
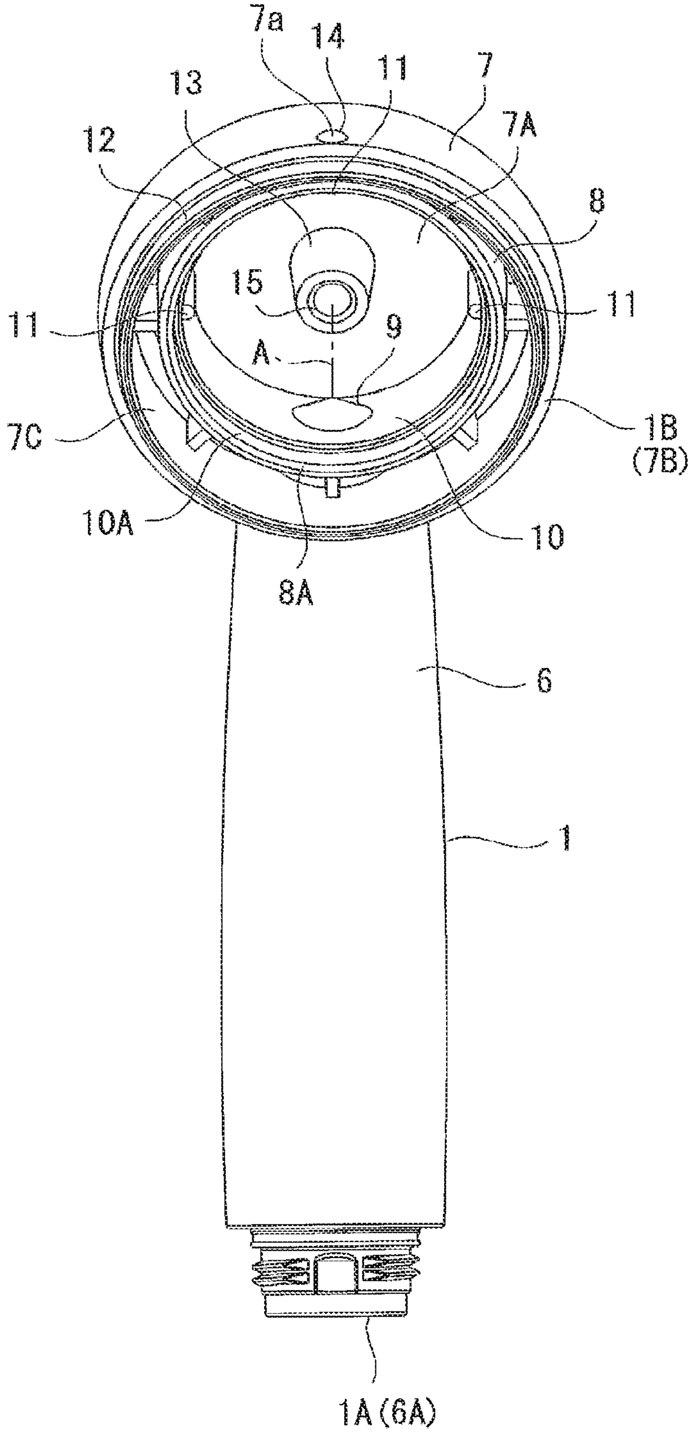

[FIG. 6]
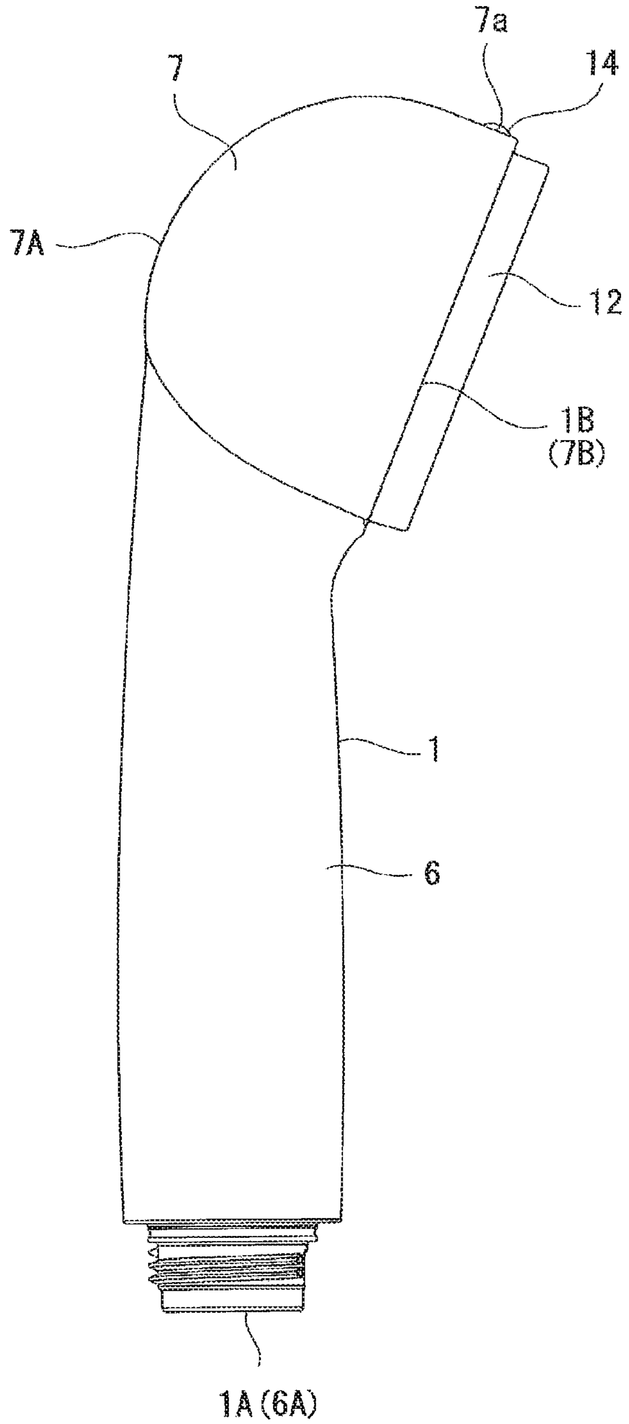

[FIG. 7]
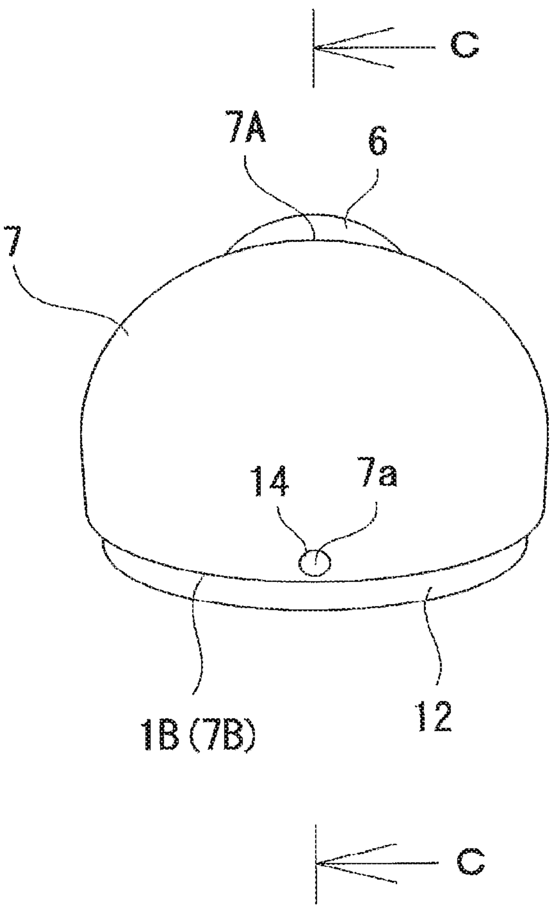

[FIG. 8]
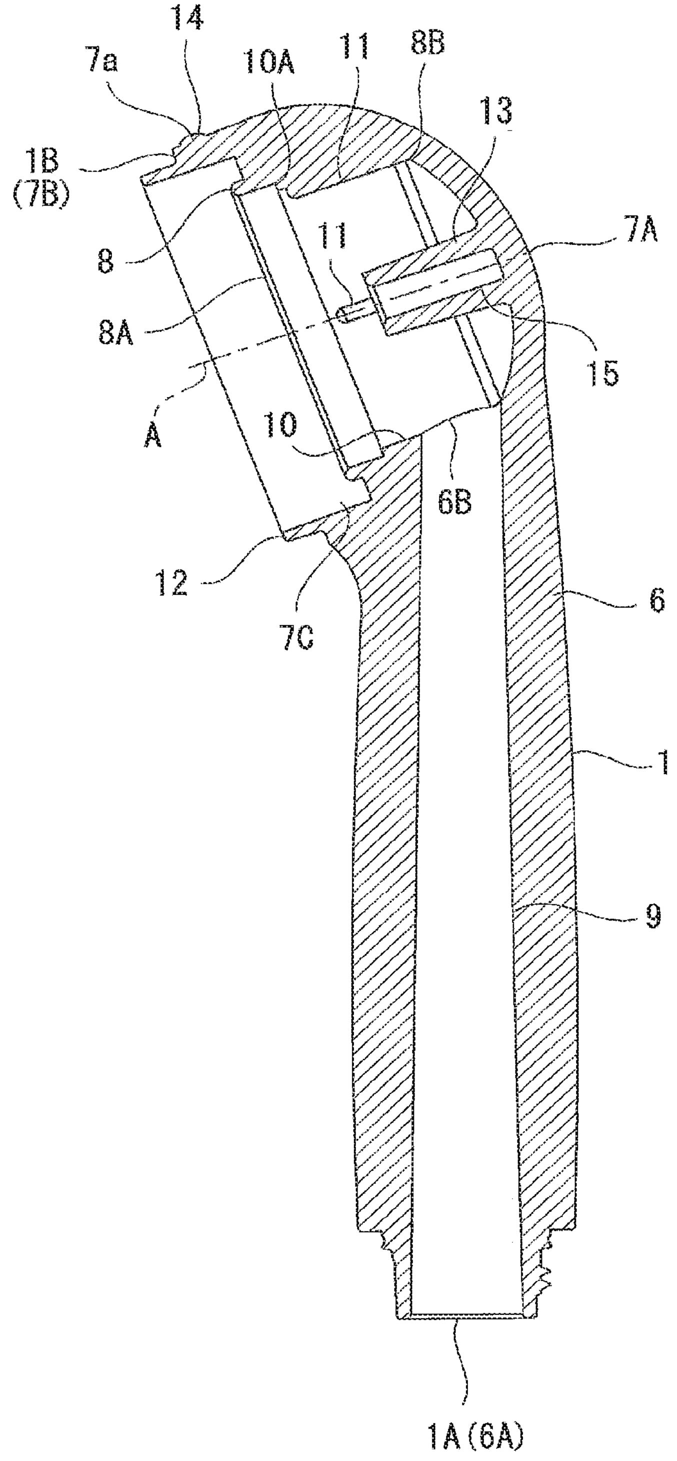

[FIG. 9]
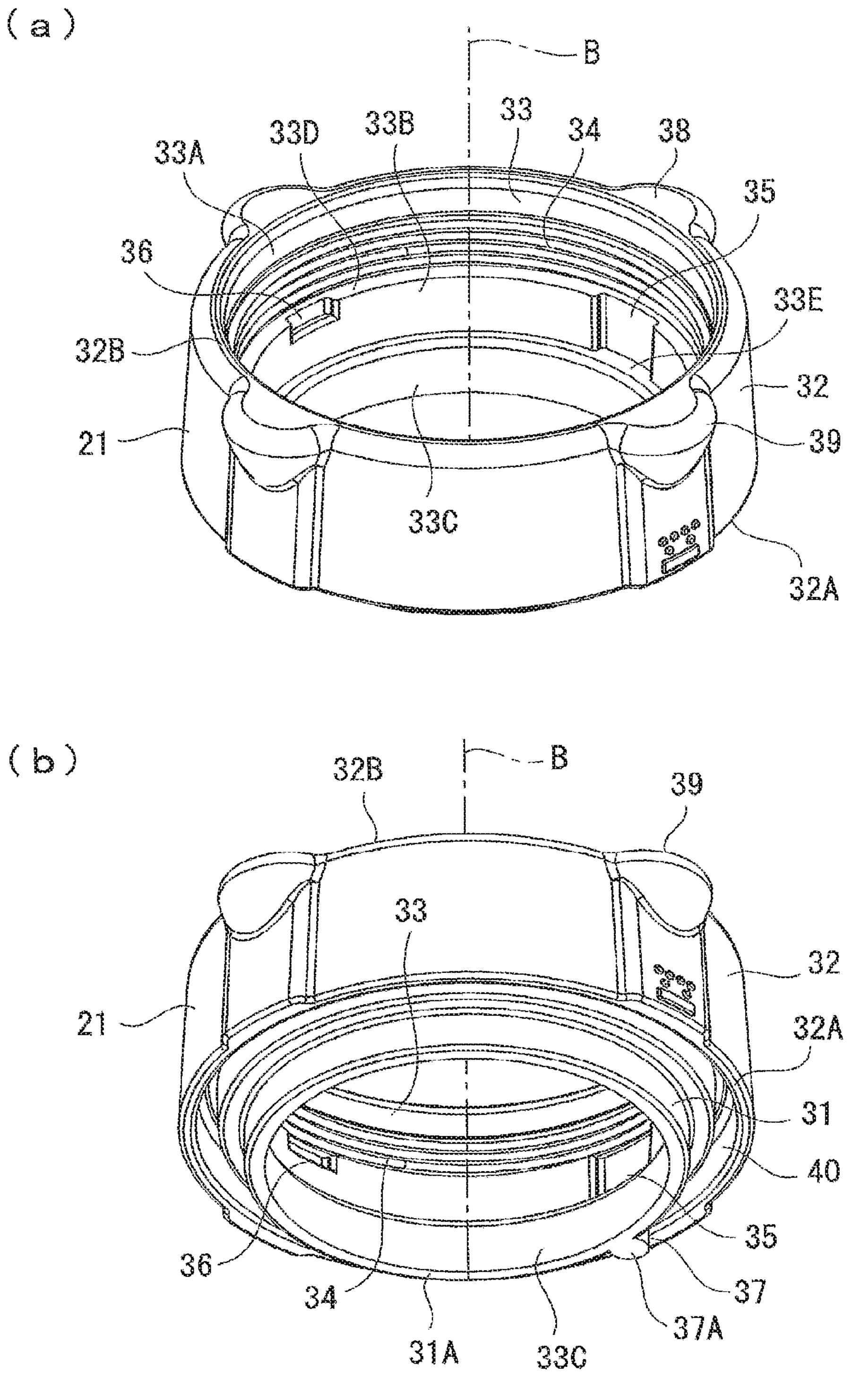

[FIG. 10]
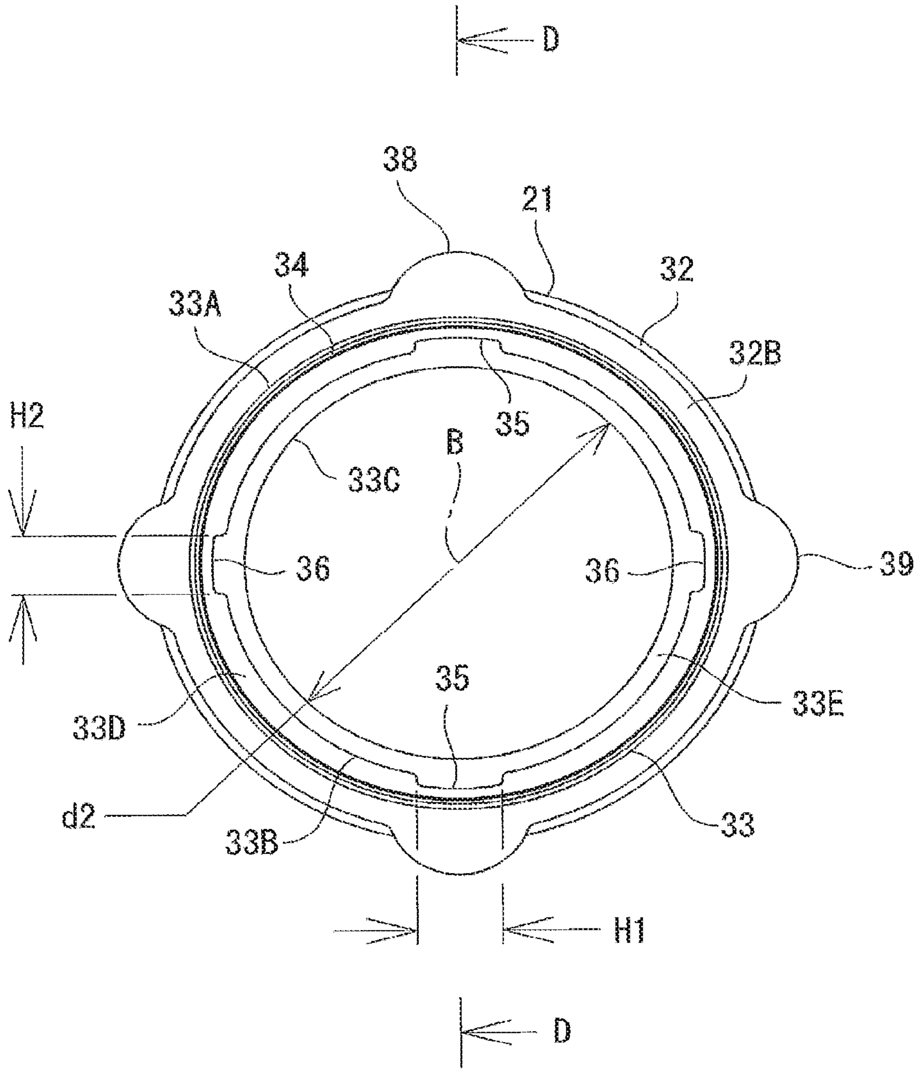

[FIG. 11]
(a)
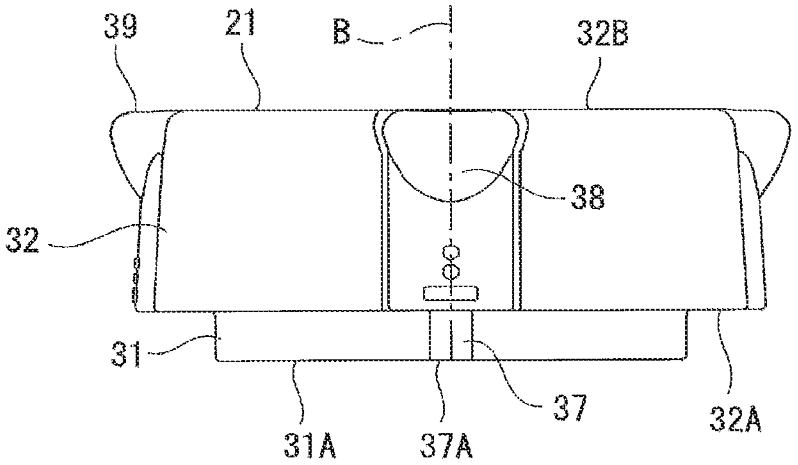
(b)
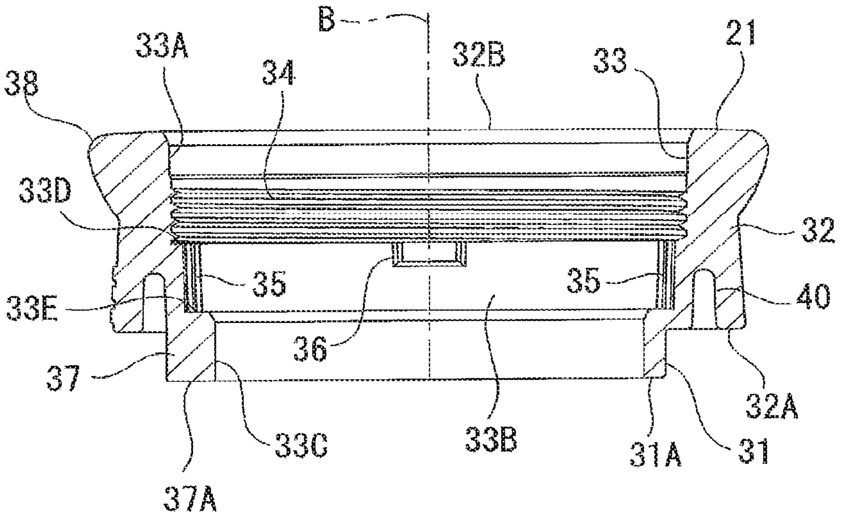

[FIG. 12]
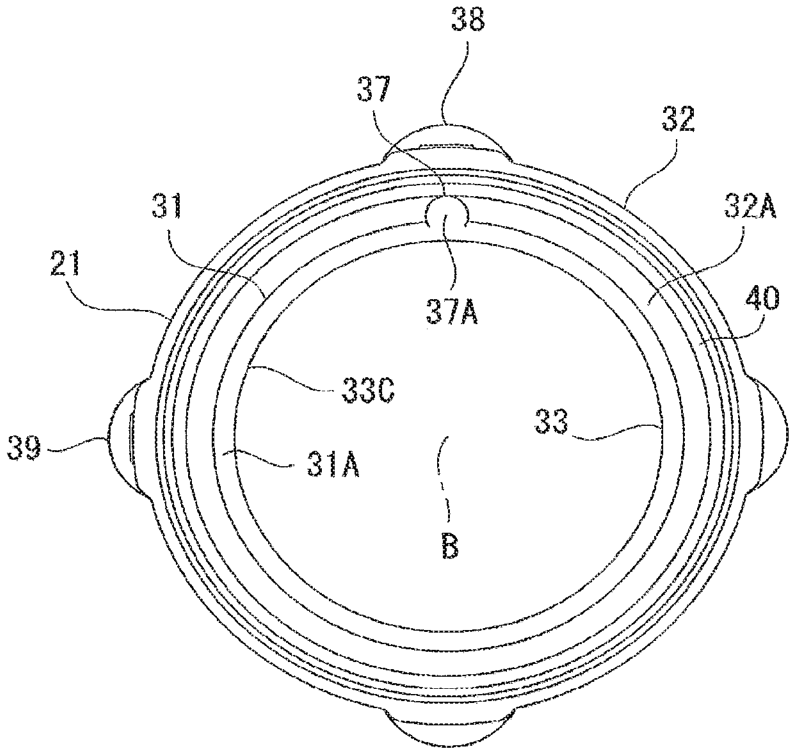

[FIG. 13]
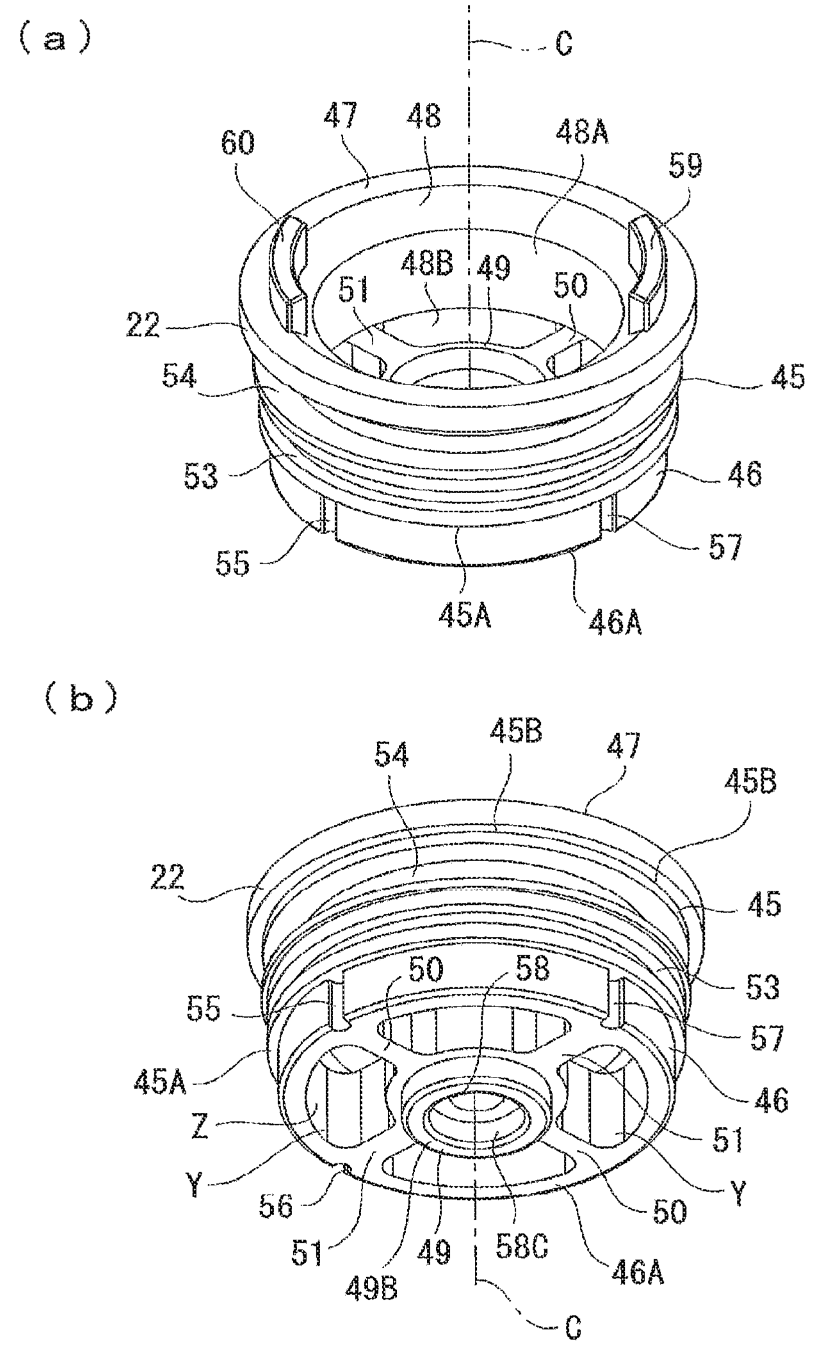

[FIG. 14]
(a)
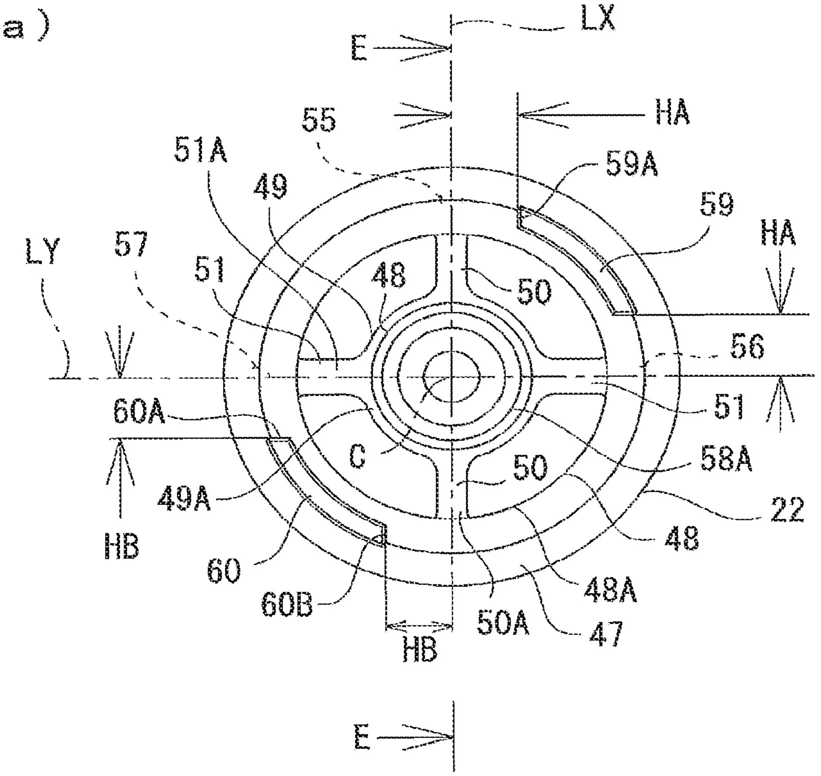
(b)
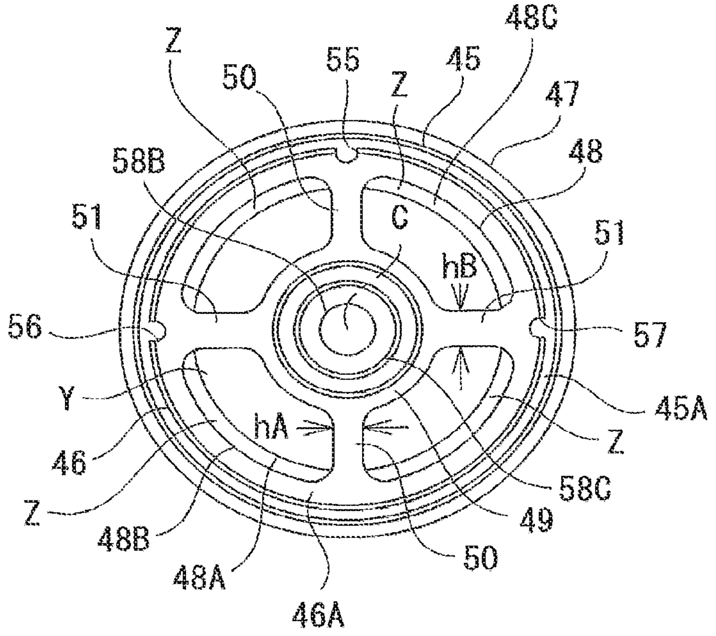

[FIG. 15]
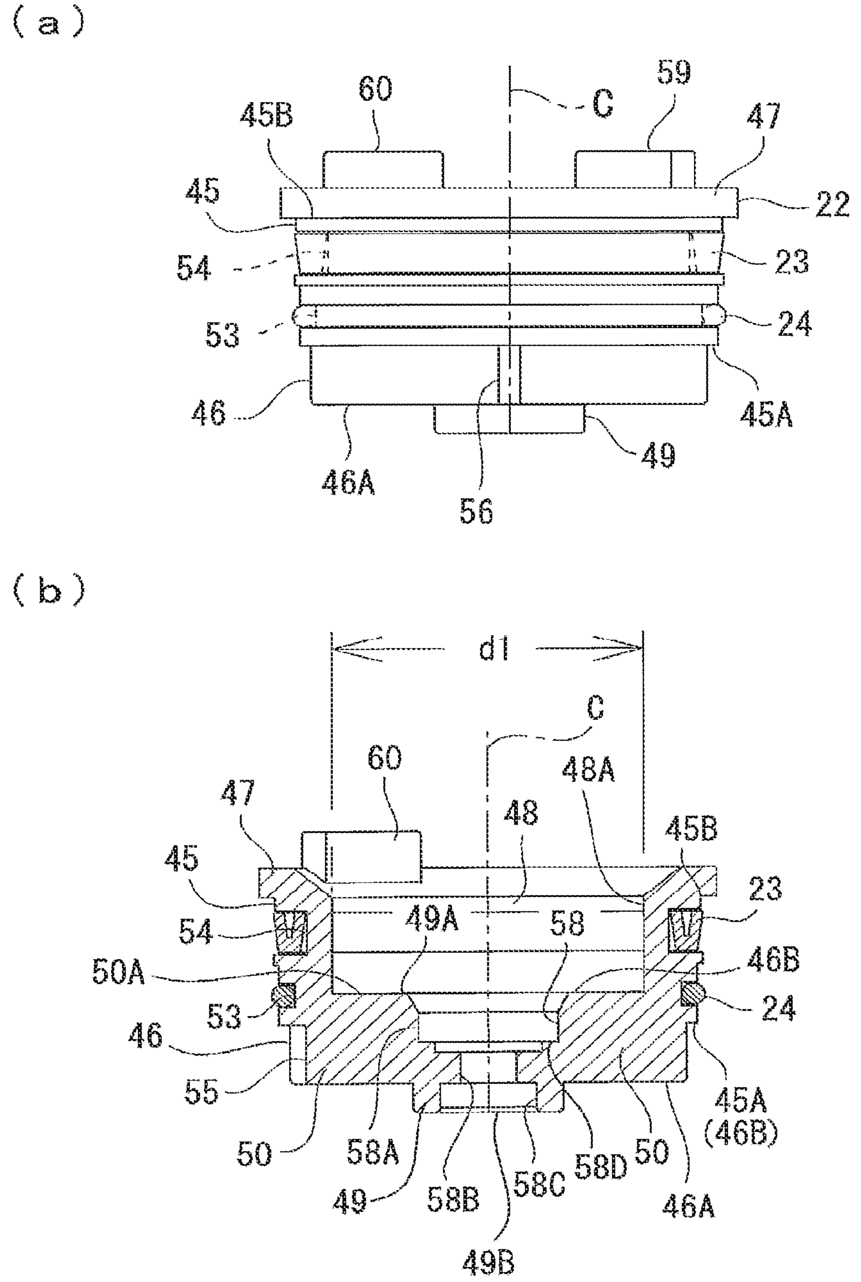

[FIG. 16]
(a)
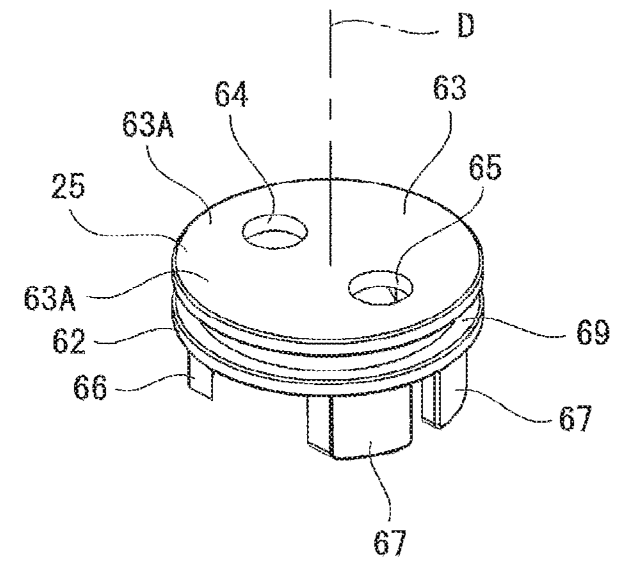
(b)
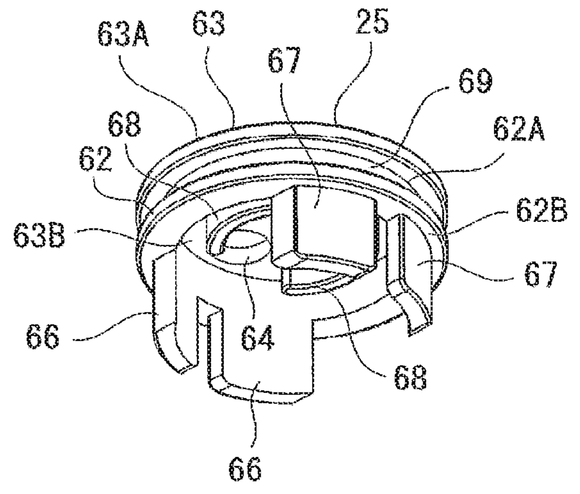

[FIG. 17]
(a)
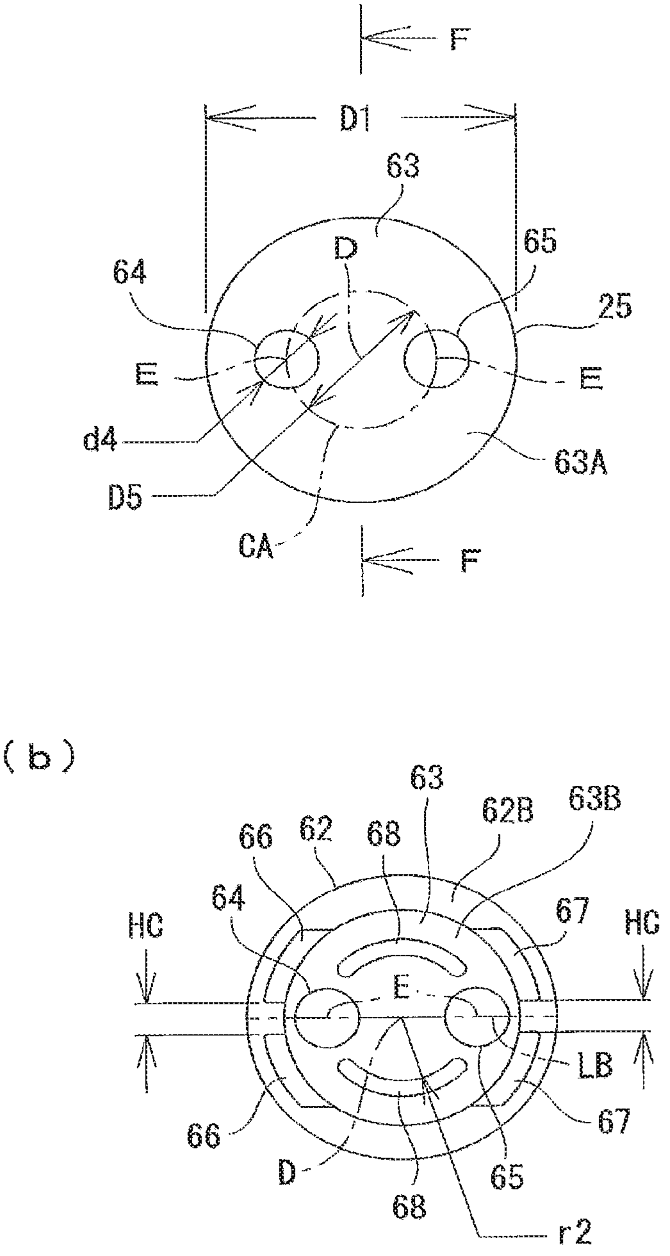
(b)

[FIG. 18]
（ａ）
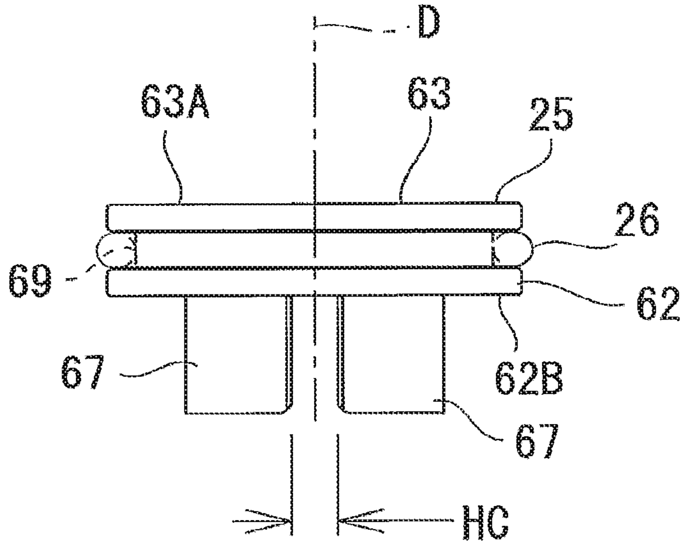
（ｂ）
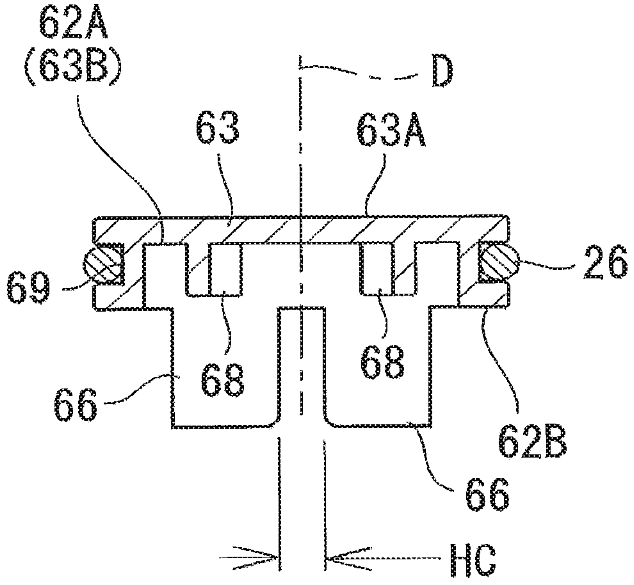

[FIG. 19]
(a)
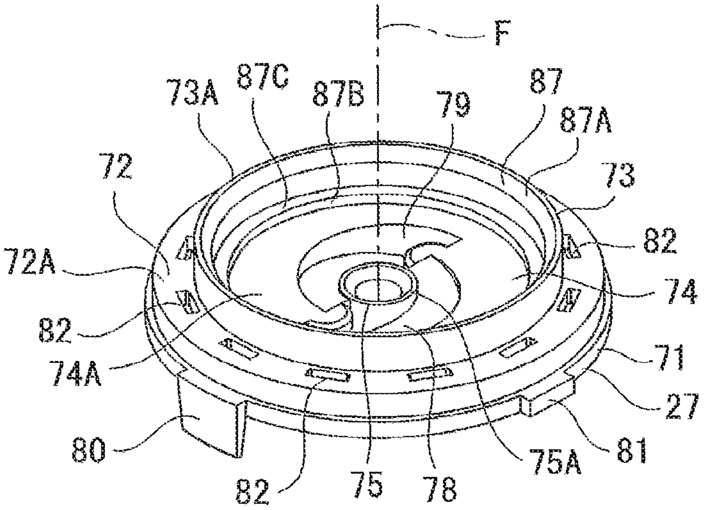
(b)
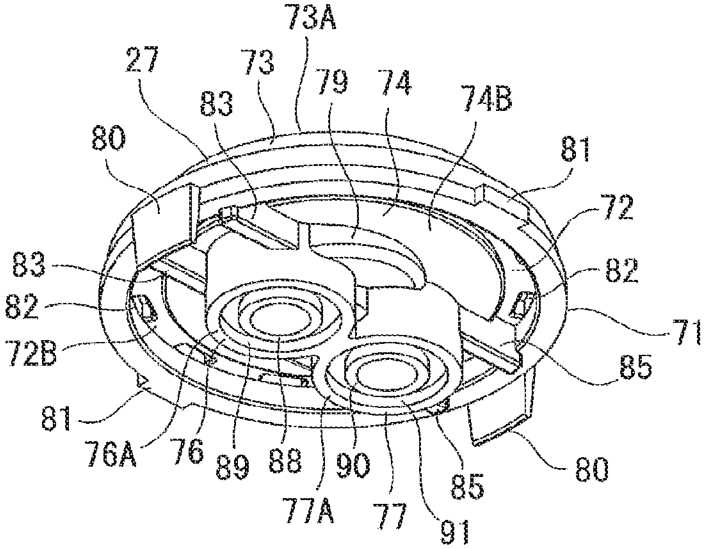

[FIG. 20]
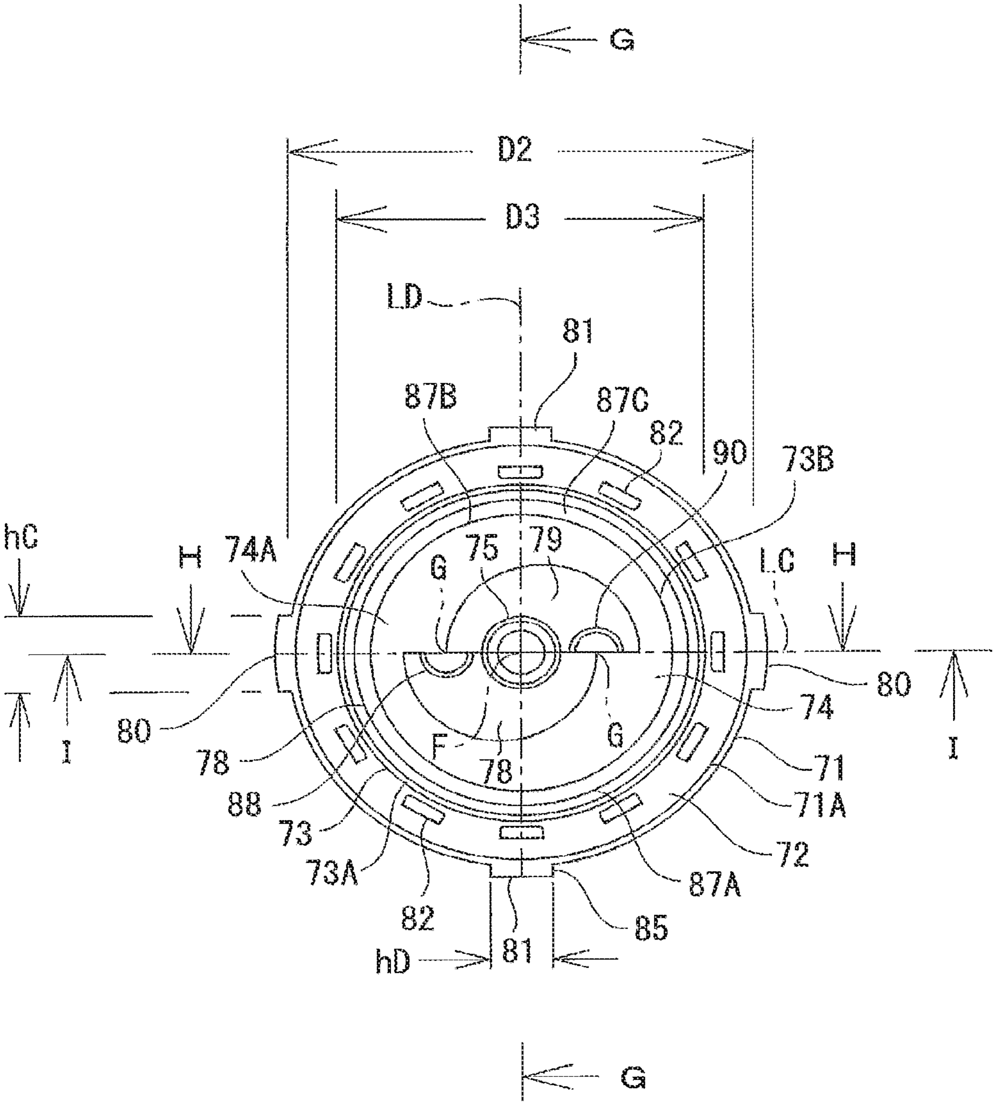

[FIG. 21]
(a)
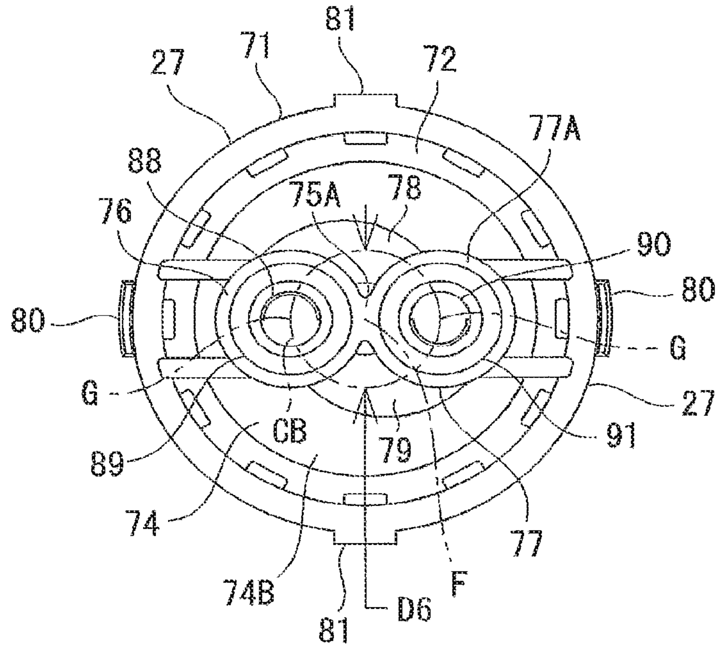
(b)
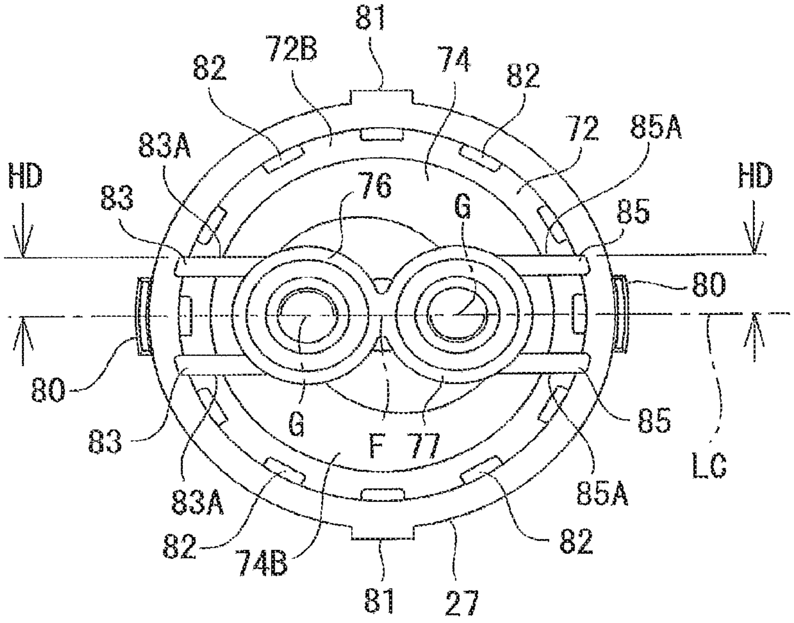

[FIG. 22]
(a)
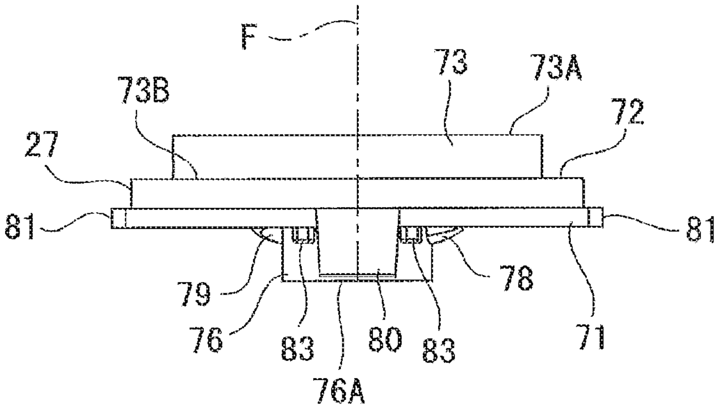
(b)
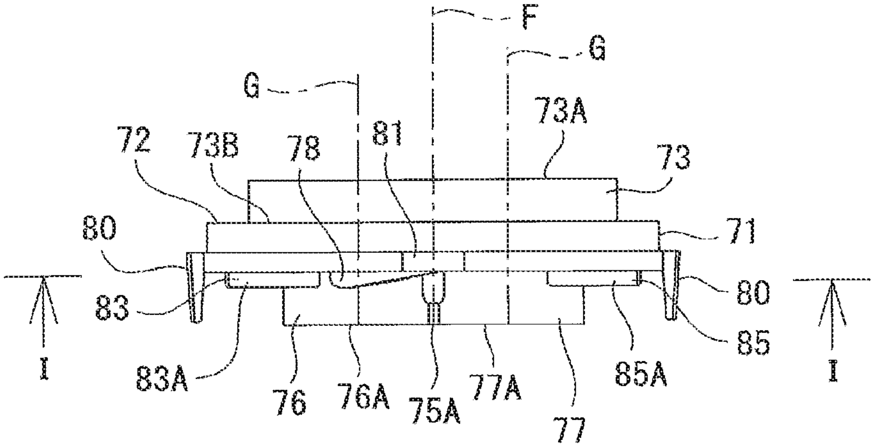

[FIG. 23]
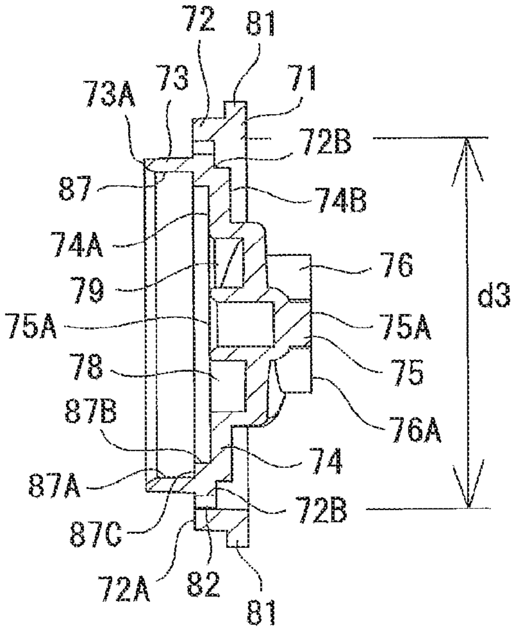

[FIG. 24]
(a)
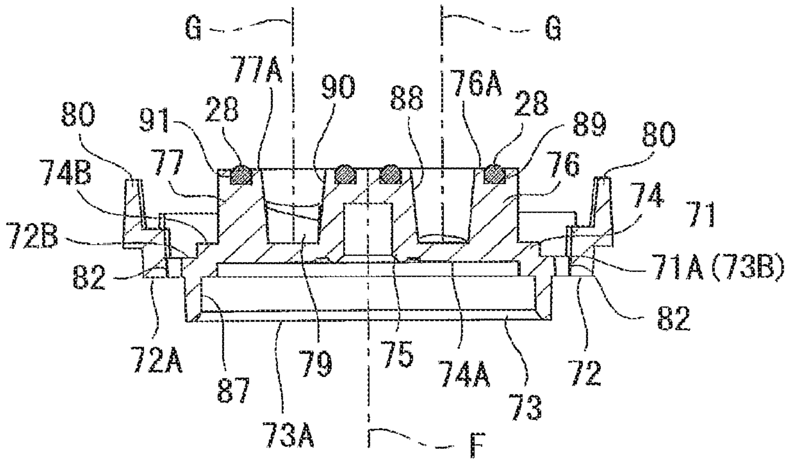
(b)
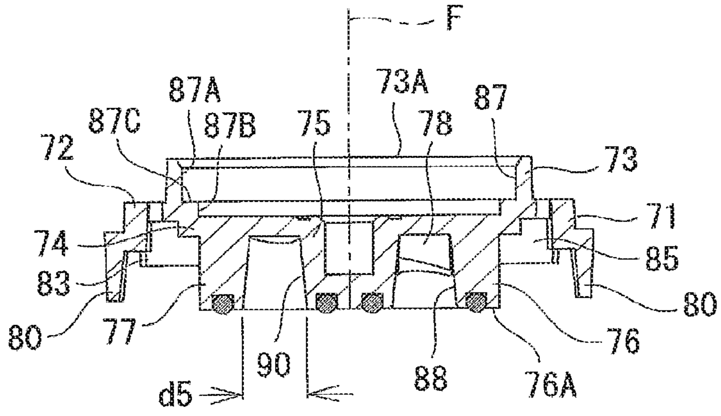

[FIG. 25]
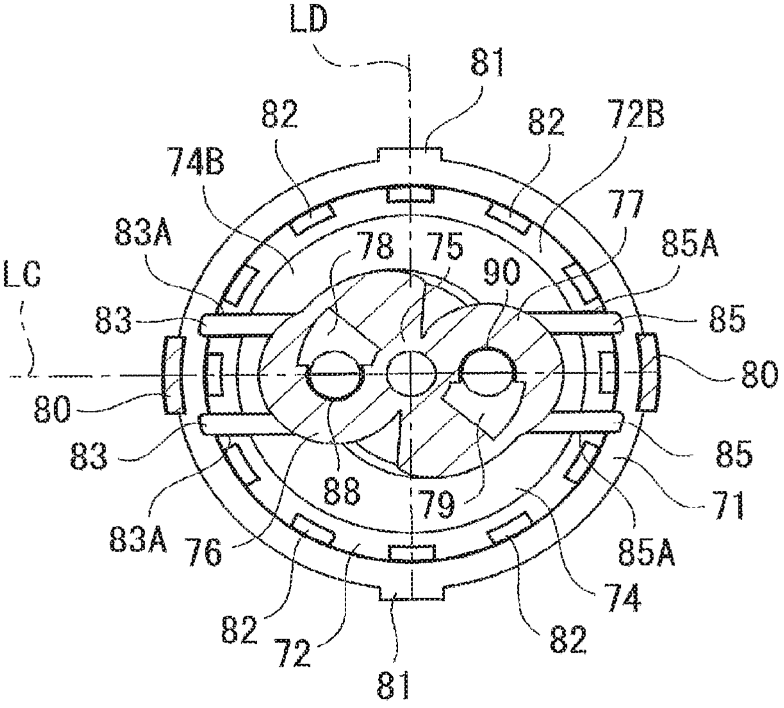

[FIG. 26]
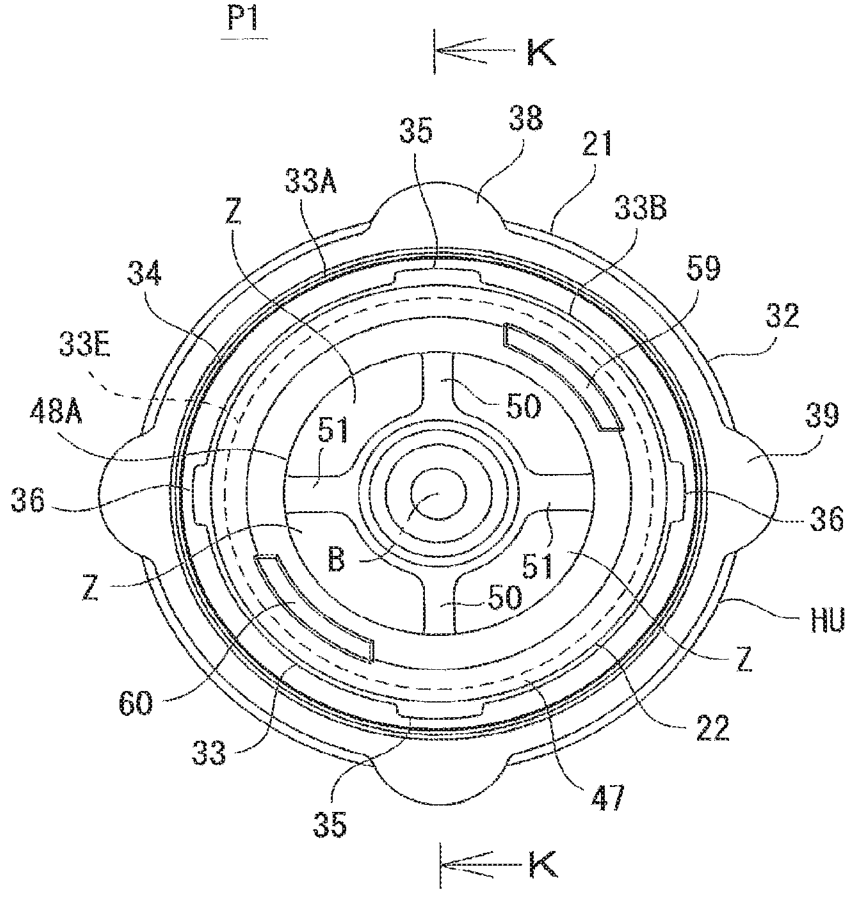

[FIG. 27]
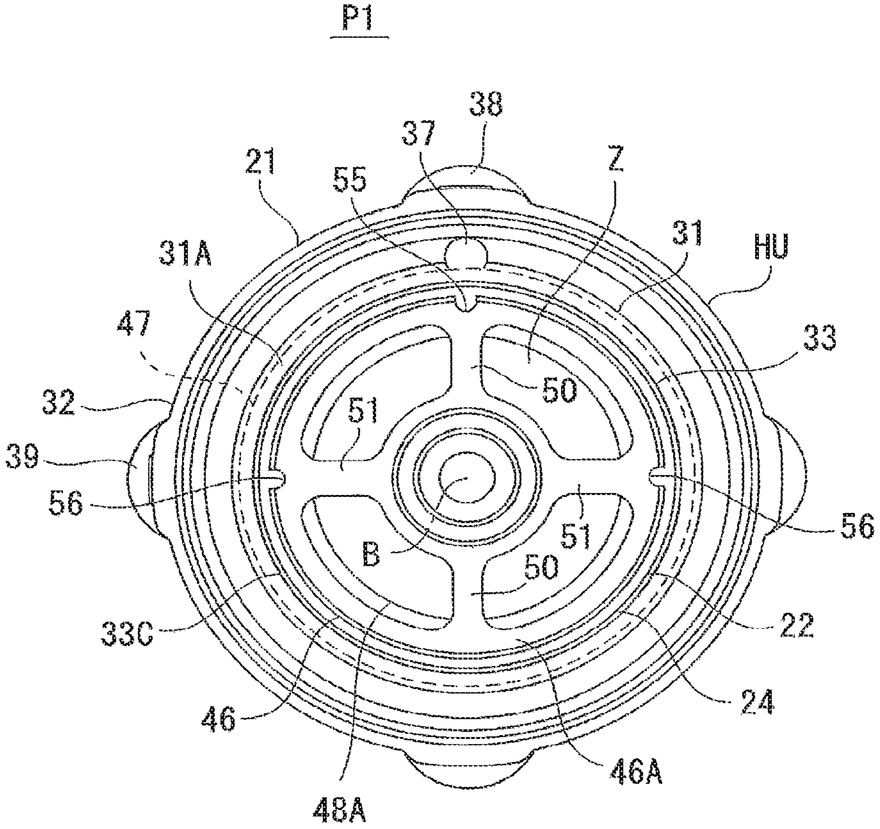

[FIG. 28]
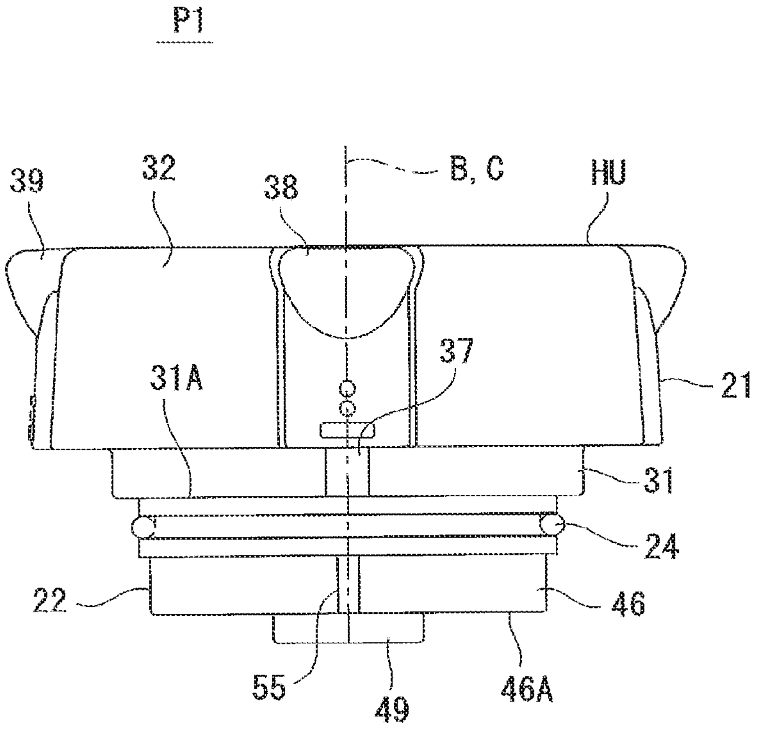

[FIG. 29]
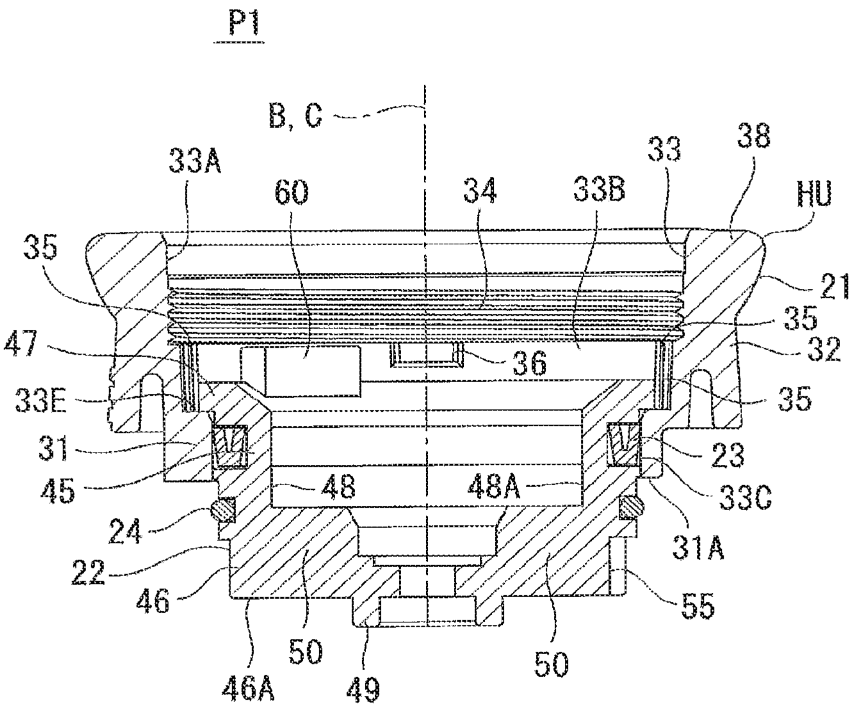

[FIG. 30]
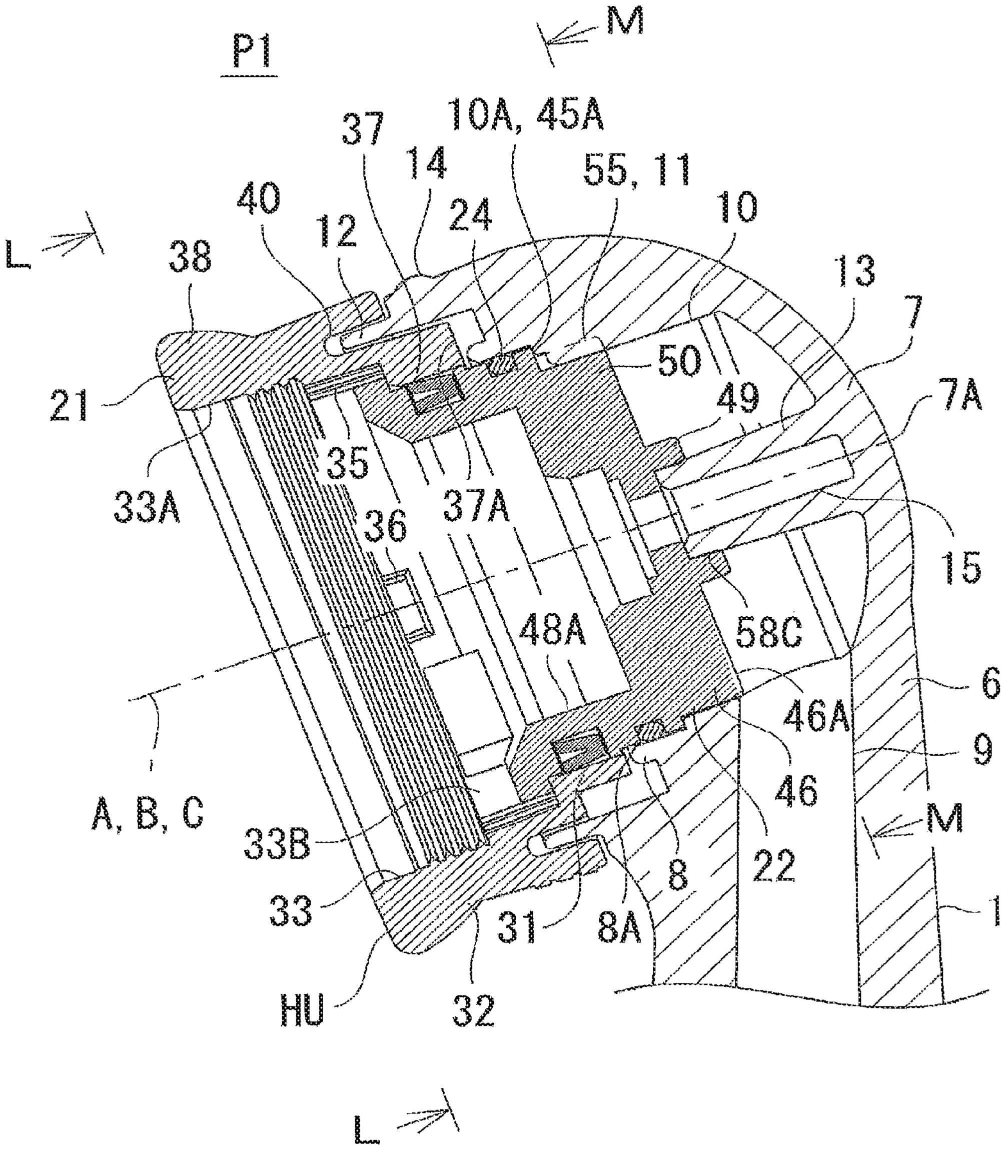

[FIG. 31]
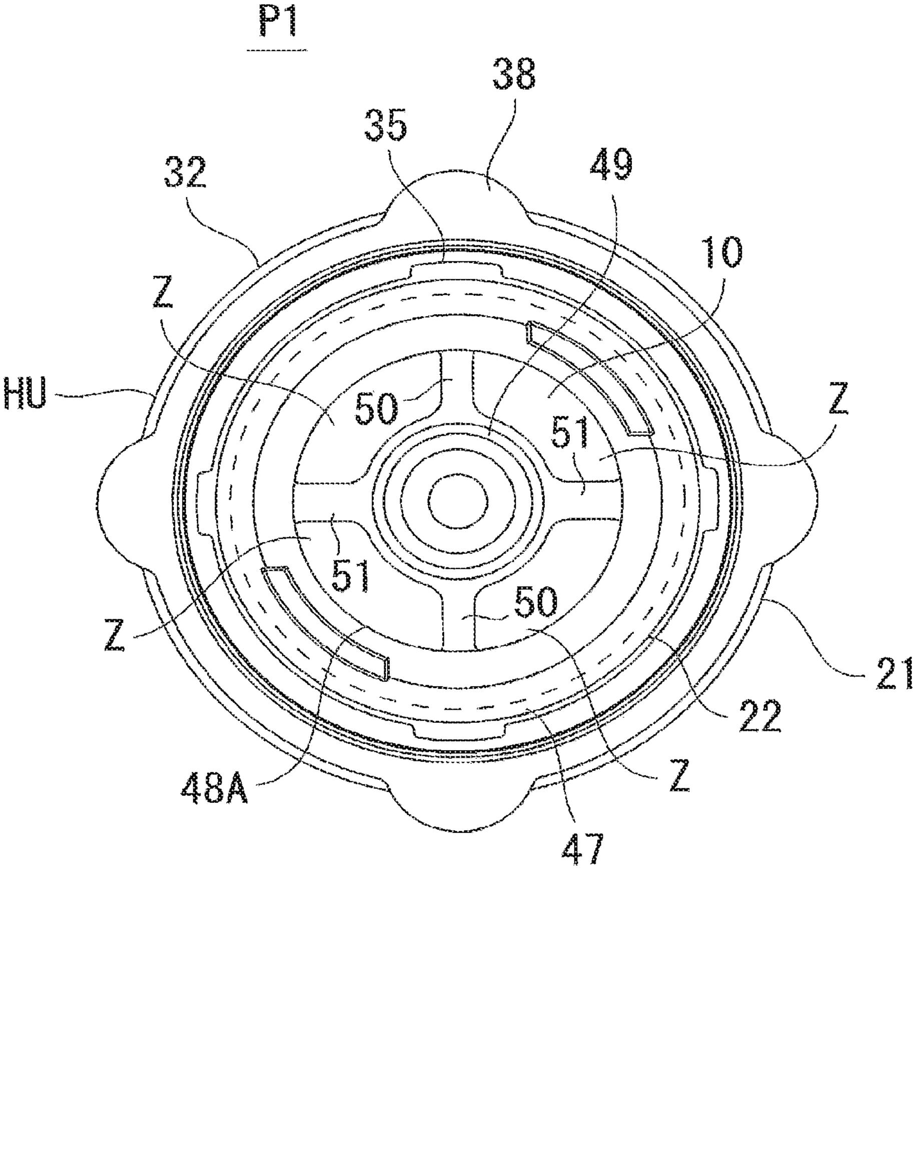

[FIG. 32]
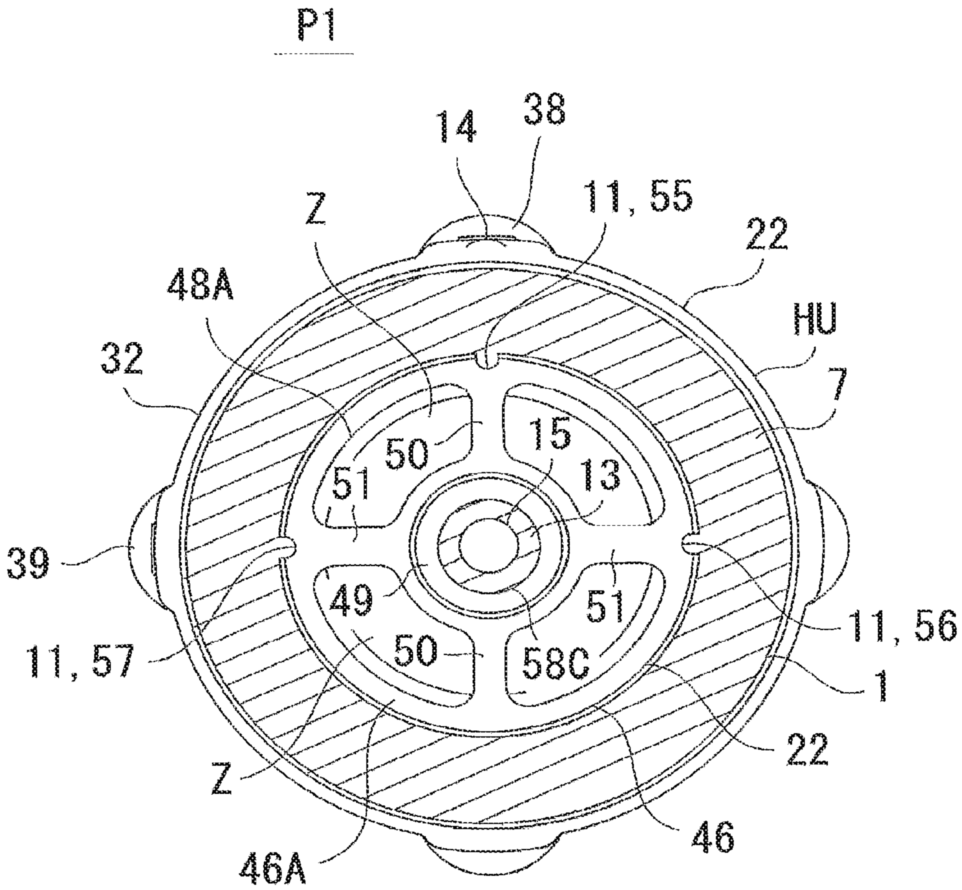

[FIG. 33]
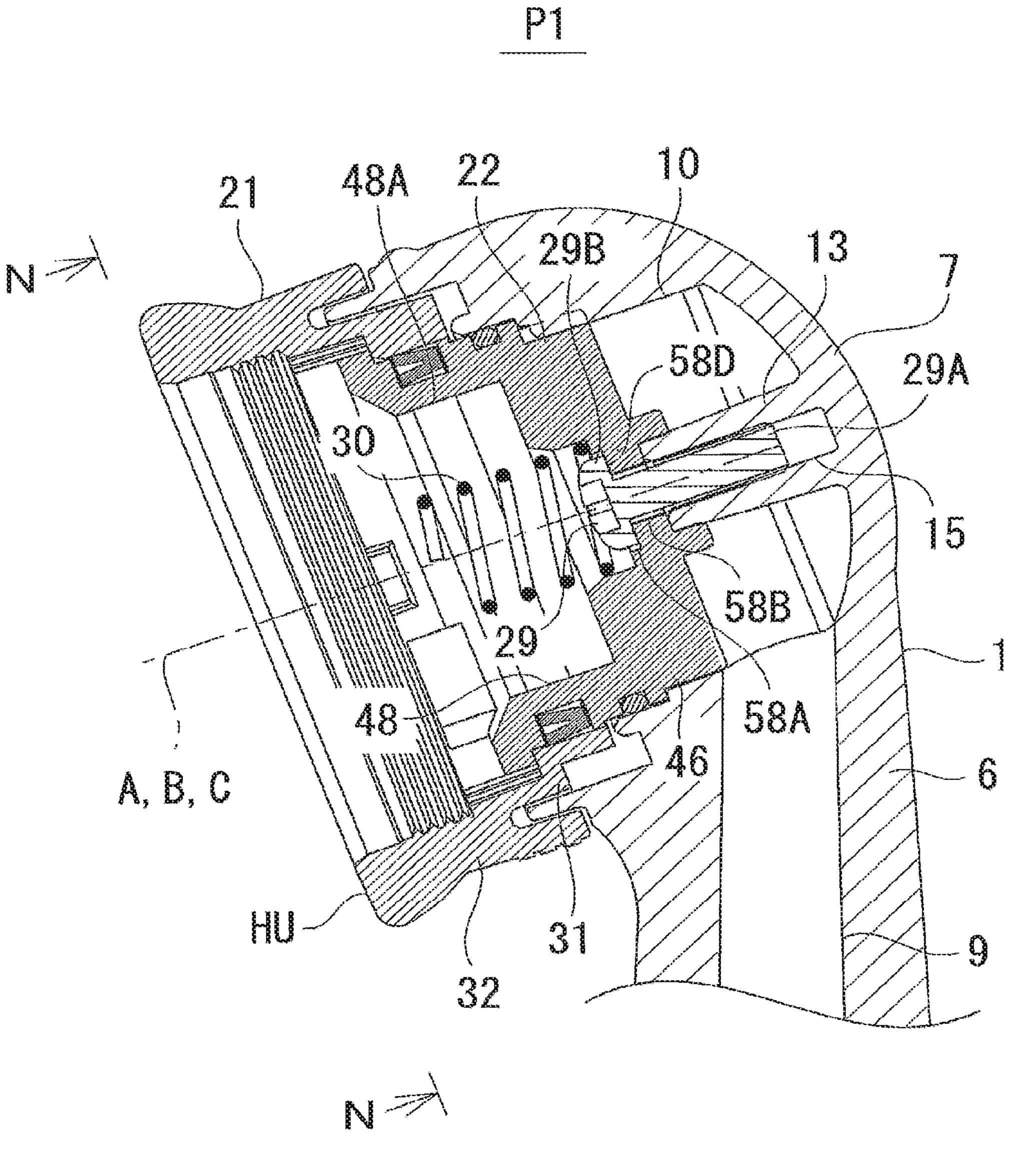

[FIG. 34]
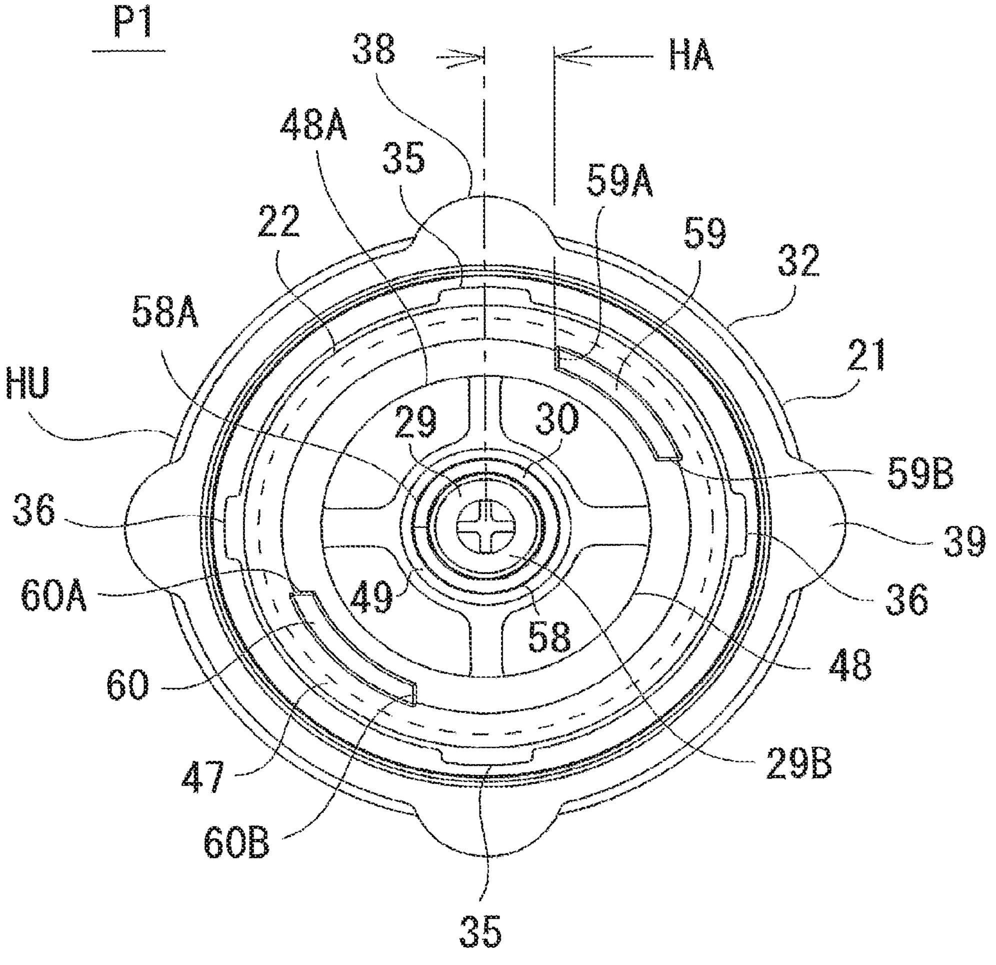

[FIG. 35]
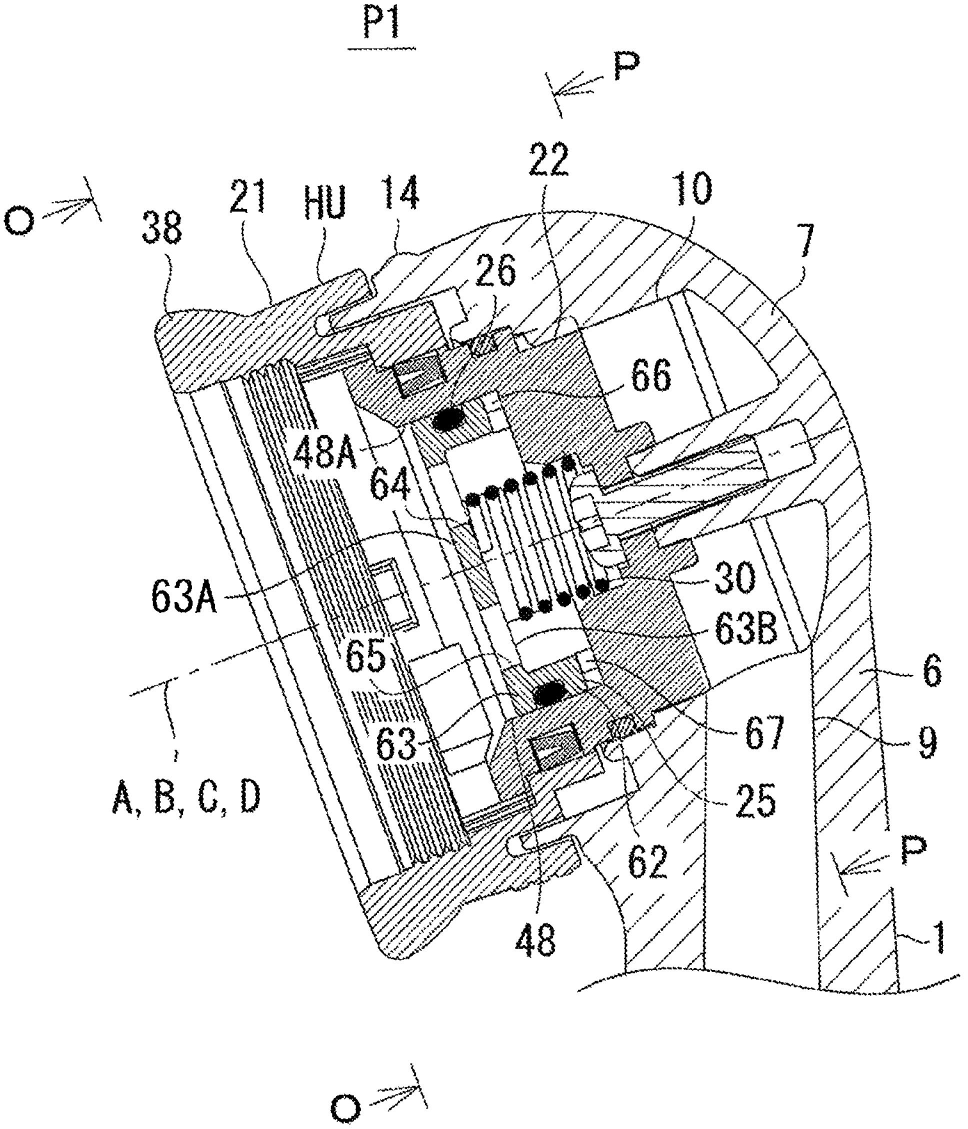

[FIG. 36]
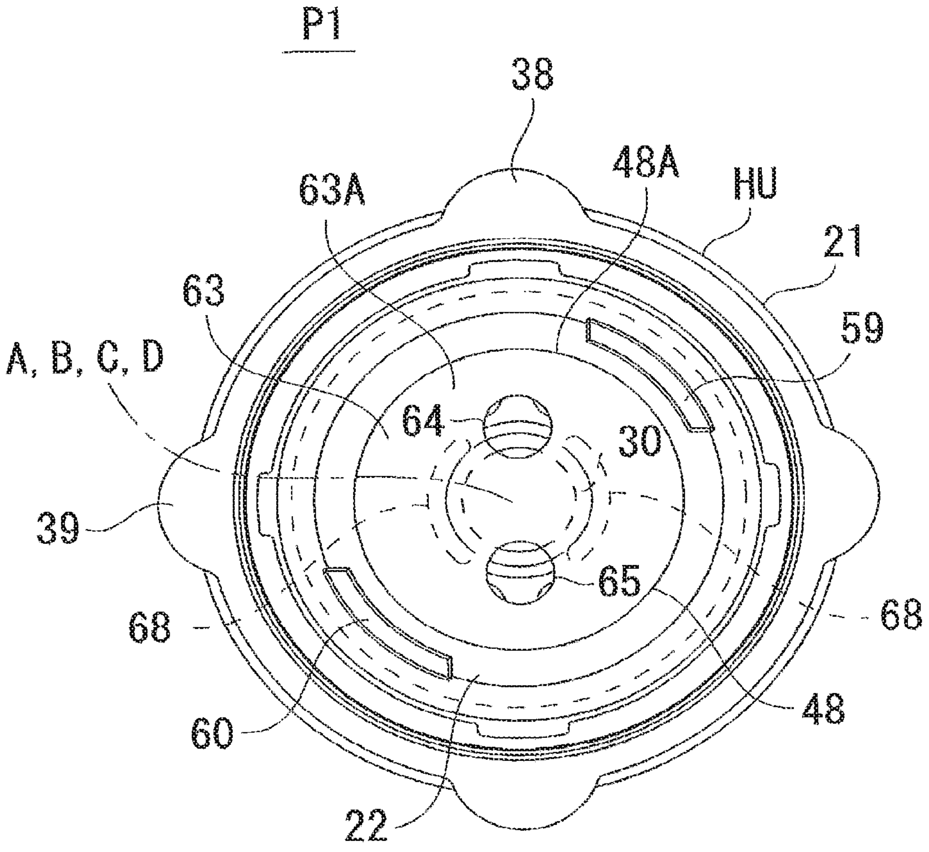

[FIG. 37]
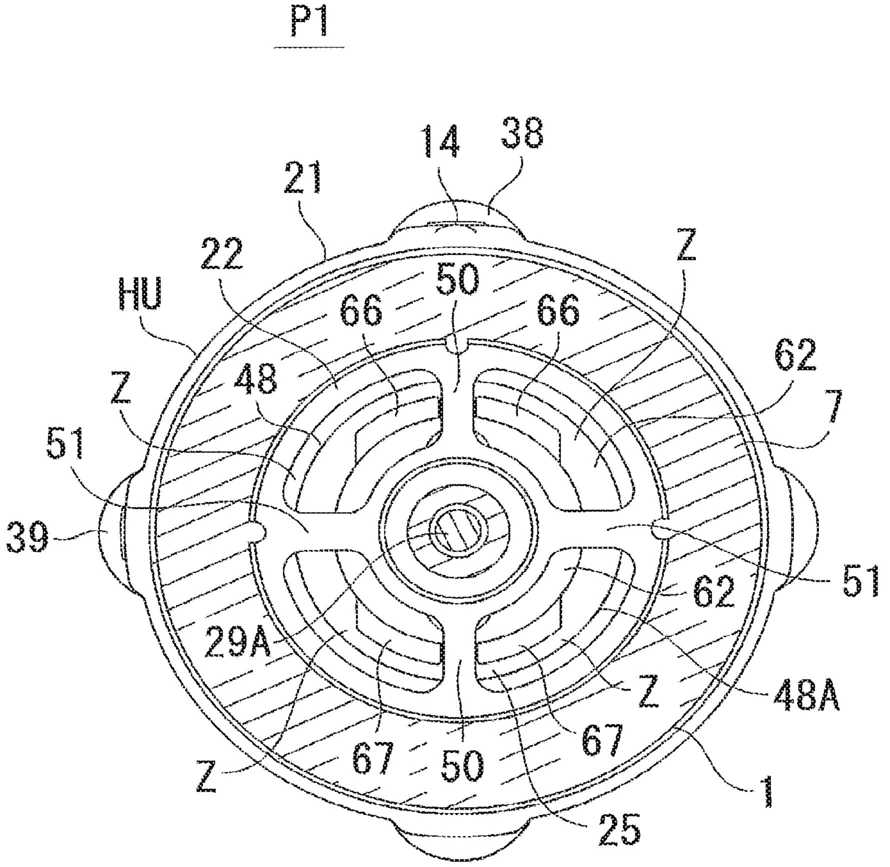

[FIG. 38]
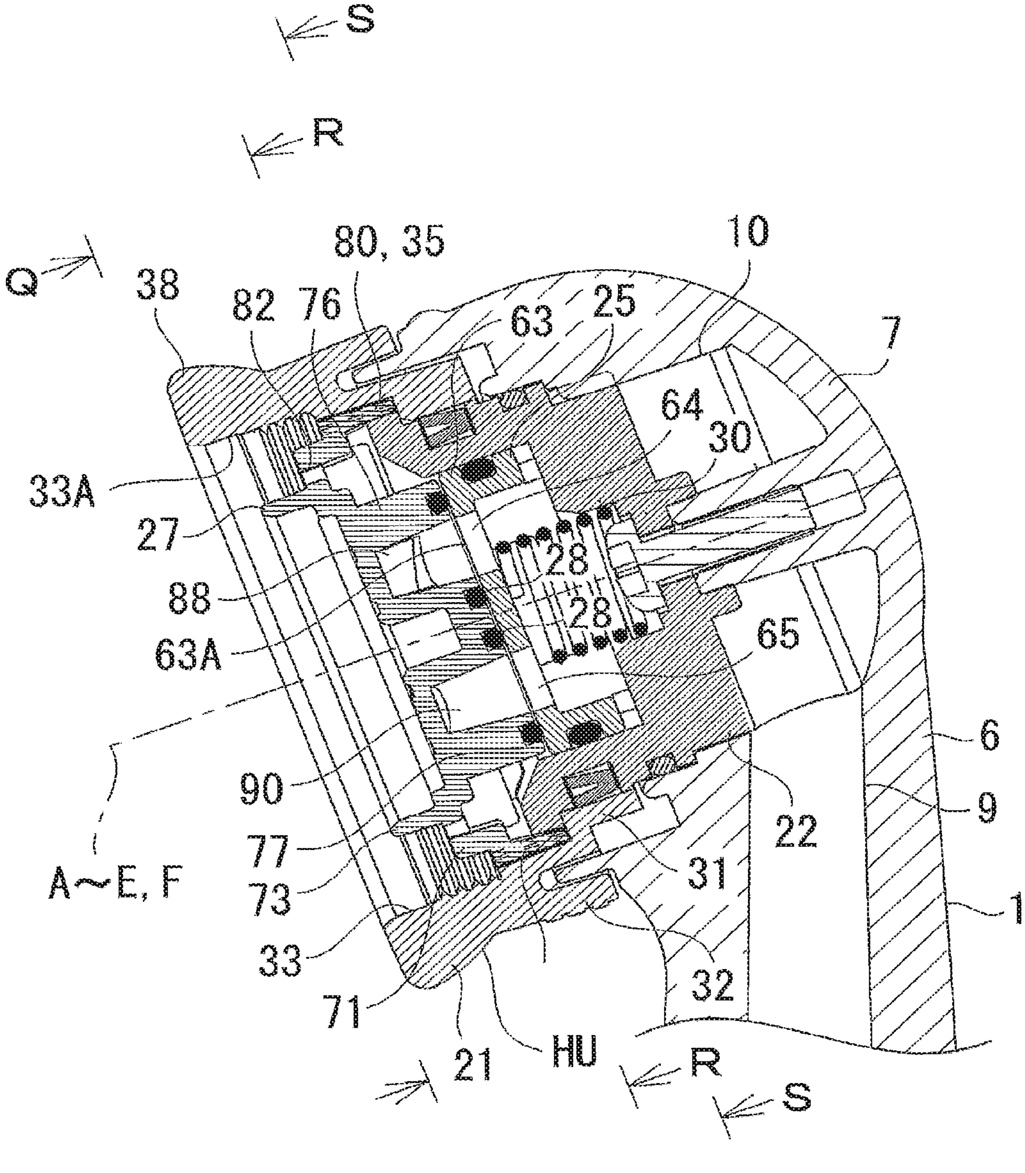

[FIG. 39]
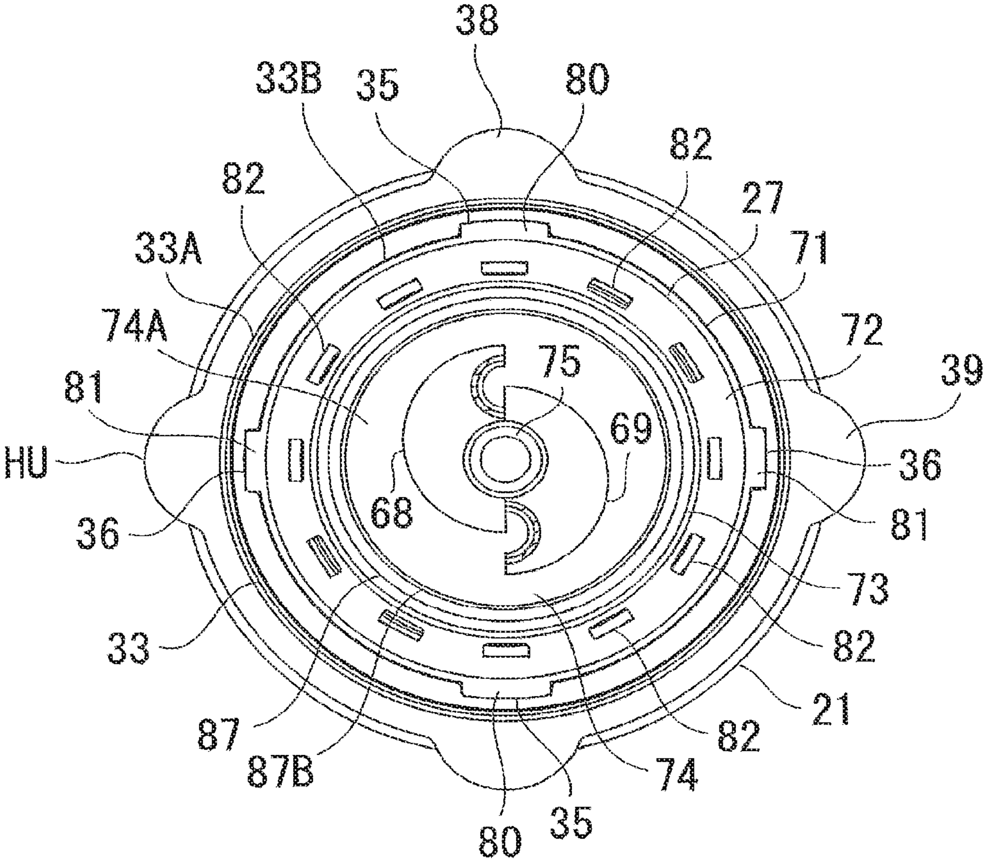

[FIG. 40]
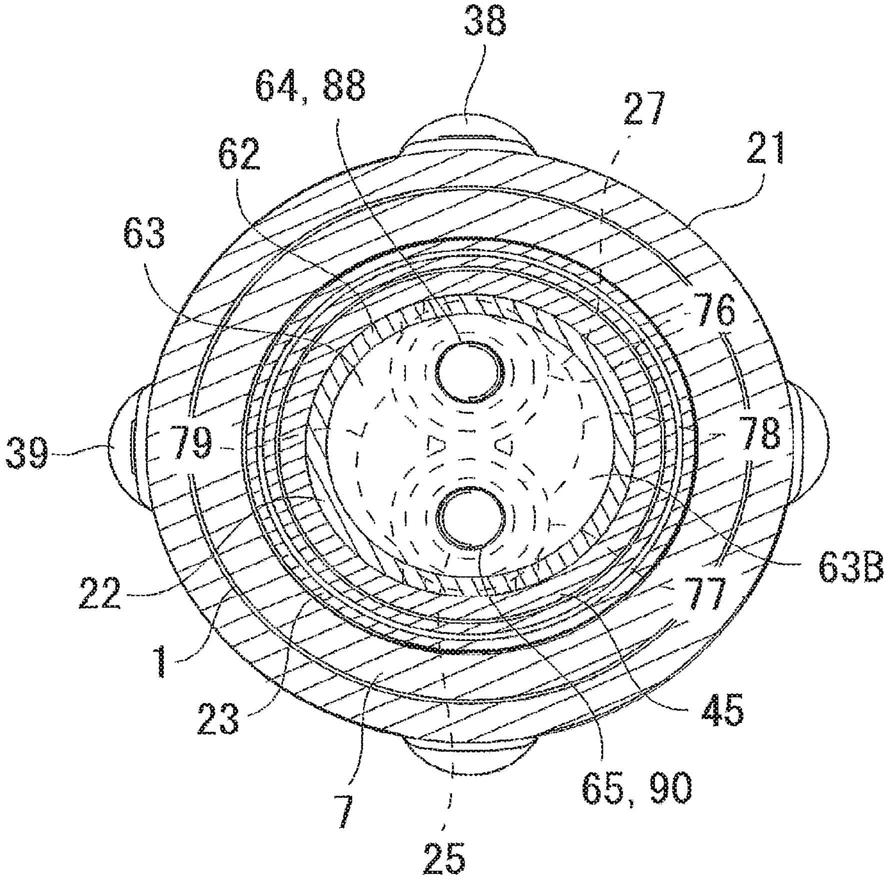

[FIG. 41]
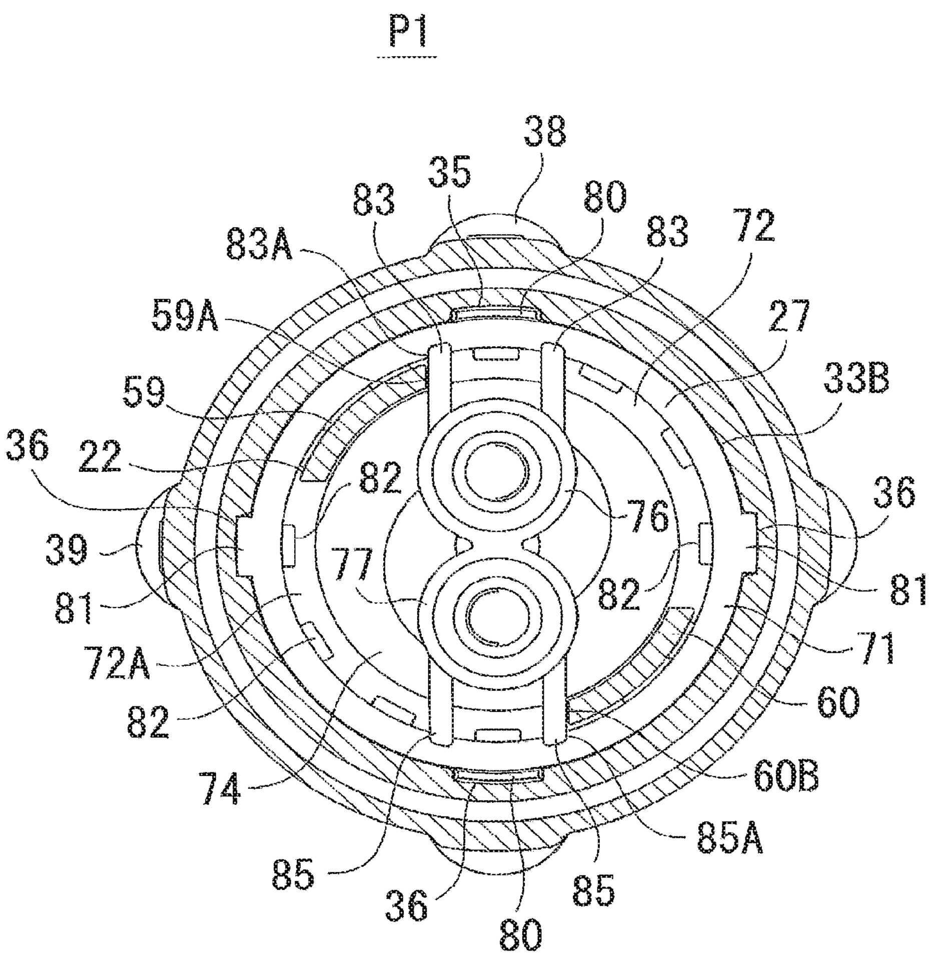

[FIG. 42]
（a）
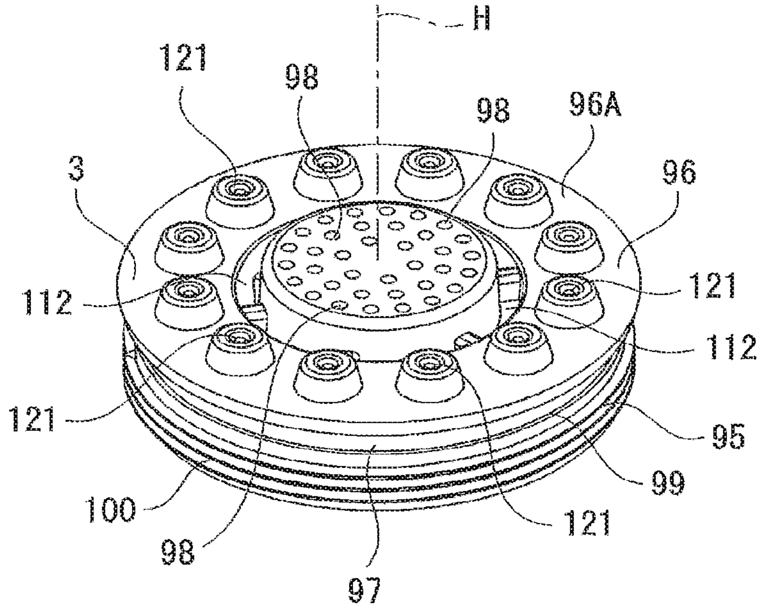
（b）
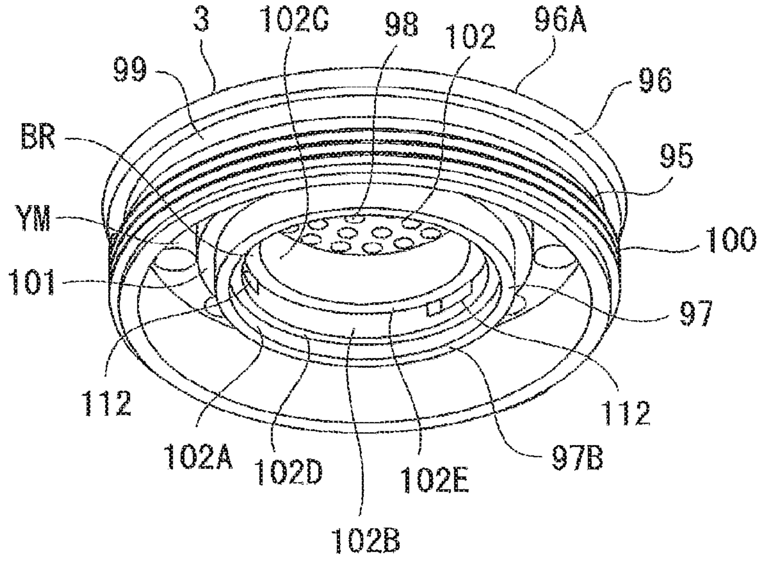

[FIG. 43]
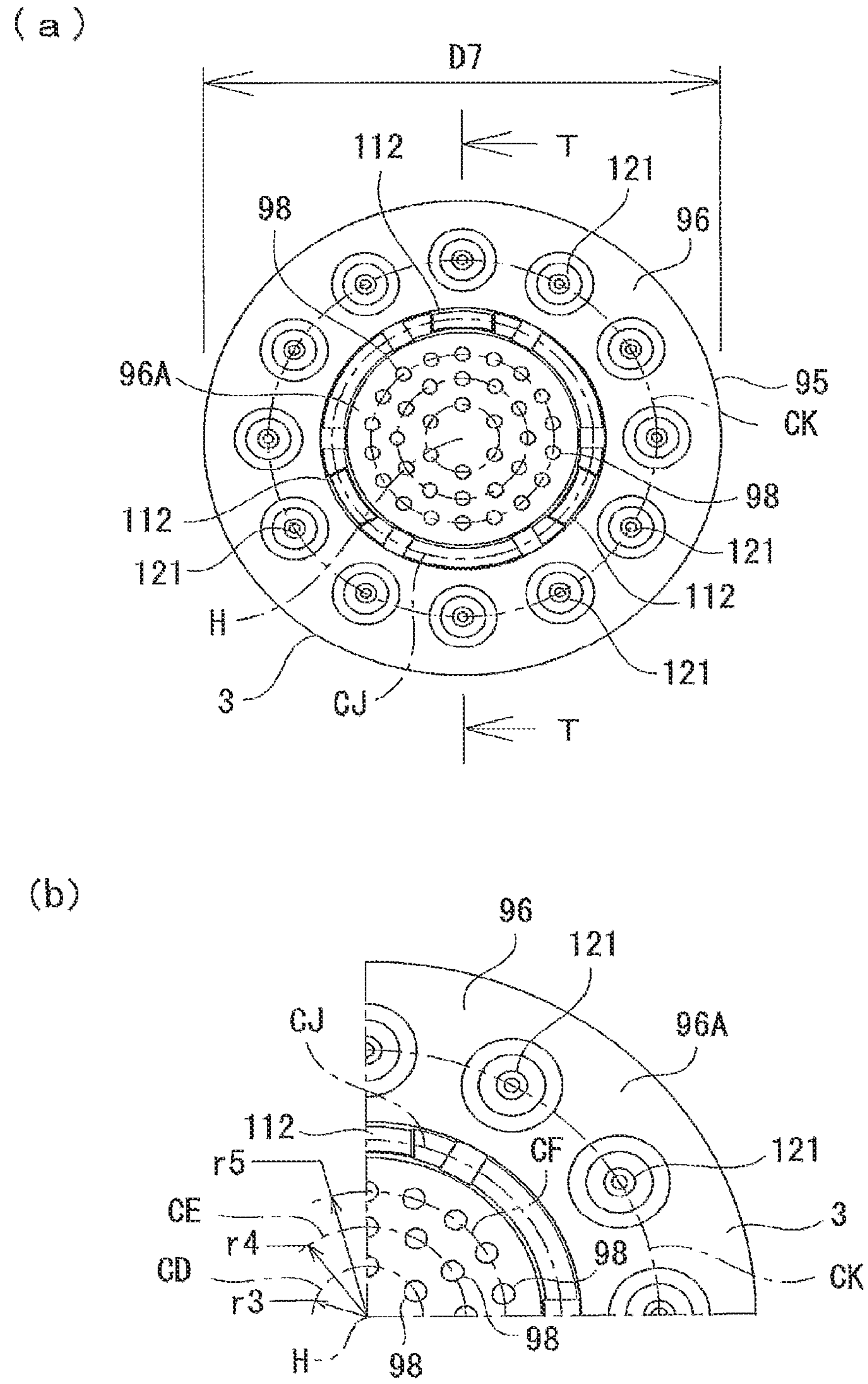

[FIG. 44]
(a)
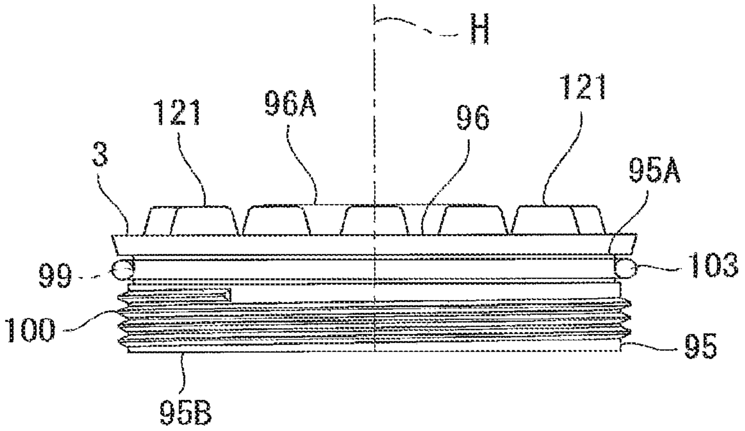
(b)
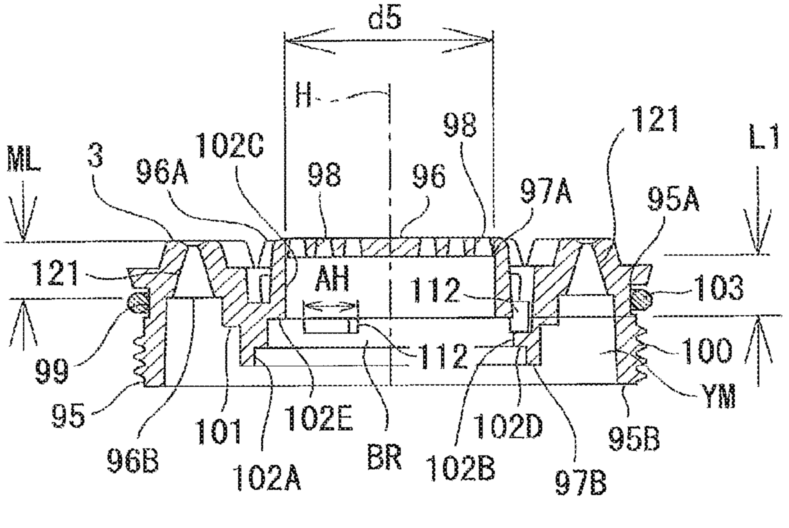

[FIG. 45]
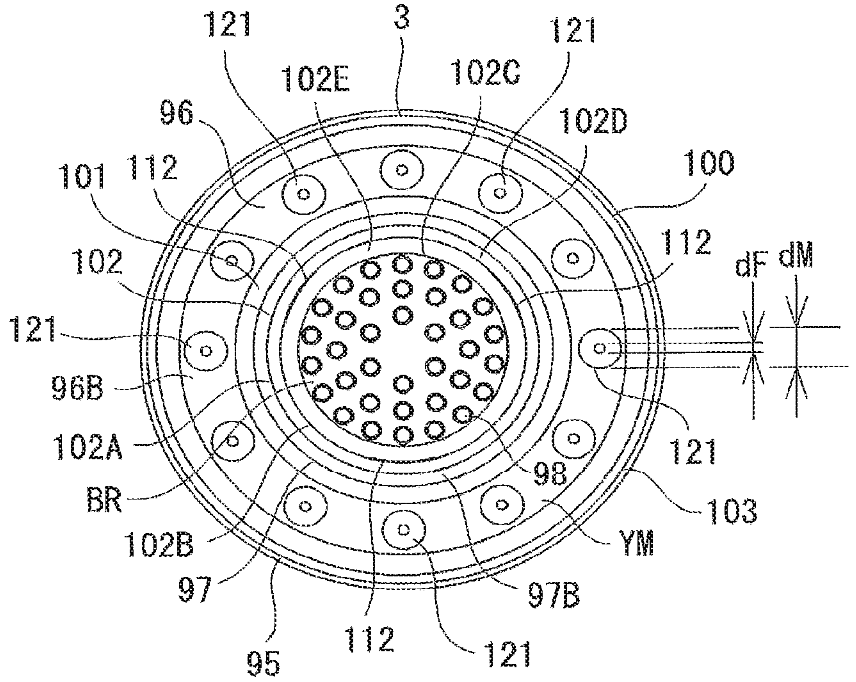

[FIG. 46]
(a)
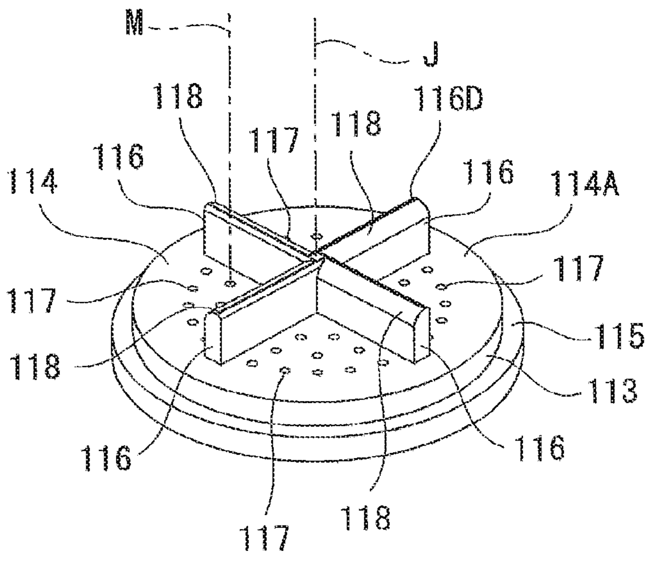
(b)
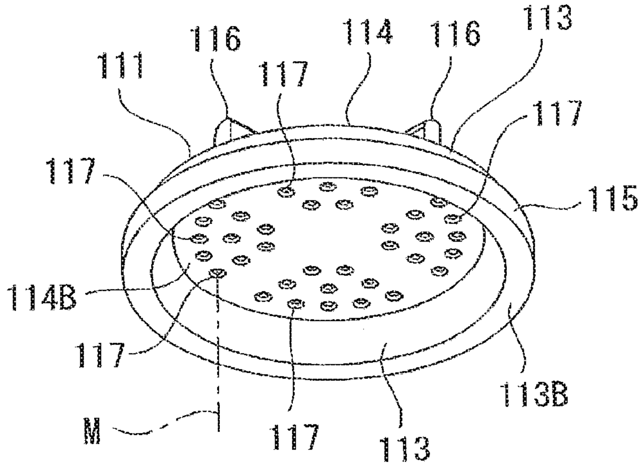

[FIG. 47]
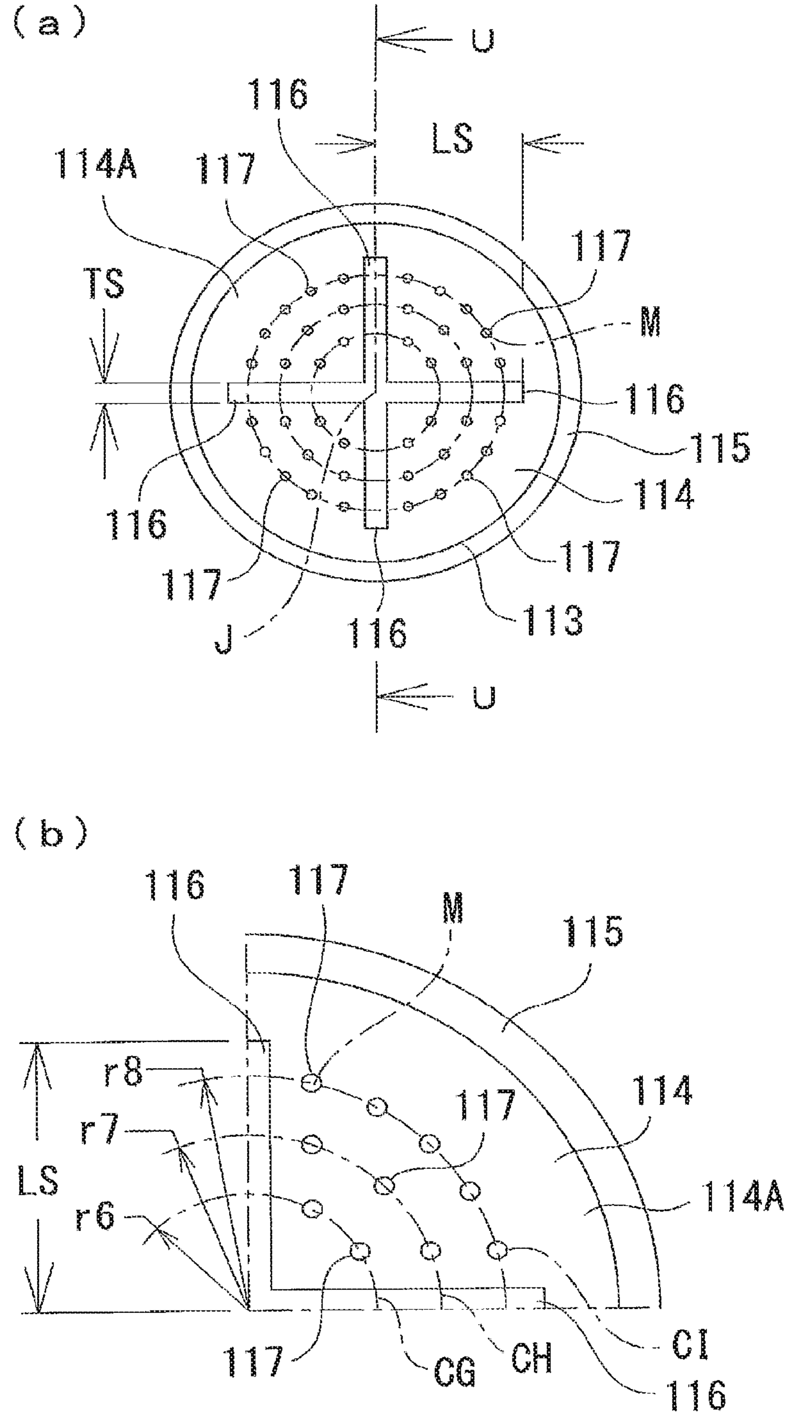

[FIG. 48]
(a)
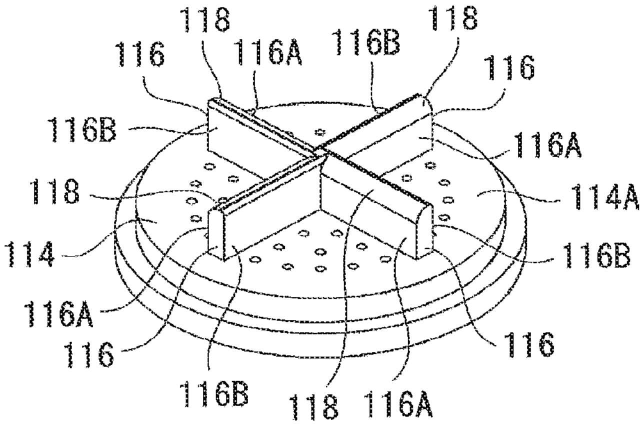
(b)
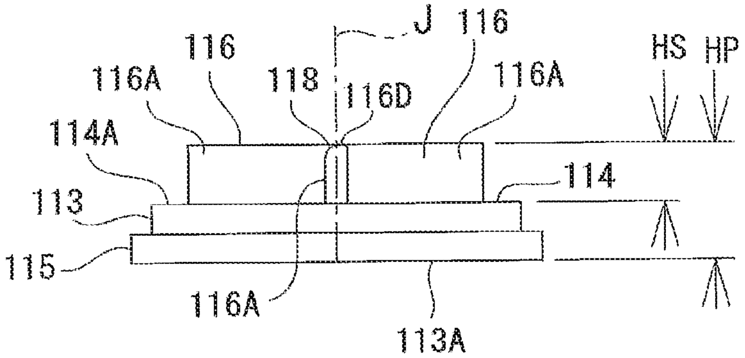
(c)
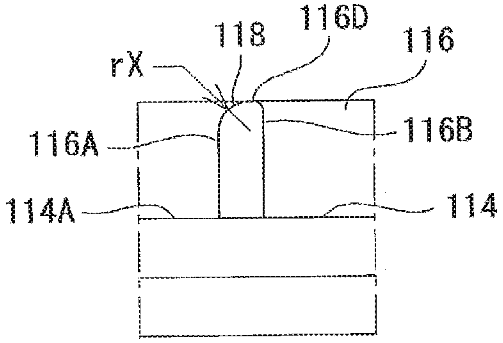

[FIG. 49]
(a)
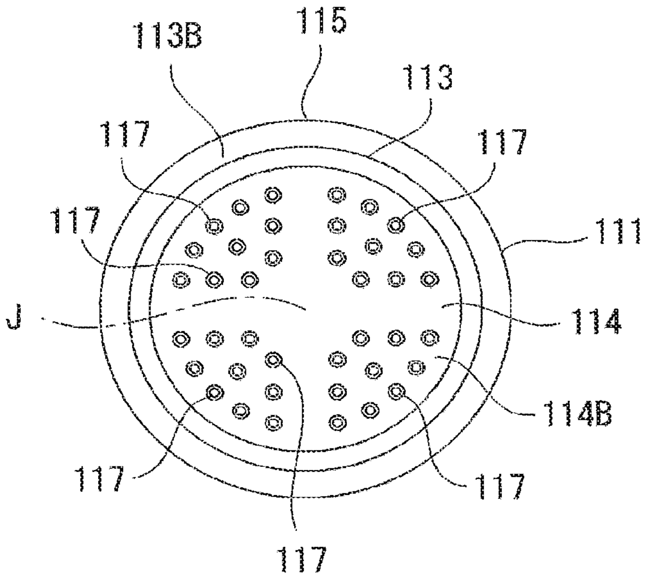
(b)
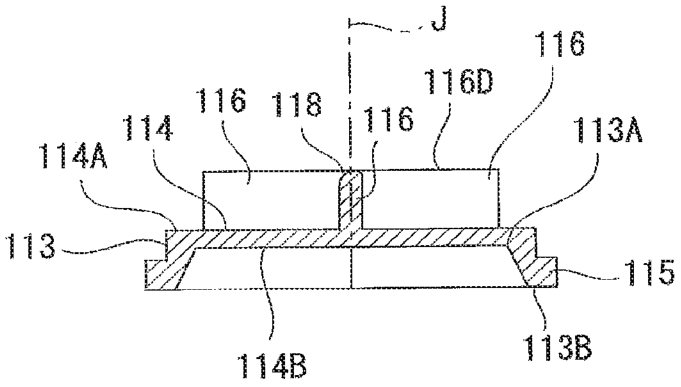

[FIG. 50]
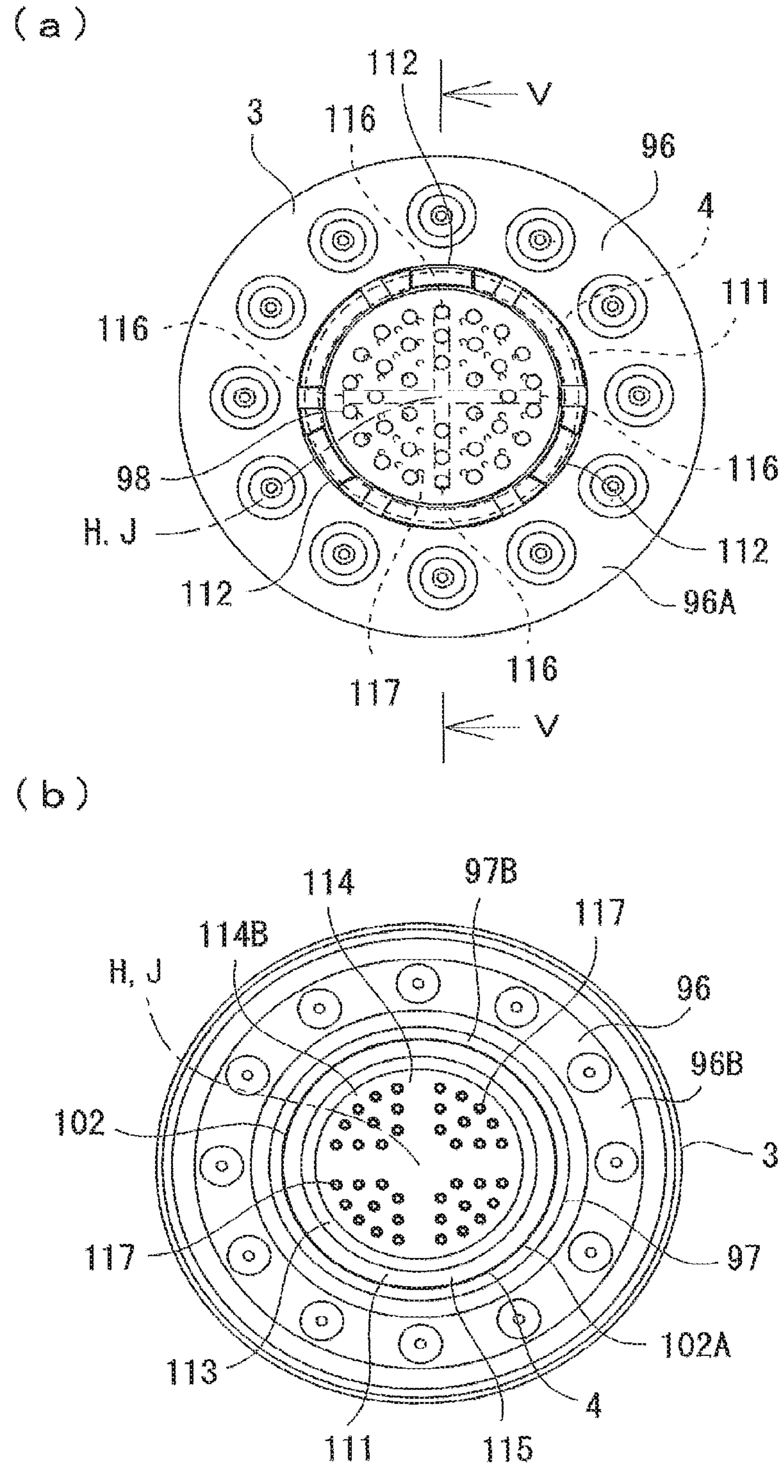

[FIG. 51]
(a)
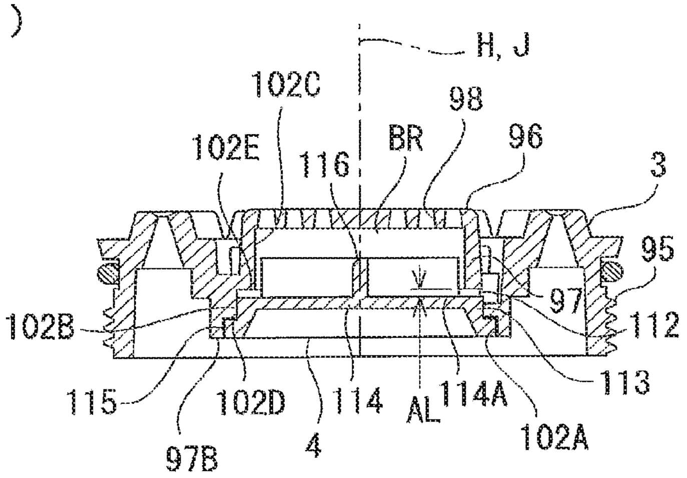
(b)
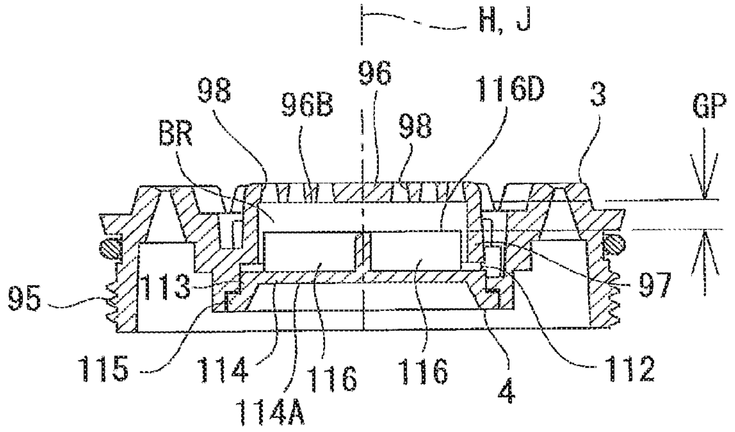

[FIG. 52]
(a)
(b)
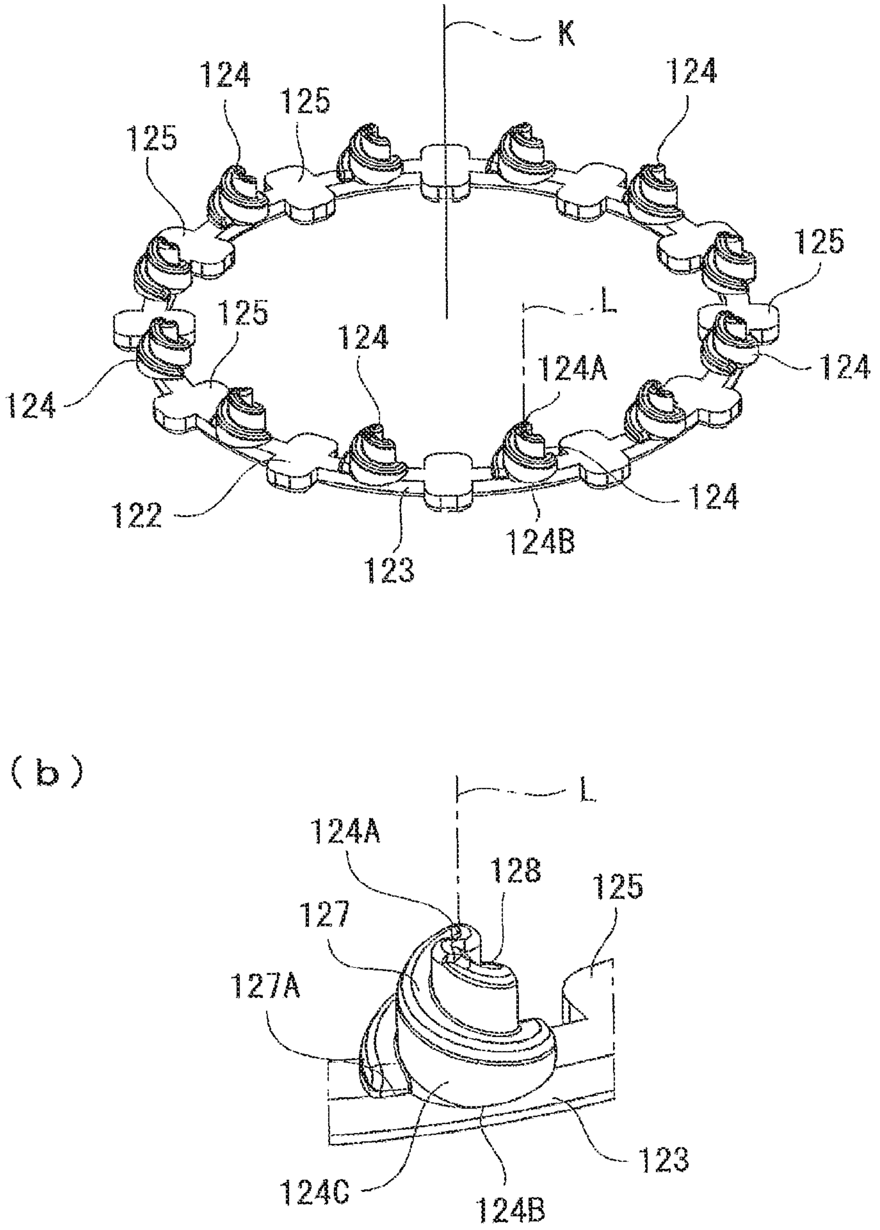

[FIG. 53]
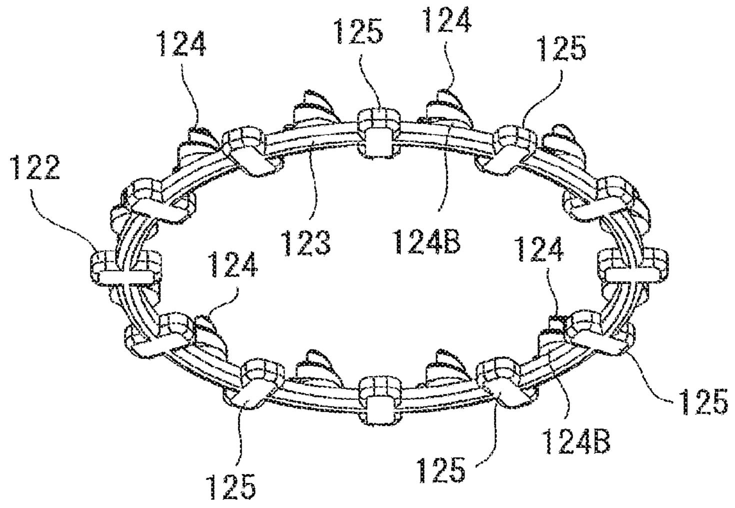

[FIG. 54]
(a)
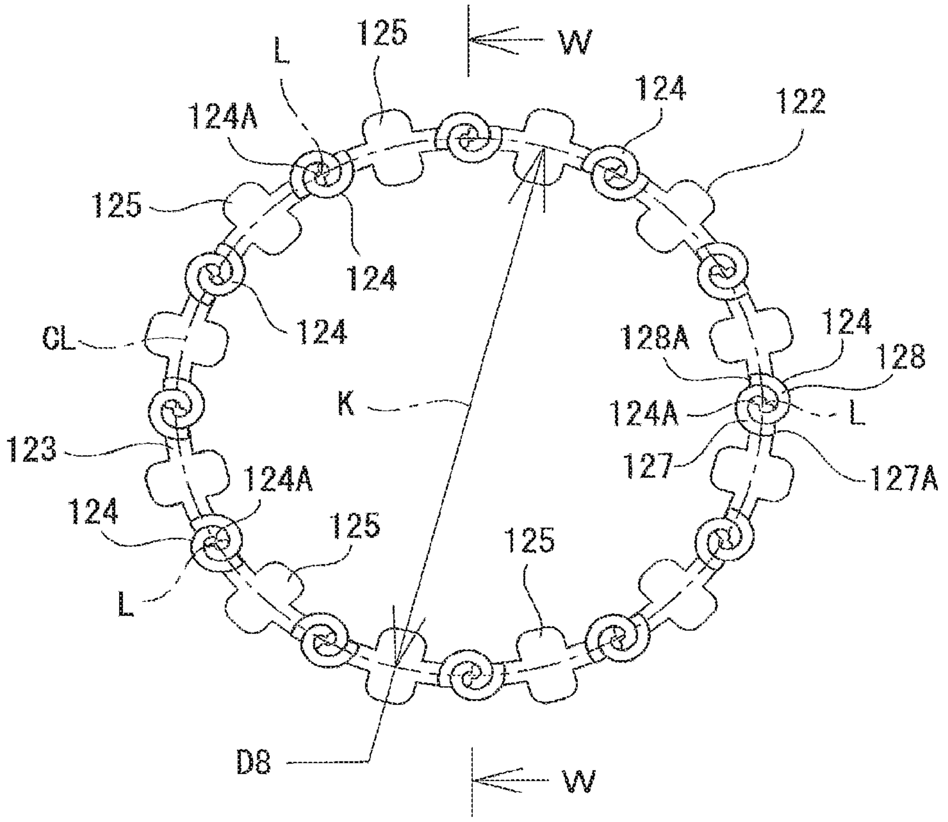
(b)
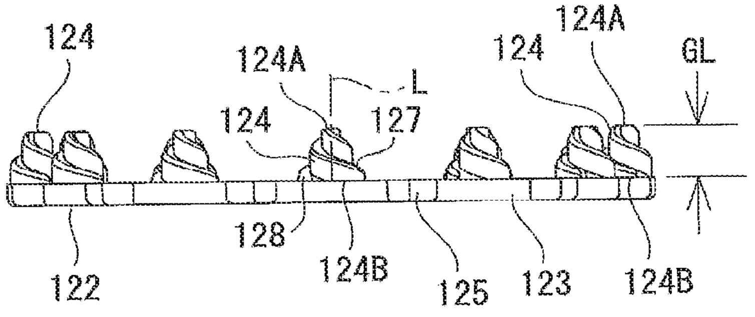

[FIG. 55]
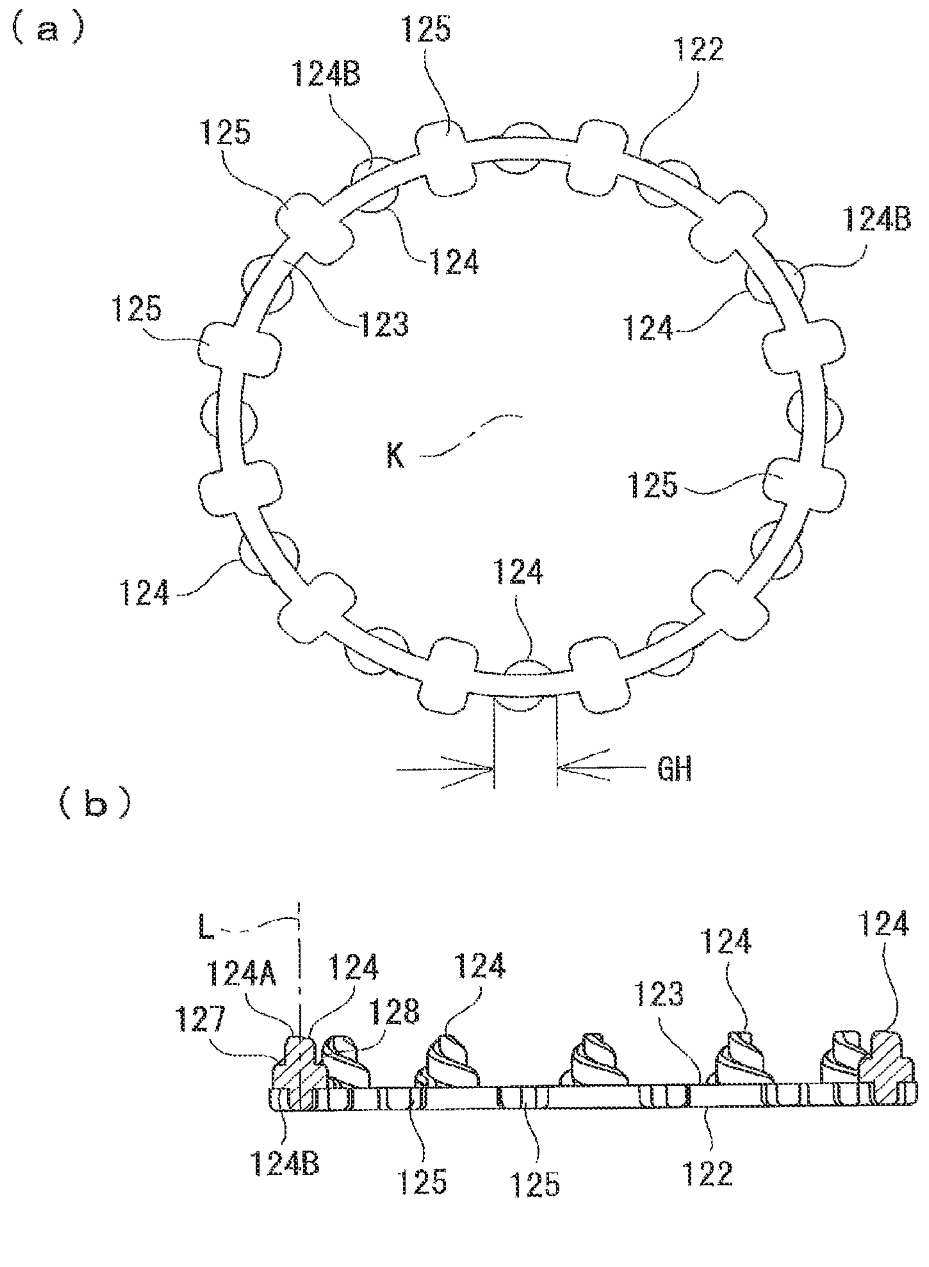

[FIG. 56]
(a)
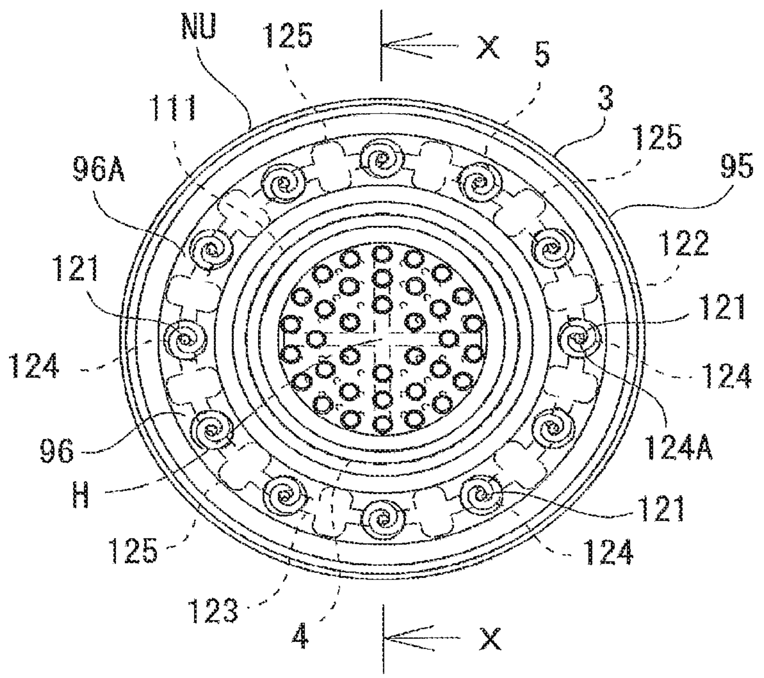
(b)
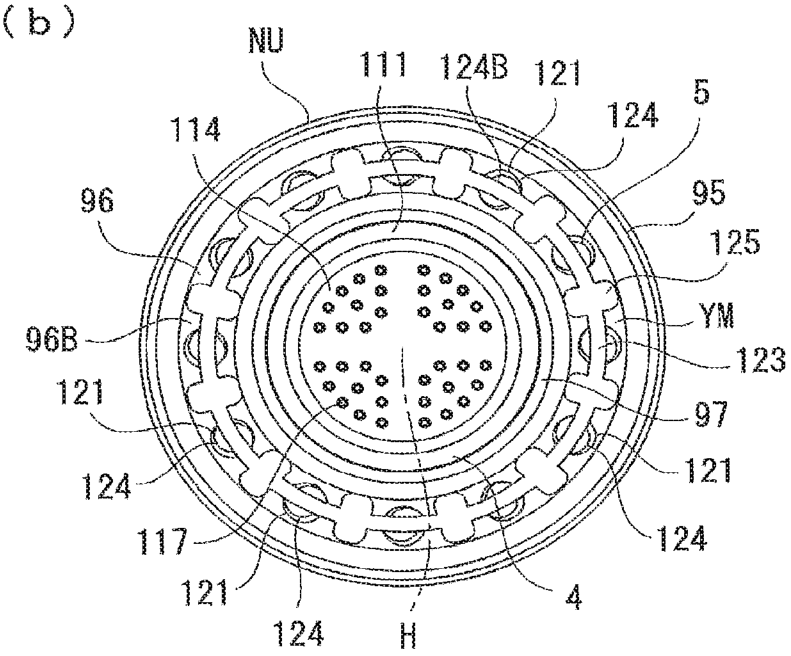

[FIG. 57]
(a)
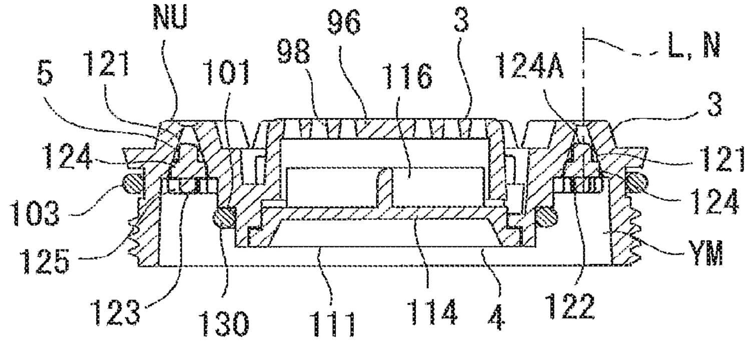
(b)
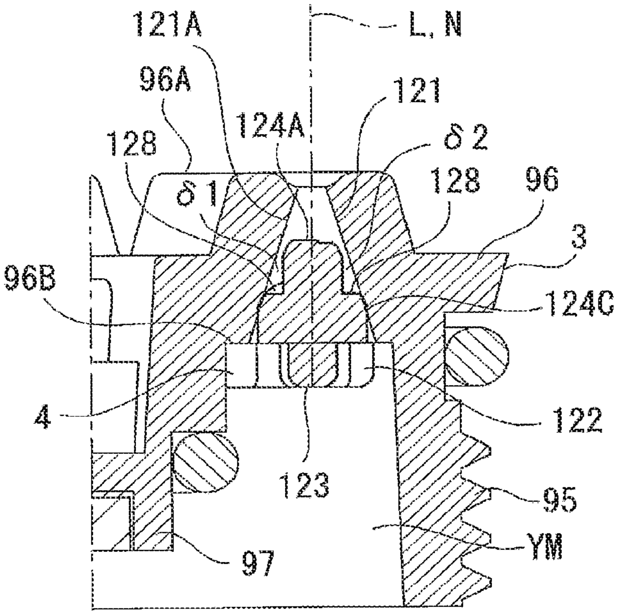

[FIG. 58]
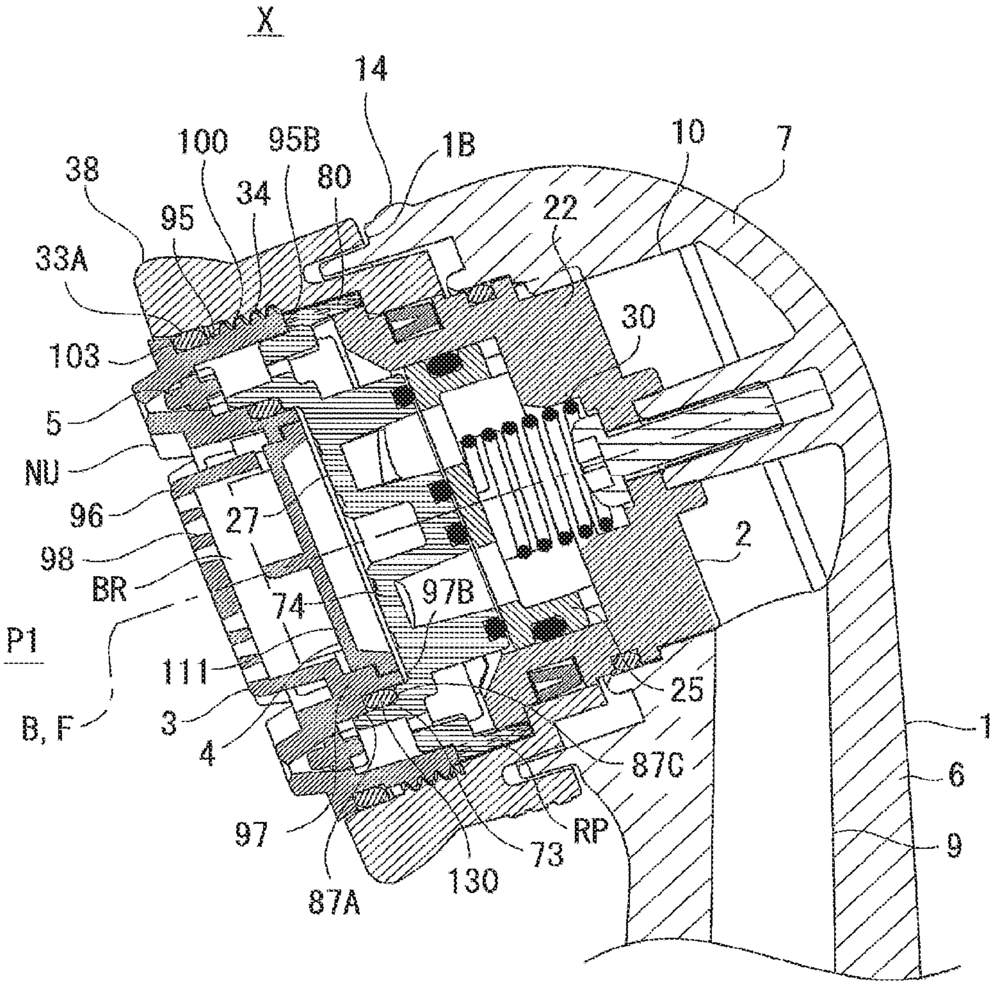

[FIG. 59]
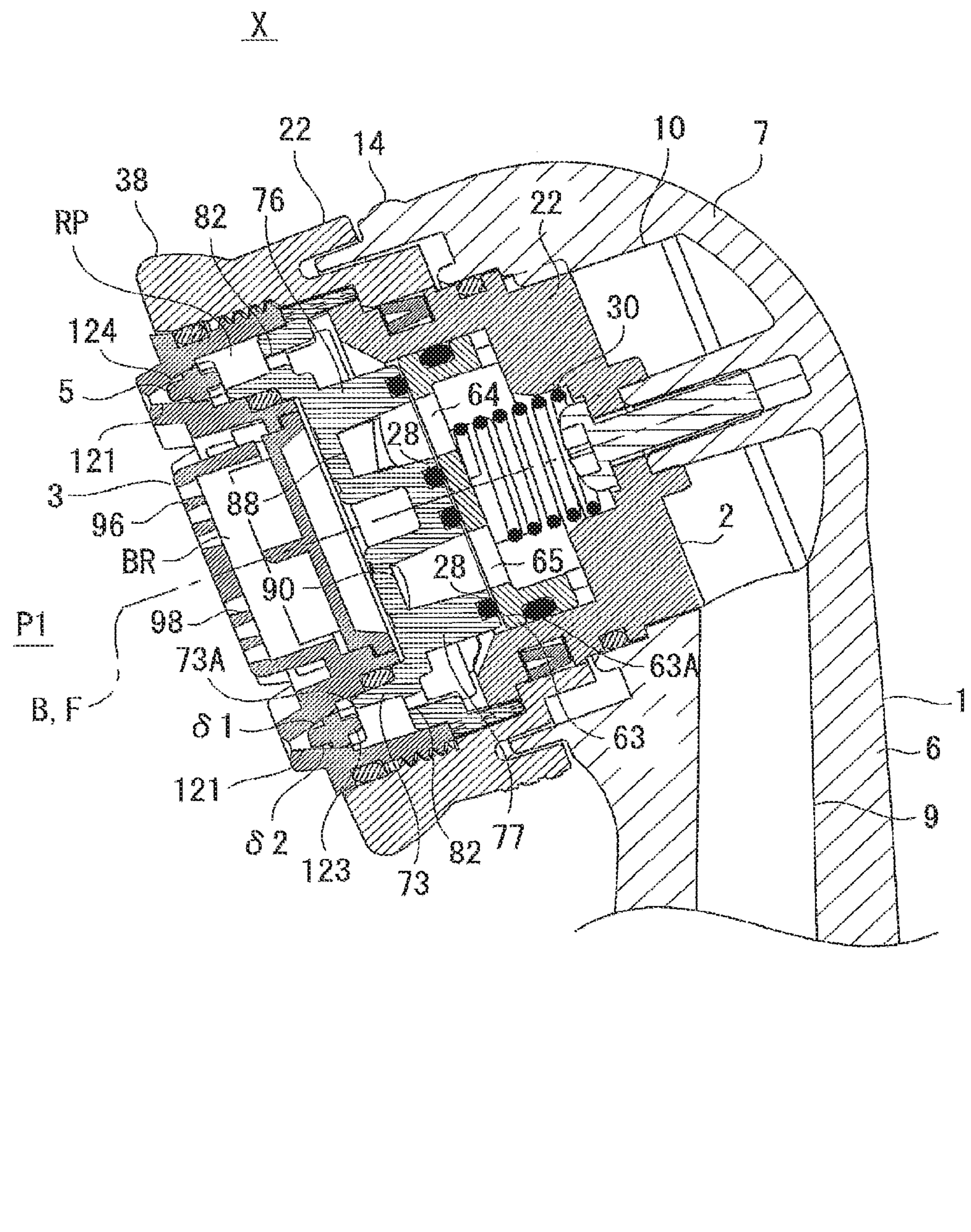

[FIG. 60]
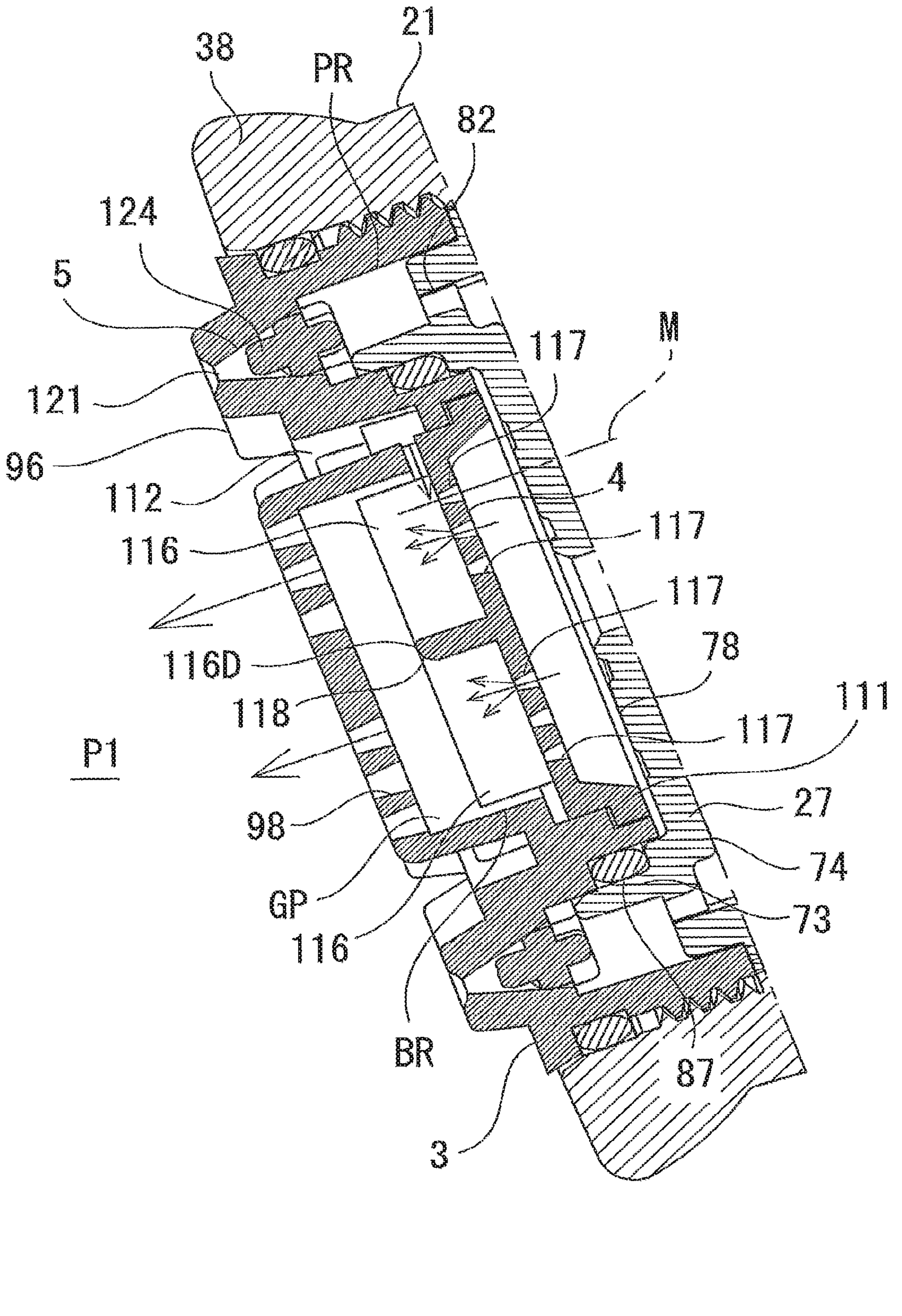

[FIG. 61]
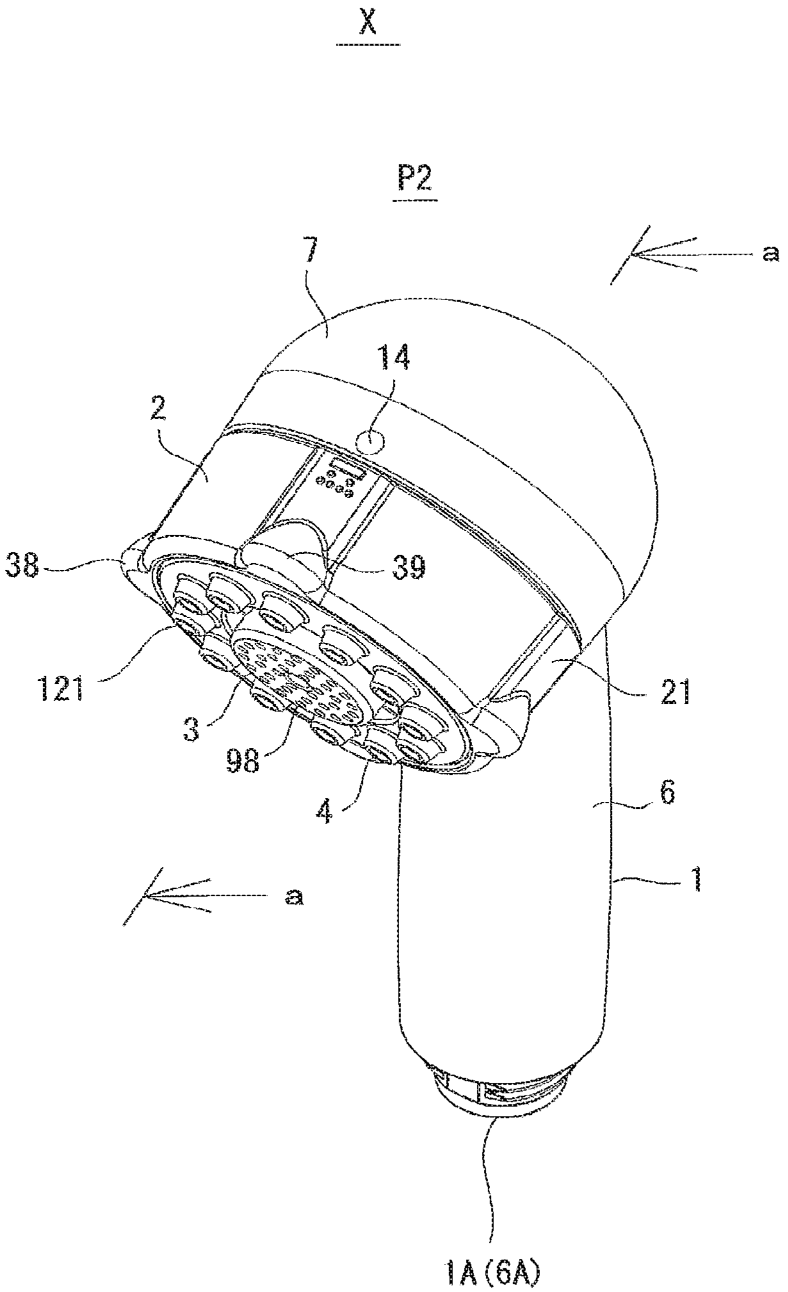

[FIG. 62]
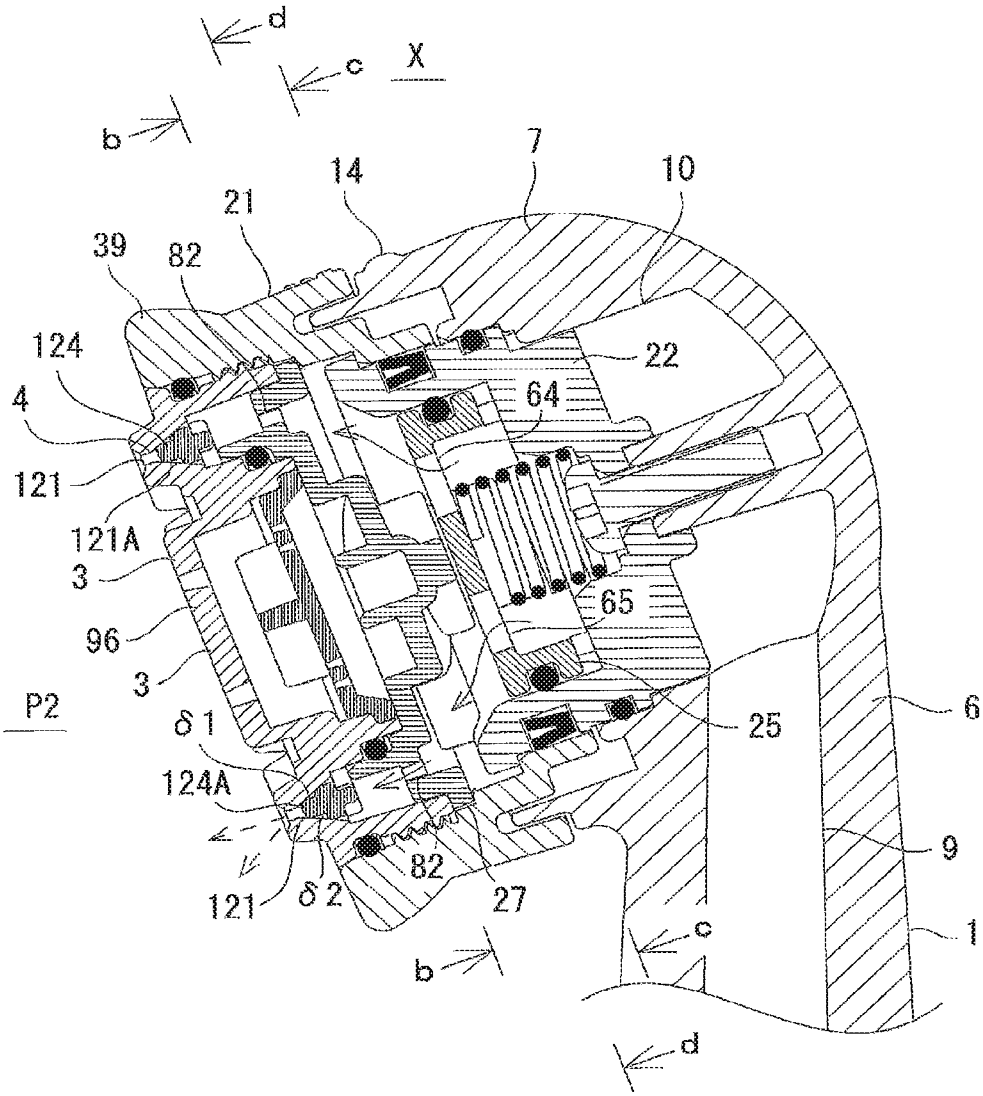

[FIG. 63]
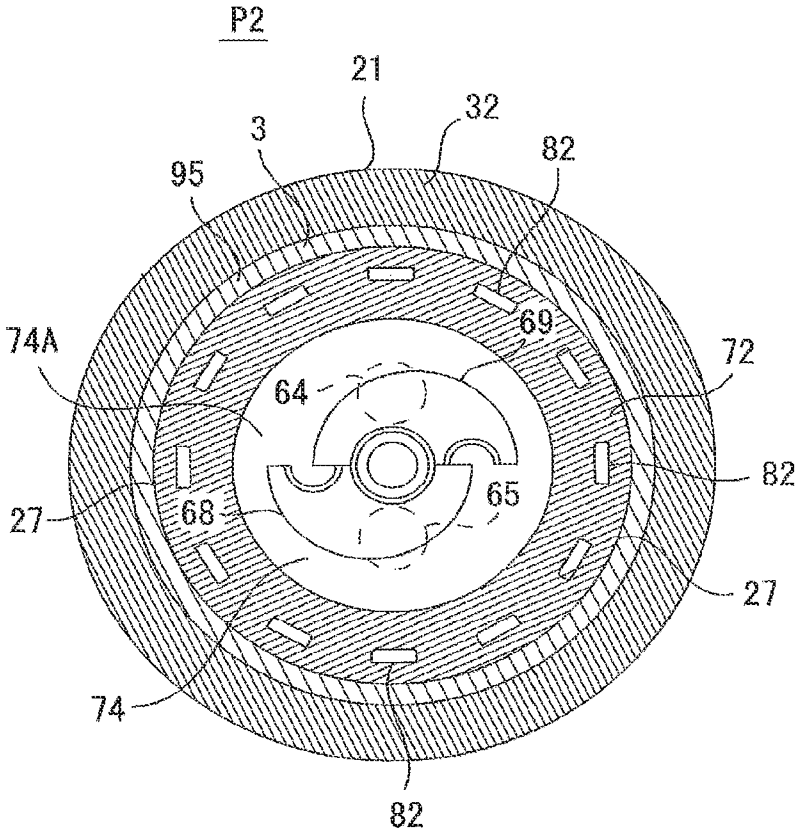

[FIG. 64]
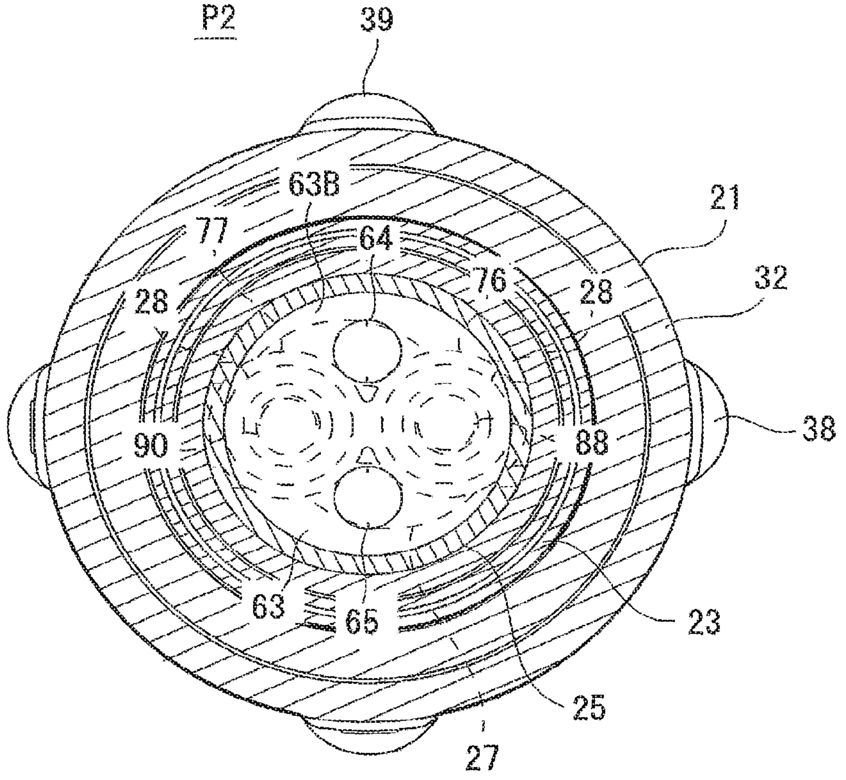

[FIG. 65]
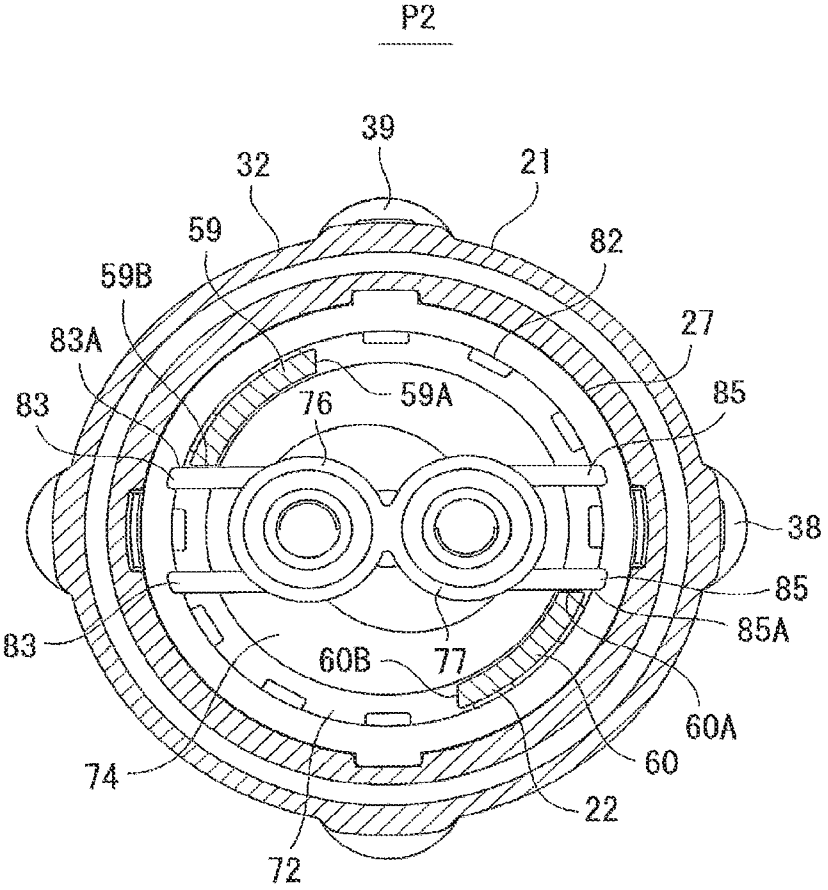

[FIG. 66]
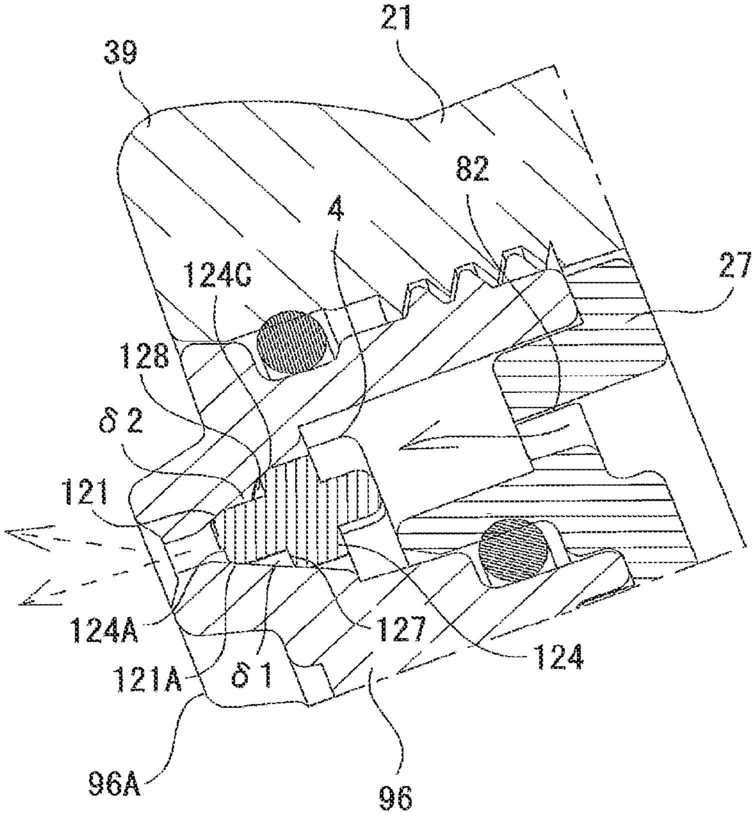

[FIG. 67]
(a)
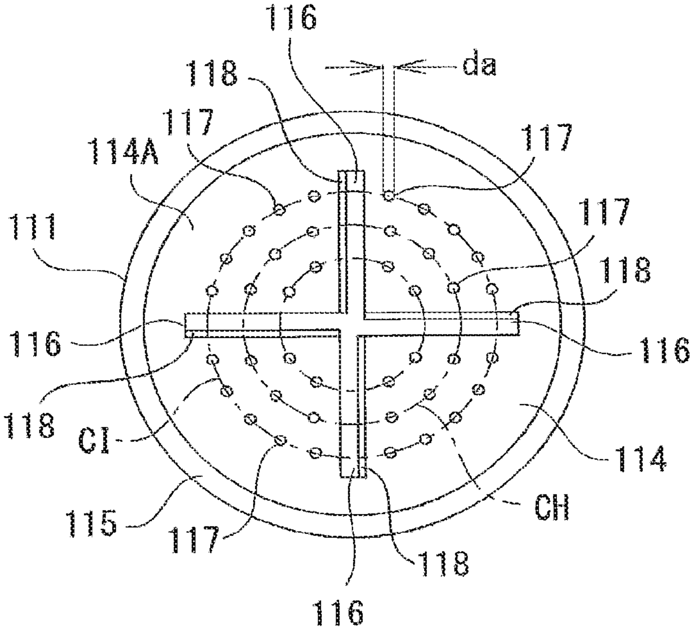
(b)
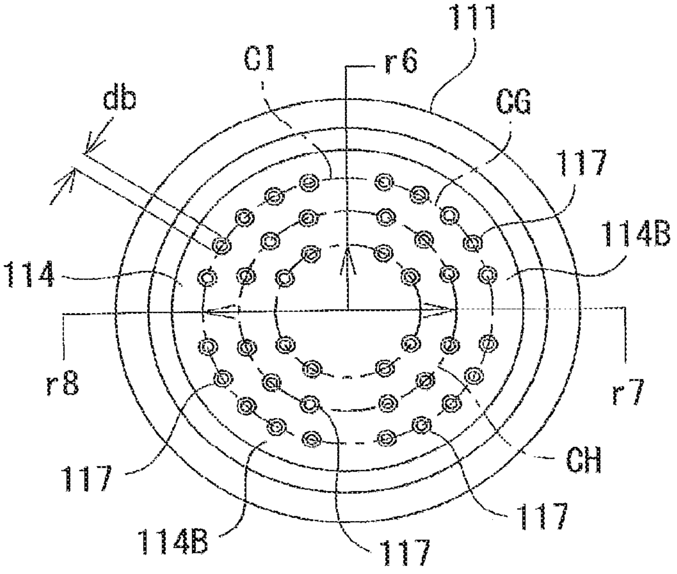

[FIG. 68]
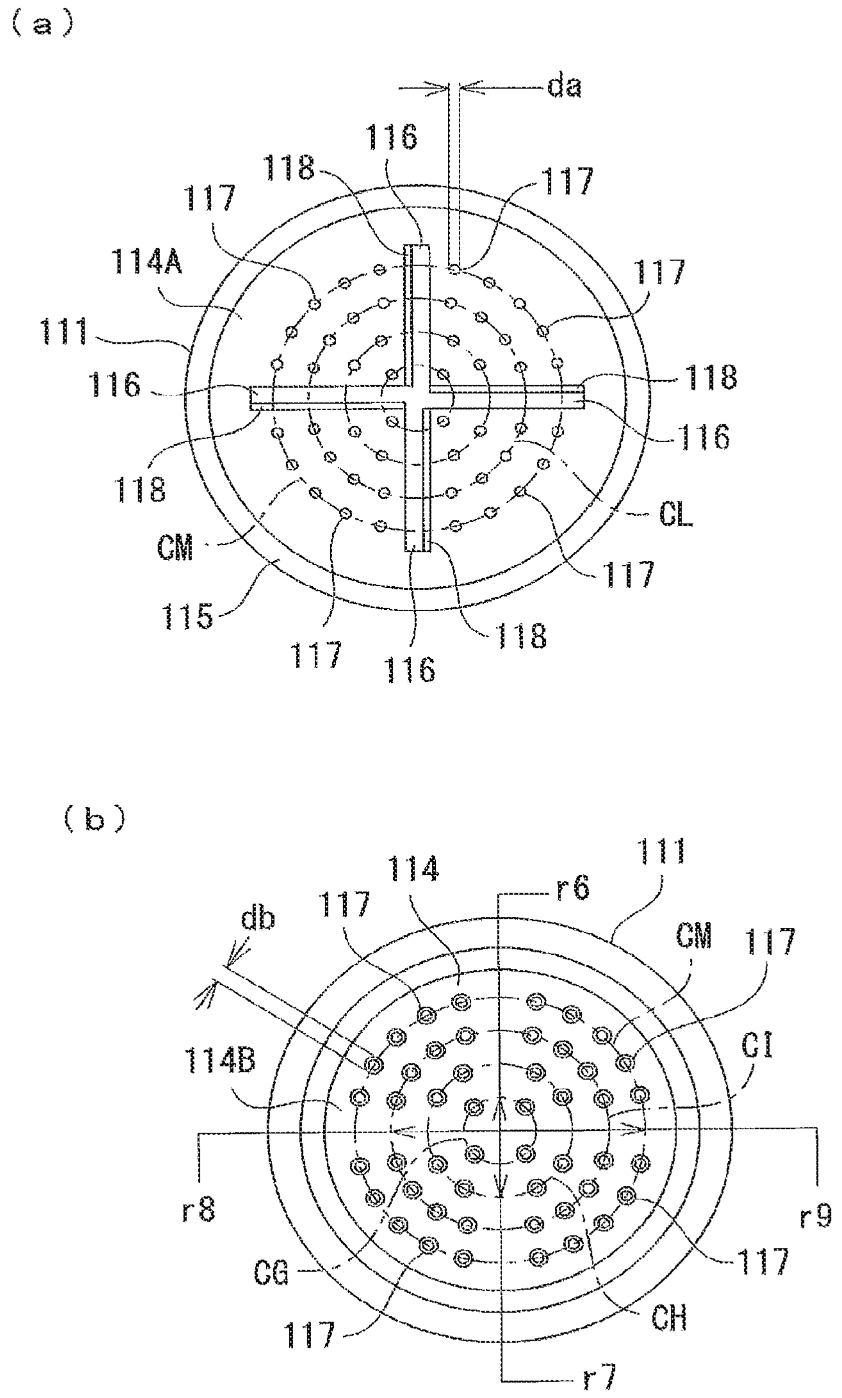

[FIG. 69]
(a)
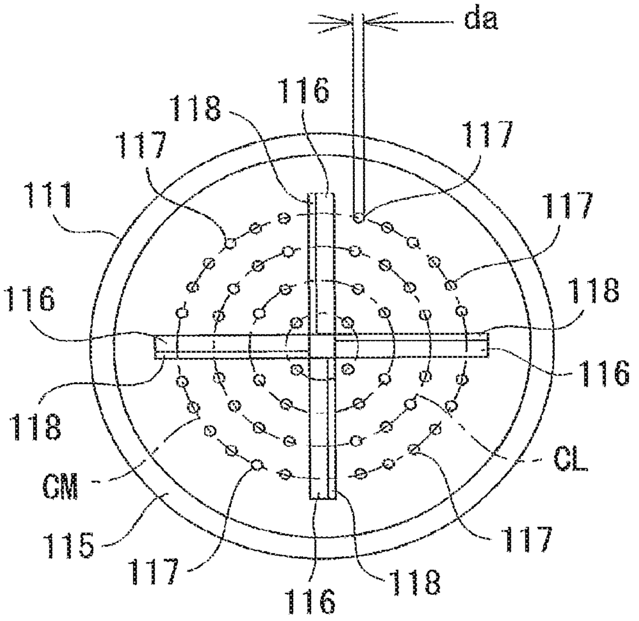
(b)
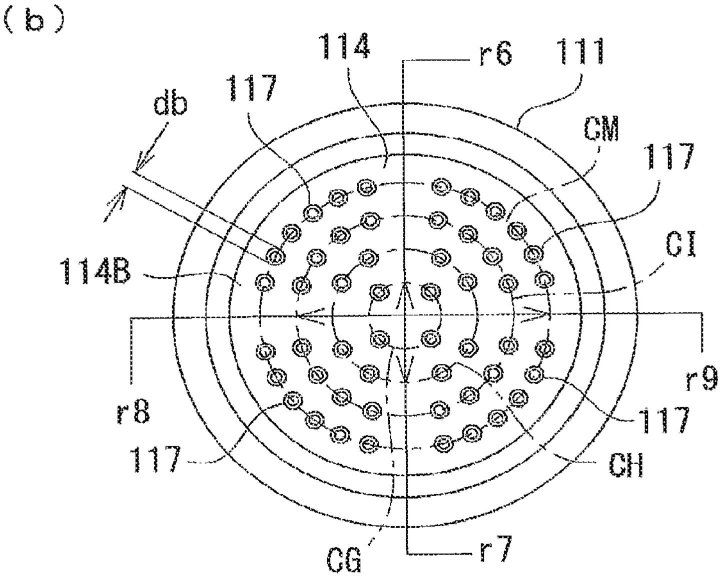

SHOWERHEAD AND BUBBLE GENERATING UNIT

TECHNICAL FIELD

The present invention relates to a shower head configured to generate an air bubble-liquid mixture by mixing the air (air bubbles) into a liquid, or form a liquid into a mist of liquid droplets in which air bubbles are mixed, and jet the air bubble-liquid mixture or the mist of liquid droplets.

BACKGROUND ART

As a technology of mixing the air into a liquid, Patent Literature 1 discloses a shower apparatus. In the shower apparatus, the liquid is jetted through a plurality of nozzle portions into a reduced tapered portion. When the liquid is jetted through the nozzle portions, the air is introduced through air inlets into the reduced tapered portion.

In the shower apparatus of Patent Literature 1, as a result of collision of the liquid and the air with the reduced tapered portion, air bubbles are mixed into the liquid.

CITATION LIST

Patent Literature

[PTL 1] Japanese Unexamined Patent Application Publication No. 2002-102100

SUMMARY OF INVENTION

Technical Problem

However, in Patent Literature 1, as a result of collision of the liquid and the air with the reduced tapered portion, the air bubbles are mixed into the liquid. Thus, there is the possibility that a sufficient volume of the air bubbles cannot be mixed into the liquid.

The present invention provides a shower head capable of mixing a sufficient volume of air bubbles into a liquid.

The present invention provides a shower head configured to form a liquid into a mist of liquid droplets in which air bubbles are mixed.

Solution to Problem

According to a first aspect of the present invention, there is provided a shower head including a shower main body including an inflow passage into which a liquid is caused to flow, and an outflow passage through which the liquid having flowed into the inflow passage is caused to flow out, the inflow passage being opened to one end of the shower main body, the outflow passage being opened to the other end of the shower main body;

a shower nozzle mounted to the other end of the shower main body, the shower nozzle including a shower nozzle plate;

a shower cylindrical portion, which has one cylinder end closed by the shower nozzle plate, is protruded to the outflow passage side, and defines an air bubble mixing space into which the liquid flowed out through the outflow passage is caused to flow from the other cylinder end of the shower cylindrical portion; and a plurality of air bubble-liquid mixture jetting holes formed in the shower nozzle plate so as to be opened in the air bubble mixing space and configured to cause an air bubble-liquid mixture to jet out of the air bubble mixing space therethrough; and air bubble-liquid mixture generating means configured to generate the air bubble-liquid mixture by mixing the air into the liquid, the air bubble-liquid mixture generating means including a flow-adjustment piece arranged in the air bubble mixing space in the shower cylindrical portion; and a plurality of air introduction passages formed in the shower nozzle, and configured to cause the air to flow into the air bubble mixing space therethrough, the flow-adjustment piece including a flow-adjustment nozzle disk arranged in the air bubble mixing space at a distance from the shower nozzle plate, and fixed to the shower cylindrical portion so as to close the other cylinder end of the shower cylindrical portion;

a plurality of flow-adjustment-piece plates formed on the flow-adjustment nozzle disk, and arranged in the air bubble mixing space between the shower nozzle plate and the flow-adjustment nozzle disk; and a plurality of liquid throttle holes formed in a portion of the flow-adjustment nozzle disk between the flow-adjustment-piece plates, and configured to cause the liquid flowed out through the outflow passage to jet into the air bubble mixing space therethrough, wherein the liquid throttle holes are formed to pass through the flow-adjustment nozzle disk so that a hole center line of each of the liquid throttle holes is arranged in parallel to a cylinder center line of the shower cylindrical portion, wherein the flow-adjustment-piece plates are protruded from the flow-adjustment nozzle disk toward the shower nozzle, and are arranged with a mixing gap separating from the shower nozzle plate, wherein the flow-adjustment-piece plates are arranged to extend from a plate center line of the flow-adjustment nozzle disk toward the shower cylindrical portion, wherein each of the flow-adjustment-piece plates causes the liquid jetted through the liquid throttle holes to flow turbulently and flow into the mixing gap on a protruding end side protruding toward the shower nozzle, wherein the air introduction passages are opened in the shower nozzle, and wherein the air introduction passages are formed to pass through the shower cylindrical portion between the protruding end of each of the flow-adjustment-piece plates and the flow-adjustment nozzle disk in a direction orthogonal to the cylinder center line of the shower cylindrical portion and are opened into the air bubble mixing space.

According to a second aspect of the present invention, in the shower head according to the first aspect described above, the flow-adjustment-piece plates are arranged at equal intervals in the circumferential direction of the flow-adjustment nozzle disk.

According to a third aspect of the present invention, in the shower head according to the first aspect described above, the flow-adjustment piece includes four flow-adjustment-piece plates, and the four flow-adjustment-piece plates are arranged at equal intervals in the circumferential direction of the flow-adjustment nozzle disk.

According to a fourth of the present invention, in the shower head according to any one of the first to third aspects described above, the flow-adjustment-piece plates are each formed into a rectangular shape, and the flow-adjustment-piece plates each include flow-adjustment flat surfaces each formed into a rectangular shape so as to be parallel to each other with an interval equal to a thickness of each of the flow-adjustment-piece plates in the circumferential direction of the flow-adjustment nozzle disk, and a flow inclined surface formed to incline and extend from the protruding end of each of the flow-adjustment-piece plates toward one of the flow-adjustment flat surfaces and the flow-adjustment nozzle disk.

According to a fifth of the present invention, in the shower head according to any one of the first to fourth aspects described above, the plurality of liquid throttle holes are arranged at equal intervals on each of a plurality of circles having different radii with a plate center line of the flow-adjustment nozzle disk being a center.

According to a sixth aspect of the present invention, in the shower head according to any one of the first to fifth aspects described above, the air introduction passages are arranged at equal intervals in the circumferential direction of the shower cylindrical portion.

According to a seventh aspect of the present invention, in the shower head according to any one of the first to sixth aspects described above, the air introduction passages are adjacent to the flow-adjustment nozzle disk, and are opened into the air bubble mixing space.

In a seventh aspect described above, the following configuration may also be adopted. Specifically, the air introduction passages are arranged at equal intervals in the circumferential direction of the shower cylindrical portion. Further, the air introduction passages each have a flow passage width larger than a plate width of each of the flow-adjustment-piece plates in the circumferential direction of the shower cylindrical portion, and are opened into the air bubble mixing space.

According to an eighth aspect of the present invention, in the shower head according to any one of the first to the seventh aspects described above, the shower head further includes flow passage switching means arranged between the air bubble-liquid mixture generating means and the outflow passage and in the outflow passage of the shower main body; and mist generating means arranged on the shower nozzle plate on an outer side of the air bubble-liquid mixture jetting holes, and configured to form the liquid, which is caused to flow into the mist generating means through the flow passage switching means, into a mist of liquid droplets, the mist generating means including a plurality of mist throttle holes, which are formed to pass through the shower nozzle plate on the outer side of the air bubble-liquid mixture jetting holes, and are opened between the shower nozzle plate and the flow passage switching means; and a plurality of mist guides, which are each formed into a conical spiral shape, and each include a plurality of spiral surfaces each having the same spiral shape, the mist throttle holes are each formed into a conical hole passing through the shower nozzle plate and having a diameter gradually reducing from the outflow passage side, the spiral surfaces are arranged between a cone bottom flat surface and a cone upper surface of each of the mist guides to cross a cone side surface of each of the mist guides, and are each formed into a spiral shape having a diameter gradually reducing from the cone bottom flat surface toward the cone upper surface, each of the mist guides is inserted into each of the mist throttle holes from the cone upper surface with a gap between the cone side surface and a conical inner peripheral surface of each of the mist throttle holes, each of the mist guides is fitted in each of the mist throttle holes so as to define a plurality of mist flow passages each having a spiral shape between the spiral surfaces and the conical inner peripheral surface, the mist flow passages are opened into each of the mist throttle holes, and are opened between the shower nozzle and the flow passage switching means, and the flow passage switching means allows connection between the liquid throttle holes and the outflow passage, or allows connection between the mist throttle holes and the outflow passage.

According to a ninth aspect of the present invention, in the shower head according to the eighth aspect described above, the mist generating means includes a plurality of mist guides, which are each formed into a conical spiral shape, and each include first and second spiral surfaces each having the same spiral shape, the first and second spiral surfaces are arranged between the cone bottom flat surface and the cone upper surface to cross the cone side surface of each of the mist guides, the first and second spiral surfaces are arranged so as to be point symmetrical with respect to a cone center line of each of the mist guides, the first and second spiral surfaces are each formed into a spiral shape having a diameter gradually reducing from the cone bottom flat surface toward the cone upper surface, each of the mist guides is inserted into each of the mist throttle holes from the cone upper surface with the gap between the cone side surface and the conical inner peripheral surface of each of the mist throttle holes, each of the mist guides defines first and second mist flow passages each having a spiral shape between the first and second spiral surfaces and the conical inner peripheral surface, and the first and second mist flow passages are opened in each of the mist throttle holes, and are opened between the shower nozzle and the flow passage switching means.

According to a tenth aspect of the present invention, in the shower head according to the eighth or ninth aspect described above, the mist throttle holes are arranged at equal intervals on a circle that has a center along the cylinder center line of the shower cylindrical portion and is located on the outer side of the air bubble-liquid mixture jetting holes.

According to an eleventh of the present invention, in the shower head according to the tenth aspect described above, the mist generating means includes a guide ring having a radius equal to a radius of the circle on which the mist throttle holes are arranged, the mist guides are arranged at equal intervals in the circumferential direction of the guide ring, each of the mist guides is fixed integrally with the guide ring so that the cone bottom flat surface is abutted on the guide ring, the guide ring is externally fitted to the shower cylindrical portion from the other cylinder end, and is arranged on the outer side of the air bubble-liquid mixture jetting holes, and, along with the insertion of the mist guides into the mist throttle holes, the guide ring is brought into abutment against the shower nozzle plate from the outflow passage side.

According to a twelfth aspect of the present invention, there is provided a shower head, including a shower main body including an inflow passage into which a liquid is caused to flow, and an outflow passage through which the liquid having flowed into the inflow passage is caused to flow out, the inflow passage being opened to one end of the shower main body, the outflow passage being opened to the other end of the shower main body; a shower nozzle mounted to the other end of the shower main body; and mist generating means arranged on the shower nozzle, and configured to form the liquid having flowed out through the outflow passage into a mist of liquid droplets, the mist generating means including a plurality of mist throttle holes, which are formed to pass through the shower nozzle, and communicate with the outflow passage; and a plurality of mist guides, which are each formed into a conical spiral shape, and each include a plurality of spiral surfaces having the same spiral shape, wherein the mist throttle holes are each formed into a conical hole passing through the shower nozzle and having a diameter gradually reducing from the outflow passage side, wherein the spiral surfaces are arranged between a cone bottom flat surface and a cone upper surface of each of the mist guides to cross a cone side surface of each of the mist guides, and are each formed into a spiral shape having a diameter gradually reducing from the cone bottom flat surface toward the cone upper surface, wherein each of the mist guides is inserted into each of the mist throttle holes from the cone upper surface with a gap between the cone side surface and a conical inner peripheral surface of each of the mist throttle holes, wherein each of the mist guides is fitted in each of the mist throttle holes so as to define a plurality of mist flow passages each having a spiral shape between the spiral surfaces and the conical inner peripheral surface, and wherein the mist flow passages are opened into each of the mist throttle holes, and communicate with the outflow passage.

According to a thirteenth aspect of the present invention, in the shower head according to the twelfth aspect described above, the mist generating means includes a plurality of mist guides, which are each formed into a conical spiral shape, and each include first and second spiral surfaces each having the same spiral shape, the first and second spiral surfaces are arranged between the cone bottom flat surface and the cone upper surface to cross the cone side surface of each of the mist guides, the first and second spiral surfaces are arranged so as to be point symmetrical with respect to a cone center line of each of the mist guides, the first and second spiral surfaces are each formed into a spiral shape having a diameter gradually reducing from the cone bottom flat surface toward the cone upper surface, each of the mist guides is inserted into each of the mist throttle holes from the cone upper surface with the gap between the cone side surface and the conical inner peripheral surface of each of the mist throttle holes, each of the mist guides defines first and second mist flow passages each having a spiral shape between the first and second spiral surfaces and the conical inner peripheral surface, and the first and second mist flow passages are opened into each of the mist throttle holes, and communicate with the outflow passage.

Advantageous Effects of Invention

According to the first aspect of the present invention, the liquid is caused to flow into the inflow passage from the one end of the shower main body, and the liquid is caused to flow through the inflow passage into the outflow passage. The liquid is caused to flow out through the outflow passage into the liquid throttle holes of the flow-adjustment piece. Through the liquid throttle holes, the liquid having flowed out through the outflow passage is jetted into the air bubble mixing space. Through the liquid throttle holes, the liquid is jetted into the air bubble mixing space toward the shower nozzle plate. In the air bubble mixing space (or in the shower cylindrical portion), the liquid is jetted between the shower nozzle and the flow-adjustment nozzle disk while flowing (being adjusted in flow) in parallel to the cylinder center line of the shower cylindrical portion.

When the liquid is jetted into the air bubble mixing space, due to the flow of the liquid, the air is introduced through the air introduction passages into the air bubble mixing space. The air is caused to flow (jet) into the air bubble mixing space between the protruding ends of the flow-adjustment-piece plates and the flow-adjustment nozzle disk. The air is caused to flow (jet) between the flow-adjustment-piece plates in the air bubble mixing space.

The liquid jetted through the liquid throttle holes, and the air caused to flow (jet) out through the air introduction passages are mixed in the air bubble mixing space. In the air bubble mixing space, the liquid and the air are caused to flow turbulently on the protruding end side of each of the flow-adjustment-piece plates, and flow into the mixing gap between the flow-adjustment-piece plates and the shower nozzle plate.

Thus, in the mixing gap within the air bubble mixing space, due to the turbulent flow, the air mixed into the liquid is broken (divided) into micrometer-sized air bubbles (microbubbles) and nanometer-sized air bubbles (ultrafine bubbles).

The micrometer-sized air bubbles (microbubbles) and the nanometer-sized air bubbles (ultrafine bubbles) mix with and dissolve in the liquid.

The air bubble-liquid mixture, in which the micrometer-sized air bubbles (microbubbles) and the nanometer-sized air bubbles (ultrafine bubbles) are mixed, is jetted from the air bubble-liquid mixture jetting holes to the outside.

As described above, according to the first aspect of the present invention, the liquid throttle holes, the flow-adjustment-piece plates, and the air introduction passages of the flow-adjustment piece allow a sufficient volume of the micrometer-sized and nanometer-sized air bubbles (microbubbles and ultrafine bubbles) to be mixed and dissolved into the liquid.

In international standards "ISO20480-1" by International Organization for Standardization (ISO), an air bubble of from equal or greater than one micrometer to a hundred micrometer (μm) is defined as a "microbubble", and an air bubble of less than one micrometer is defined as an "ultrafine bubble" (the same applies in the following description).

According to the second aspect of the present invention, the liquid is jetted from the liquid throttle holes toward between the flow-adjustment-piece plates.

According to the third aspect of the present invention, the liquid is jetted equally from the liquid throttle holes toward between the four flow-adjustment-piece plates. The four flow-adjustment-piece plates allow a sufficient volume of the micrometer-sized and nanometer-sized air bubbles (microbubbles and ultrafine bubbles) to be mixed and dissolved into the liquid.

According to the fourth aspect of the present invention, —the flow inclined surfaces of the flow-adjustment-piece plates lead the liquid (adjusted in flow) jetted from the liquid throttle holes to the protruding ends of the flow-adjustment-piece plates, which allows the liquid and the air to flow turbulently into the mixing gap.

According to the fifth of the present invention, the liquid is jetted equally from each of the liquid throttle holes throughout the air bubble mixing space.

According to the sixth aspect of the present invention, the air is equally flowed (jetted) out between the flow-adjustment-piece plates through the air introduction passages.

According to the seventh aspect of the present invention, the air is flowed out into the air bubble mixing space from each of the air introduction passages adjacent to the flow-adjustment nozzle disk, which allows the air to be mixed into the liquid at the same time as the liquid is jetted from the liquid throttle holes.

According to the eighth aspect of the present invention, the flow passage switching means allows connection (communication) between the liquid throttle holes and the outflow passage, or allows connection (communication) between the mist throttle holes and the outflow passage.

The mist throttle holes and the outflow passages are connected to flow the liquid from the one end of the shower main body into the inflow passage and to flow the liquid from the inflow passage into the outflow passage. The liquid is caused to flow through the outflow passage into the mist throttle holes. In the mist throttle holes, the liquid is caused to flow through the mist flow passages having a spiral shape into the mist throttle holes. Further, the mist of liquid droplets is jetted from each of the mist throttle holes to the outside through the mist throttle holes.

The liquid is increased in pressure by flowing through the mist flow passages having a spiral shape, and is jetted into the mist throttle holes through the mist flow passages. Thus, the liquid jetted through the mist flow passages into the mist throttle holes flows turbulently at high pressure. Further, when the mist of liquid droplets is jetted from the mist throttle holes, an outlet side of each of the mist throttle holes (a side from which the mist of liquid droplets is jetted) is brought into a negative pressure state.

With the outlet side of each of the mist throttle holes brought into the negative pressure state, when the liquid, which is jetted into the mist throttle holes through the mist flow passages and flows turbulently at high pressure, passes through the outlet portion of each of the mist throttle holes, the air bubbles are separated out due to reduced pressure, and the air that is taken in at the time of jetting is broken up (divided) by the turbulent flow. Thus, the liquid is formed into the mist of liquid droplets in which the micrometer-sized air bubbles (microbubbles) and the nanometer-sized air bubbles (ultrafine bubbles) are mixed and dissolved.

The mist of liquid droplets in which the air bubbles are mixed is jetted from the mist throttle holes to the outside.

According to the eighth aspect described above, the mist guides and the mist throttle holes allow the mist of liquid droplets in which the micrometer-sized air bubbles (microbubbles) and the nanometer-sized air bubbles (ultrafine bubbles) are mixed and dissolved to be jetted to the outside.

According to the ninth aspect of the present invention, the plurality of minimum mist flow passages (spiral surfaces) allow the liquid to be formed into a sufficient mist of liquid droplets. With point symmetrical arrangement of the first and second spiral surfaces, the first and second mist flow passages are arranged so as to be opposed to (face to face) each other at the cone upper surface.

With this arrangement, the high-pressure liquid jetted into each of the mist throttle holes through the first and second mist flow passages is caused to collide with the cone upper surface and thereby is formed into the mist of liquid droplets in which a sufficient volume of the micrometer-sized air bubbles (microbubbles) and a sufficient volume of the nanometer-sized air bubbles (ultrafine bubbles) are mixed and dissolved.

According to the tenth aspect of the present invention, the liquid having flowed out through the outflow passage is distributed equally in the peripheral direction of the shower cylindrical portion, and is flowed into the mist throttle holes (or into the mist flow passages).

According to the eleventh aspect of the present invention, the mist guides are fixed to the guide ring, which prevents the mist guides from getting into the mist throttle holes due to the flow of the liquid even when the liquid is flowed through the outflow passage into the mist throttle holes.

According to the twelfth aspect of the present invention, the liquid is flowed from the one end of the shower main body into the inflow passage, and the liquid is caused to flow through the inflow passage into the outflow passage. The liquid is caused to flow through the outflow passage into the mist throttle holes. In the mist throttle holes, the liquid is caused to flow through the mist flow passages each having a spiral shape into the mist throttle holes. Further, the mist of liquid droplets is jetted from the mist throttle holes to the outside.

The liquid is increased in pressure by flowing through the mist flow passages each having a spiral shape, and is jetted into the mist throttle holes through the mist flow passages. Thus, the liquid jetted through the mist flow passages into the mist throttle holes flows turbulently at high pressure. Further, when the mist of liquid droplets is jetted from the mist throttle holes, an outlet side of each of the mist throttle holes (a side from which the mist of liquid droplets is jetted) is brought into a negative pressure state.

With the outlet side of each of the mist throttle holes brought into the negative pressure state, when the liquid, which is jetted into the mist throttle holes through the mist flow passages and flows turbulently at high pressure, passes through the outlet portion of each of the mist throttle holes, the air bubbles are separated out due to reduced pressure, and the air that is taken in at the time of jetting is broken (divided) by the turbulent flow. Thus, the liquid is formed into the mist of liquid droplets in which the micrometer-sized air bubbles (microbubbles) and the nanometer-sized air bubbles (ultrafine bubbles) are mixed and dissolved.

The mist of liquid droplets in which the air bubbles are mixed is jetted from the mist throttle holes to the outside.

According to the twelfth aspect described above, the mist guides and the mist throttle holes allow the mist of liquid droplets in which the micrometer-sized air bubbles (microbubbles) and the nanometer-sized air bubbles (ultrafine bubbles) are mixed and dissolved can be jetted to the outside.

According to the thirteenth aspect of the present invention, the plurality of minimum mist flow passages (spiral surfaces) allow the liquid to be formed into a sufficient mist of liquid droplets. With point symmetrical arrangement of the first and second spiral surfaces, the first and second mist flow passages are arranged so as to be opposed to (face to face) each other at the cone upper surface.

With this arrangement, the high-pressure liquid jetted into each of the mist throttle holes through the first and second mist flow passages is caused to collide with the cone upper surface, and thereby is formed into the mist of liquid droplets in which a sufficient volume of the micrometer-sized air bubbles (microbubbles) and a sufficient volume of the nanometer-sized air bubbles (ultrafine bubbles) are mixed and dissolved.

BRIEF DESCRIPTION OF DRAWINGS

FIG. 1 is a perspective view showing a shower head (at a shower position P1).

FIG. 2 is a sectional view taken along the arrows A-A in FIG. 1 (at the shower position P1).

FIG. 3 is a view seen from a direction indicated by the arrows B-B in FIG. 2 (at the shower position).

FIG. 4 is an exploded perspective view of the shower head—illustrating a shower main body, flow passage switching means (including a switching handle, a switching base, a sealing gasket, sealing rings, a switching valve seat element, a switching valve element, a fixing screw bolt, and a coil spring), a shower nozzle, air bubble-liquid mixture generating means (a flow-adjustment piece), and mist generating means (including mist guides and a guide ring).

FIG. 5 is a front view showing the shower main body.

FIG. 6 is a side view showing the shower main body.

FIG. 7 is a top view showing the shower main body.

FIG. 8 is a sectional view taken along the arrows C-C in FIG. 7.

FIG. 9 (*a*) is a top perspective view showing the switching handle of the flow passage switching means. FIG. 9 (*b*) is a bottom perspective view of the switching handle of the flow passage switching means.

FIG. 10 is a top view showing the switching handle of the flow passage switching means.

FIG. 11(*a*) is a side view showing the switching handle of the flow passage switching means.

FIG. 11(*b*) is a sectional view taken along the arrows D-D of FIG. 10.

FIG. 12 is a bottom view showing the switching handle of the flow passage switching means.

FIG. 13 (*a*) is a top perspective view showing the switching base of the flow passage switching means. FIG. 13(*b*) is a bottom perspective view showing the switching base of the flow passage switching means.

FIG. 14(*a*) is a top view showing the switching base of the flow passage switching means. FIG. 14(*b*) is a bottom view showing the switching base of the flow passage switching means.

FIG. 15(*a*) is a side view showing the switching base of the flow passage switching means. FIG. 15(*b*) is a sectional view taken along the arrows E-E of FIG. 14(*a*).

FIG. 16(*a*) is a top perspective view showing the switching valve seat element of the flow passage switching means. FIG. 16(*b*) is a bottom perspective view showing the switching valve seat element of the flow passage switching means.

FIG. 17(*a*) is a top view showing the switching valve seat element of the flow passage switching means. FIG. 17(*b*) is a bottom view showing the switching valve seat element of the flow passage switching means.

FIG. 18(*a*) is a side view showing the switching valve seat element of the flow passage switching means. FIG. 18(*b*) is a sectional view taken along the arrows F-F of FIG. 17(*a*).

FIG. 19(*a*) is a top perspective view showing the switching valve element of the flow passage switching means. FIG. 19(*b*) is a bottom perspective view showing the switching valve element of the flow passage switching means.

FIG. 20 is a top view showing the switching valve element of the flow passage switching means.

FIG. 21 are views showing the switching valve element of the flow passage switching means, in which FIG. 21(*a*) is a bottom view illustrating a relationship between respective cylindrical valve elements, and FIG. 21(*b*) is a bottom view illustrating a relationship between first regulating protruding portions and second handle regulating protruding portions.

FIG. 22 are views showing the switching valve element of the flow passage switching means, in which FIG. 22(*a*) is a side view seen from the first handle regulating protruding portions, and FIG. 22(*b*) is a side view seen from the second handle regulating protruding portions.

FIG. 23 is a sectional view taken along the arrows G-G of FIG. 20.

FIG. 24 are views showing the switching valve element of the flow passage switching means, in which FIG. 24(*a*) is a sectional view taken along the arrows H-H of FIG. 20, and FIG. 24(*b*) is a sectional view taken along the arrows I-I of FIG. 20.

FIG. 25 is a sectional view taken along the arrows J-J of FIG. 22(*b*).

FIG. 26 is a top view showing a handle unit (including the switching handle and the switching base) of the flow passage switching means.

FIG. 27 is a bottom view showing the handle unit (including the switching handle and the switching base) of the flow passage switching means.

FIG. 28 is a side view showing the handle unit (including the switching handle and the switching base) of the flow passage switching means.

FIG. 29 is a sectional view taken along the arrows K-K of FIG. 26.

FIG. 30 is an enlarged sectional view illustrating a state in which the handle unit (including the switching handle and the switching base) of the flow passage switching means is arranged in the shower main body.

FIG. 31 is a view seen from a direction indicated by the arrows L-L of FIG.

FIG. 32 is a sectional view taken along the arrows M-M of FIG. 30.

FIG. 33 is an enlarged sectional view illustrating a state in which the fixing screw bolt and the coil spring of the flow passage switching means are arranged in the shower main body.

FIG. 34 is a view seen from a direction indicated by the arrows N-N of FIG. 33.

FIG. 35 is an enlarged sectional view illustrating a state in which the switching valve seat element of the flow passage switching means is arranged in the switching base (or in the shower main body).

FIG. 36 is a view seen from a direction indicated by the arrows O-O of FIG. 35.

FIG. 37 is a sectional view taken along the arrows P-P of FIG. 35.

FIG. 38 is an enlarged sectional view illustrating a state in which the switching valve element of the flow passage switching means is arranged in the switching handle (or in the shower main body).

FIG. 39 is a view seen from a direction indicated by the arrows Q-Q of FIG. 38.

FIG. 40 is a sectional view taken along the arrows R-R of FIG. 38.

FIG. 41 is a sectional view taken along the arrows S-S of FIG. 38.

FIG. 42(*a*) is a top perspective view showing the shower nozzle. FIG. 42(*b*) is a bottom perspective view showing the shower nozzle.

FIG. 43(*a*) is a top view showing the shower nozzle. FIG. 43(*b*) is a partial enlarged view of FIG. 43(*a*).

FIG. 44(*a*) is a side view showing the shower nozzle. FIG. 44(*b*) is a sectional view taken along the arrows T-T of FIG. 43(*a*).

FIG. 45 is a bottom view showing the shower nozzle.

FIG. 46 are views for illustrating the flow-adjustment piece of the air bubble-liquid mixture generating means, in which FIG. 46(*a*) is a top perspective view showing the flow-adjustment piece of the air bubble-liquid mixture generating means. FIG. 46(*b*) is a bottom perspective view showing the flow-adjustment piece of the air bubble-liquid mixture generating means.

FIG. 47(*a*) is a top view showing the flow-adjustment piece of the air bubble-liquid mixture generating means. FIG. 47(*b*) is a partial enlarged view of FIG. 46(*a*).

FIG. 48 are views showing the flow-adjustment piece of the air bubble-liquid mixture generating means, in which FIG. 48(*a*) is a top perspective view showing flow-adjustment-piece plates and flow inclined surfaces, FIG. 48(*b*) is a side view, and FIG. 48(*c*) is a partial enlarged view of FIG. 48(*b*).

FIG. 49(*a*) is a bottom view showing the flow-adjustment piece of the air bubble-liquid mixture generating means. FIG. 49(*b*) is a sectional view taken along the arrows U-U of FIG. 47(*a*).

FIG. 50 are views illustrating a state in which the flow-adjustment piece is incorporated in the shower nozzle, in which FIG. 50(*a*) is a top view, and FIG. 50(*b*) is a bottom view.

FIG. 51 are sectional views taken along the arrows V-V of FIG. 50(*a*), in which FIG. 51(*a*) is a view illustrating a relationship between the flow-adjustment piece and a shower cylindrical portion, and FIG. 51(*b*) is a view illustrating a relationship between the flow-adjustment-piece plates and a shower nozzle plate.

FIG. 52(*a*) is a top perspective view showing a mist ring body (including the guide ring and the mist guides) of the mist generating means. FIG. 52(*b*) is a partial enlarged view of FIG. 52(*a*).

FIG. 53 is a bottom perspective view showing the mist ring body (including the guide ring and the mist guides) of the mist generating means.

FIG. 54(*a*) is a top view showing the mist ring body (including the guide ring and the mist guides) of the mist generating means. FIG. 54(*b*) is a side view showing the mist ring body (including the guide ring and the mist guides) of the mist generating means.

FIG. 55(*a*) is a bottom view showing the mist ring body (including the guide ring and the mist guides) of the mist generating means. FIG. 55(*b*) is a sectional view taken along the arrows W-W of FIG. 54(*a*).

FIG. 56 are views illustrating a state in which the mist ring body (including the guide ring and the mist guides) is incorporated in the shower nozzle, in which FIG. 56(*a*) is a top view, and FIG. 56(*b*) is a bottom view.

FIG. 57 are views illustrating a state in which the mist ring body (including the guide ring and the mist guides) is incorporated in the shower nozzle, in which FIG. 57(*a*) is a sectional view taken along the arrows X-X of FIG. 56(*a*), and FIG. 57(*b*) is a partial enlarged view of FIG. 57(*a*).

FIG. 58 is a partial enlarged view of FIG. 2 (at the shower position P1).

FIG. 59 is a partial enlarged view of FIG. 2 (at the shower position P1).

FIG. 60 is a partial enlarged view of FIG. 59 (at the shower position P1).

FIG. 61 is a perspective view showing the shower head (at a mist position P2).

FIG. 62 is a partial enlarged sectional view taken along the arrows a-a of FIG. 61 (at the mist position P2).

FIG. 63 is a sectional view taken along the arrows b-b of FIG. 62 (at the mist position P2).

FIG. 64 is a sectional view taken along the arrows c-c of FIG. 62 (at the mist position P2).

FIG. 65 is a sectional view taken along the arrows d-d of FIG. 62 (at the mist position P2).

FIG. 66 is a partial enlarged view of FIG. 62 for illustrating a relationship between a mist throttle hole and the mist guide (at the mist position P2).

FIG. 67 are views showing a flow-adjustment piece in Example 1 for a "shower test", in which FIG. 67(*a*) is a top view, and FIG. 67(*b*) is a bottom view.

FIG. 68 are views showing a flow-adjustment piece in Example 2 for the "shower test", in which FIG. 68(*a*) is a top view, and FIG. 68(*b*) is a bottom view.

FIG. 69 are views showing a flow-adjustment piece in Example 3 for the "shower test", in which FIG. 69(*a*) is a top view, and FIG. 69(*b*) is a bottom view.

DESCRIPTION OF EMBODIMENTS

A shower head according to the present invention is described with reference to FIG. 1 to FIG. 69.

A shower head X is configured to generate an air bubble-liquid mixture by mixing the air (air bubbles) into a liquid, or form a liquid into mist-like liquid droplets in which air bubbles are mixed, and jet the air bubble-liquid mixture or the mist-like (atomized) liquid droplets.

The liquid is water or hot water (the same applies in the following description). The air bubble-liquid mixture is air bubble-water mixture or air bubble-hot water mixture generated by mixing the air into water or hot water, or water or hot water in which microbubbles or ultrafine bubbles are mixed (the same applies in the following description).

As shown in FIG. 1 to FIG. 65, the shower head X includes a shower main body 1, flow passage switching means 2, a shower nozzle 3, air bubble-liquid mixture generating means 4, and mist generating means 5.

As shown in FIG. 1, FIG. 2, and FIG. 4 to FIG. 8, the shower main body 1 is made of a synthetic resin. The shower main body 1 includes a handle portion 6 and a head portion 7, and the handle portion 6 and the head portion 7 are formed integrally with each other. The handle portion 6 is formed into a cylindrical shape, and the head portion 7 is formed into a dome shape.

As shown in FIG. 5 to FIG. 8, the head portion 7 is arranged so that a dome top 7A side thereof is located at the other end 6B of the handle portion 6. The head portion 7 is fixed to the other end 6B of the handle portion 6 so as to be inclined toward the handle portion 6 side.

As shown in FIG. 5 and FIG. 8, the head portion 7 includes a shower space 7C and a shower cylindrical portion 8.

As shown in FIG. 5 and FIG. 8, the shower space 7C is arranged concentrically with the head portion 7, and is opened to a circular end 7B of the head portion 7 (or the other end 1B of the shower main body 1). The shower space 7C is formed to extend from the circular end 7B toward the dome top 7A side in a direction of a center line of the head portion 7. The shower space 7C is closed by the dome top 7A of the head portion 7.

As shown in FIG. 5 and FIG. 8, the shower cylindrical portion 8 is arranged in the shower space 7C. The shower cylindrical portion 8 is arranged concentrically with the shower space 7C. The shower cylindrical portion 8 is fixed on the dome top 7A side of the head portion 7 in the shower space 7C, and is formed integrally with the head portion 7. The shower cylindrical portion 8 is formed to extend from the dome top 7A side toward the circular end 7B side of the head portion 7. One cylinder end 8A of the shower cylindrical portion 8 is opened in the shower space 7C (toward the other end 1B of the shower main body 1). The other cylinder end 8B of the shower cylindrical portion 8 is closed by the dome top 7A of the head portion 7.

As shown in FIG. 5 and FIG. 8, the shower main body 1 includes an inflow passage 9, an outflow passage 10, a plurality of (three) fixing protruding portions 11, a guide protruding portion 12, a base protruding portion 13, and a reference protruding portion 14.

As shown in FIG. 5 and FIG. 8, the inflow passage 9 is a flow passage being a circular hole, and is formed in the handle portion 6. The inflow passage 9 is opened on one end 1A of the shower main body 1 (or one end 6A of the handle portion). The inflow passage 9 is formed to pass through the handle portion 6 in a direction of a cylinder center line of the handle portion 6, and is opened on the other end 6B of the handle portion 6.

The inflow passage 9 is opened in the outflow passage 10 on the dome top 7A side of the head portion 7.

The one end 6A of the handle portion 6 (or the one end 1A of the shower main body 1) is connected to a water supply hose (not shown), and the liquid is caused to flow through the water supply hose into the inflow passage 9.

As shown in FIG. 5 and FIG. 8, the outflow passage 10 is a flow passage being a circular hole, and is formed in the shower cylindrical portion 8 of the head portion 7. The outflow passage 10 is opened on the other end 1B of the shower main body 1 (or on the one cylinder end 8A of the shower cylindrical portion 8). The outflow passage 10 is arranged concentrically with the shower cylindrical portion 8, and is formed to extend toward the dome top 7A side of the head portion 7. The outflow passage 10 is closed by the dome top 7A of the head portion 7. The outflow passage 10 communicates with the inflow passage 9 on the dome top 7A side of the head portion 7. As shown in FIG. 5 and FIG. 8, on the other end 1B side of the shower main body 1 with respect to the inflow passage 9 (or on the one cylinder end 8A side of the shower cylindrical portion 8), the outflow passage 10 is reduced in diameter at a hole step portion 10A thereof, and is formed to extend toward the dome top 7A side of the head portion 7.

This configuration allows the liquid to flow through the inflow passage 9 into the outflow passage 10 and the liquid is caused to flow out from the other end 1B of the shower main body 1 (or from the circular end 7B of the head portion 7).

As shown in FIG. 5 and FIG. 8, the plurality of fixing protruding portions 11 are arranged in the outflow passage 10. Each of the fixing protruding portions 11 is formed to protrude from an inner peripheral surface (of the shower cylindrical portion 8) in the outflow passage 10 toward a center line A of the outflow passage 10, and to extend toward the dome top 7A side of the head portion 7. Each of the fixing protruding portions 11 is formed integrally with the inner peripheral surface of the shower cylindrical portion 8.

One of the fixing protruding portions 11 is arranged at a highest point 7*a* of the head portion 7. The other two fixing protruding portions 11 are arranged with angular intervals of 90 degrees on both side positions of the highest point 7*a* in the peripheral direction (circumferential direction) of the outflow passage 10.

As shown in FIG. 5 to FIG. 8, the guide protruding portion 12 is formed into a cylindrical shape, and is formed integrally with the other end 1B of the shower main body 1 (or the other end 7B of the head portion 7). The guide protruding portion 12 is arranged concentrically with the outflow passage 10, and is formed to protrude from the other end 1B of the shower main body 1 (or the other end 7B of the head portion 7).

As shown in FIG. 5 and FIG. 8, the base protruding portion 13 is a column having a circular cross section, and is arranged in the outflow passage 10 of the head portion 7. The base protruding portion 13 is arranged concentrically with the outflow passage 10, and is supported so that one end of the base protruding portion 13 is fixed on the dome top 7A side of the head portion 7. The base protruding portion 13 is formed to protrude from the dome top 7A side of the head portion 7 toward the other end 1B of the shower main body 1 (or to the circular end 7B of the head portion 7) in the outflow passage 10.

The base protruding portion 13 has a screw hole 15. As shown in FIG. 2, FIG. 5, and FIG. 8, the screw hole 15 is arranged concentrically with the outflow passage 10, and is formed in the base protruding portion 13. The screw hole 15 is formed to extend in a direction of the center line A of the outflow passage 10, and is opened in the outflow passage 10.

As shown in FIG. 5 to FIG. 8, the reference protruding portion 14 is formed integrally with the head portion 7. The reference protruding portion 14 is arranged at the highest point 7*a* of the head portion 7. The reference protruding portion 14 is formed to protrude from a surface of the head portion 7 in a direction orthogonal to the center line A of the outflow passage 10.

As shown in FIG. 1 to FIG. 4 and FIG. 9 to FIG. 25, the flow passage switching means 2 (flow passage switching unit) includes a switching handle 21, a switching base 22, a sealing gasket 23, a sealing ring 24, a switching valve seat element 25 (switching valve seat), a sealing ring 26, a switching valve element 27 (switching valve), a plurality of (a pair of) sealing rings 28, a fixing screw bolt 29, and a coil spring 30.

As shown in FIG. 9 to FIG. 12, the switching handle 21 is made of a synthetic resin and formed into a cylindrical shape. The switching handle 21 includes a first handle cylindrical portion 31, a second handle cylindrical portion 32, a handle hole 33, a threaded portion 34, a plurality of (a pair of) first retaining grooves a plurality of (a pair of) second retaining grooves 36, and a handle protrusion 37.

The first handle cylindrical portion 31 (small-diameter cylindrical portion) and the second handle cylindrical portion 32 (large-diameter cylindrical portion) are arranged concentrically with each other with a cylinder center line B (a center line) of the switching handle 21 being a center, and are formed integrally with each other.

The first handle cylindrical portion 31 is reduced in diameter, and extends from one cylinder end 32A of the second handle cylindrical portion 32 in a direction of the cylinder center line B of the switching handle 21.

As shown in FIG. 9 to FIG. 12, the second handle cylindrical portion 32 includes a shower protruding portion 38 configured to indicate a shower position P1, a mist protruding portion 39 configured to indicate a mist position P2, and a handle groove 40.

As shown in FIG. 9 to FIG. 12, the shower protruding portion 38 and the mist protruding portion 39 are arranged with an angular interval of 90 degrees in the peripheral direction of the switching handle 21 (or the second handle cylindrical portion 32). The shower protruding portion 38 and the mist protruding portion 39 are formed to protrude from an outer peripheral surface of the second handle cylindrical portion 32 in a direction orthogonal to the cylinder center line B of the switching handle 21.

As shown in FIG. 9 (*b*) and FIG. 11 (*b*), the handle groove 40 is an annular groove, and is formed in the second handle cylindrical portion 32. The handle groove 40 is arranged concentrically with the second handle cylindrical portion 32 with the cylinder center line B of the switching handle 21 being a center. The handle groove 40 is arranged on an outer side of the first handle cylindrical portion 31 in the direction orthogonal to the cylinder center line B of the switching handle 21. The handle groove 40 is formed so as to be opened to the one cylinder end 32A of the second handle cylindrical portion 32.

The handle groove 40 is formed to extend from the one cylinder end 32A to the other cylinder end 32B of the second handle cylindrical portion 32, and has a groove depth in the direction of the cylinder center line B of the switching handle 21.

As shown in FIG. 9, FIG. 10, FIG. 11 (*b*), and FIG. 12, the handle hole 33 is formed into a circular hole. The handle hole 33 is arranged concentrically with the handle cylindrical portions 31 and 32 with the cylinder center line B of the switching handle 21 (including the first handle cylindrical portion 31 and the second handle cylindrical portion 32) being a center.

The handle hole 33 is formed to pass through the first handle cylindrical portion 31 and the second handle cylindrical portion 32 in the direction of the cylinder center line B of the switching handle 21. The handle hole 33 is opened to one cylinder end 31A of the first handle cylindrical portion 31 and the other cylinder end 32B of the second handle cylindrical portion 32.

As shown in FIG. 9, FIG. 10, FIG. 11 (*b*), and FIG. 12, the handle hole 33 includes a large-diameter hole portion 33A, a medium-diameter hole portion 33B, and a small-diameter hole portion 33C.

The large-diameter hole portion 33A is opened to the other cylinder end 32B of the second handle cylindrical portion 32. The medium-diameter hole portion 33B is formed between the large-diameter hole portion 33A and the small-diameter hole portion 33C. The medium-diameter hole portion 33B is reduced in diameter at a first hole step portion 33D as compared to the large-diameter hole portion 33A, and is continuous with the small-diameter hole portion 33C.

The small-diameter hole portion 33C is reduced in diameter at a second hole step portion 33E as compared to the medium-diameter hole portion 33B, and is opened to the one cylinder end 31A of the first handle cylindrical portion 31.

As shown in FIG. 9, FIG. 10, and FIG. 11(*b*), the threaded portion 34 is formed in the large-diameter hole portion 33A of the handle hole 33. The threaded portion 34 is arranged in a range from the first hole step portion 33D to the other cylinder end 32B side of the second handle cylindrical portion 32 in the direction of the cylinder center line B of the switching handle 21.

As shown in FIG. 9, FIG. 10, and FIG. 11(*b*), the first retaining grooves 35 are formed in the medium-diameter hole portion 33B of the handle hole 33. The first retaining grooves 35 are arranged with an angular interval of 180 degrees in the peripheral direction of the switching handle 21 (or of the second handle cylindrical portion 32).

One of the first retaining grooves 35 is arranged at a position corresponding to the shower protruding portion 38 in the peripheral direction of the switching handle 21.

The first retaining grooves 35 are formed to extend between the first hole step portion 33D and the second hole step portion 33E in the direction of the cylinder center line B of the switching handle 21. The first retaining grooves 35 each have a groove width H1 in the peripheral direction (circumferential direction) of the switching handle 21, and are each opened in an inner peripheral surface of the medium-diameter hole portion 33B.

As shown in FIG. 9, FIG. 10, and FIG. 11(*b*), the second retaining grooves 36 are formed in the medium-diameter hole portion 33B of the handle hole 33. The second retaining grooves 36 are arranged with an angular interval of 180 degrees in the peripheral direction of the switching handle 21 (or the second handle cylindrical portion 32).

One of the second retaining grooves 36 is arranged at a position corresponding to the mist protruding portion 39 in the peripheral direction of the switching handle 21. The second retaining grooves 36 are each located at a center between the first retaining grooves 35 in the peripheral direction of the switching handle 21, and are arranged with angular intervals of 90 degrees between the first retaining grooves 35.

The second retaining grooves 36 are formed to extend from the first hole step portion 33D toward the second hole step portion 33E side in the direction of the cylinder center line B of the switching handle 21. The second retaining grooves 36 each have a groove width H2 in the peripheral direction of the switching handle 21, and are each opened in the inner peripheral surface of the medium-diameter hole portion 33B. The groove width H2 of each of the second retaining grooves 36 is smaller than the groove width H1 of each of the first retaining grooves 35 (groove width H2<groove width H1).

As shown in FIG. 9(*b*), FIG. 11, and FIG. 12, the handle protrusion 37 is arranged on the outer side of the first handle cylindrical portion 31 in the direction orthogonal to the cylinder center line B of the switching handle 21. The handle protrusion 37 is arranged at a position corresponding to the shower protruding portion 38 in the peripheral direction of the switching handle 21.

The handle protrusion 37 is formed integrally on an outer peripheral surface of the first handle cylindrical portion 31. The handle protrusion 37 is formed to protrude from the outer peripheral surface of the first handle cylindrical portion 31 to the handle groove 40 in the direction orthogonal to the cylinder center line B of the switching handle 21.

The handle protrusion 37 is formed to extend between the one cylinder end 31A of the first handle cylindrical portion 31 and the one cylinder end 32A of the second handle cylindrical portion 32 in the direction of the cylinder center line B of the switching handle 21. The handle protrusion 37 includes a protrusion end surface 37A (a flat end surface) that is flush with the one cylinder end 31A of the first handle cylindrical portion 31.

As shown in FIG. 13 to FIG. 15, the switching base 22 is made of a synthetic resin and formed into a cylindrical shape. The switching base 22 includes a first base cylindrical portion 45 (a large-diameter cylindrical portion), a second base cylindrical portion 46 (a small-diameter cylindrical portion), a base annular plate 47, a base hole 48, a fixing cylindrical portion 49, a plurality of (a pair of) first rib portions 50, a plurality of (a pair of) second rib portions 51, and a plurality of (a pair of) base protrusions 59 and 60.

The first base cylindrical portion 45 and the second base cylindrical portion 46 are arranged concentrically with each other with a cylinder center line C (a center line) of the switching base 22 being a center. The first base cylindrical portion 45 and the second base cylindrical portion 46 are formed integrally with each other.

As shown in FIG. 13 and FIG. 15, the first base cylindrical portion 45 has a plurality of sealing grooves 53 and 54.

As shown in FIG. 13 and FIG. 15, the sealing groove 53 is formed into an annular groove, and is arranged on one cylinder end 45A side of the first base cylindrical portion 45. The sealing groove 53 is arranged concentrically with the first base cylindrical portion 45 with the cylinder center line C (the center line) of the switching base 22 (or the first base cylindrical portion 45) being a center. The sealing groove 53 is formed along an entire outer peripheral surface of the first base cylindrical portion 45. The sealing groove 53 has a groove depth in a direction orthogonal to the cylinder center line C of the switching base 22, and is opened in the outer peripheral surface of the first base cylindrical portion 45.

As shown in FIG. 13 and FIG. 15, the sealing groove 54 is formed into an annular groove, and is arranged on the other cylinder end 45B side of the first base cylindrical portion 45. The sealing groove 54 is arranged between the other cylinder end 45B of the first base cylindrical portion 45 and the sealing groove 53 in the direction of the cylinder center line C of the switching base 22.

The sealing groove 54 is arranged concentrically with the first base cylindrical portion 45 with the cylinder center line C of the switching base 22 being a center. The sealing groove 54 is formed along the entire outer peripheral surface of the first base cylindrical portion 45. The sealing groove 54 has a groove depth in the direction orthogonal to the cylinder center line C of the switching base 22, and is opened in the outer peripheral surface of the first base cylindrical portion 45.

As shown in FIG. 13(*b*), FIG. 14(*b*), and FIG. 15, the second base cylindrical portion 46 is reduced in diameter at the one cylinder end 45A of the first base cylindrical portion 45, and is formed to protrude from the first base cylindrical portion 45 in the direction of the cylinder center line C of the switching base 22.

The second base cylindrical portion 46 has a plurality of (three) base regulating grooves 55, 56, and 57.

As shown in FIG. 13, FIG. 14(*b*), and FIG. 15, the base regulating grooves 55 to 57 are arranged with angular intervals of 90 degrees in the peripheral direction of the switching base 22.

With regard to the base regulating grooves 55 to 57, on both sides of one base regulating groove 55 in the peripheral direction of the switching base 22, the other two base regulating grooves 56 and 57 are arranged. Each of the base regulating grooves 56 and 57 is arranged with an angular interval of 90 degrees between the base regulating groove 55 and each of the base regulating grooves 56 and 57 in the peripheral direction of the switching base 22.

The base regulating grooves 55, 56, and 57 are each formed to extend between the one cylinder end 45A of the first base cylindrical portion 45 and one cylinder end 46A of the second base cylindrical portion 46 in the direction of the cylinder center line C of the switching base 22, and are each opened to the one cylinder end 46A of the second base cylindrical portion 46.

The base regulating grooves 55 to 57 each have a groove depth in the direction orthogonal to the cylinder center line C of the switching base 22, and are each opened in an outer peripheral surface of the second base cylindrical portion 46.

As shown in FIG. 13 to FIG. 15, the base annular plate 47 is arranged concentrically with the first base cylindrical portion 45 with the cylinder center line C of the switching base 22 (or the first base cylindrical portion 45) being a center. The base annular plate 47 is fixed to the other cylinder end 45B of the first base cylindrical portion 45, and is formed integrally with the first base cylindrical portion 45. The base annular plate 47 is formed to protrude from the outer peripheral surface of the first base cylindrical portion 45 in the direction orthogonal to the cylinder center line C of the switching base 22.

As shown in FIG. 13(*a*), FIG. 14, and FIG. 15(*b*), the base hole 48 is formed into a circular hole. The base hole 48 is formed to pass through the first base cylindrical portion 45 and the second base cylindrical portion 46 in the direction of the cylinder center line C of the switching base 22. The base hole 48 is arranged concentrically with the base cylindrical portions 45 and 46 with the cylinder center line C of the switching base 22 being a center.

The base hole 48 includes a small-diameter hole portion 48A and a large-diameter hole portion 48B. The small-diameter hole portion 48A is formed to pass through the first base cylindrical portion 45, and is opened to the base annular plate 47. The large-diameter hole portion 48B is increased in diameter at a hole step portion 48C as compared to the small-diameter hole portion 48A, and is opened to the one cylinder end 46A of the second base cylindrical portion 46.

As shown in FIG. 13 to FIG. 15, the fixing cylindrical portion 49 is arranged in the base cylindrical portions 45 and 46. The fixing cylindrical portion 49 is arranged concentrically with the second base cylindrical portion 46 with the cylinder center line C of the switching base 22 (including the base cylindrical portions 45 and 46) being a center.

The fixing cylindrical portion 49 is arranged in the base cylindrical portions 45 and 46 with an annular space Y between the fixing cylindrical portion 49 and inner peripheral surfaces of the base cylindrical portions 45 and 46 in the direction orthogonal to the cylinder center line C of the switching base 22. The fixing cylindrical portion 49 is formed to extend from the hole step portion 48C of the base hole 48 toward the one cylinder end 46A side of the second base cylindrical portion 46 in the direction of the cylinder center line C of the switching base 22, and protrudes from the one cylinder end 46A of the second base cylindrical portion 46. The fixing cylindrical portion 49 includes a cylinder end surface 49A (a flat end surface) that is flush with the hole step portion 48C of the base hole 48.

As shown in FIG. 13(*b*), FIG. 14, and FIG. 15(*b*), the fixing cylindrical portion 49 has a bolt receiving hole 58. The bolt receiving hole 58 is arranged concentrically with the fixing cylindrical portion 49 with the cylinder center line C of the switching base 22 being a center. The bolt receiving hole 58 is formed to pass through the fixing cylindrical portion 49 in the direction of the cylinder center line C of the switching base 22.

As shown in FIG. 13(*b*), FIG. 14, and FIG. 15(*b*), the bolt receiving hole 58 includes a large-diameter hole portion 58A, a small-diameter hole portion 58B, and a medium-diameter hole portion 58C.

With regard to the bolt receiving hole 58, the large-diameter hole portion 58A is opened to the one cylinder end surface 49A of the fixing cylindrical portion 49, and communicates with the small-diameter hole portion 48A of the base hole 48. The small-diameter hole portion 58B is arranged between the large-diameter hole portion 58A and the medium-diameter hole portion 58C. The small-diameter hole portion 58B is formed to be reduced in diameter as compared to the large-diameter hole portion 58A. The medium-diameter hole portion 58C is increased in diameter as compared to the small-diameter hole portion 58B, and is opened to-the other cylinder end 49B of the fixing cylindrical portion 49.

As shown in FIG. 13, FIG. 14, and FIG. 15(*b*), the first rib portions 50 are each arranged in the large-diameter hole portion 48B of the base hole 48 between each of the base cylindrical portions 45 and 46 and the fixing cylindrical portion 49 (in the annular space Y).

The first rib portions 50 are arranged with an angular interval of 180 degrees in the peripheral direction of the switching base 22 (including the base cylindrical portions 45 and 46). With regard to the first rib portions 50, one of the first rib portions 50 is arranged at a position corresponding to the base regulating groove 55 (one of the base regulating grooves).

The first rib portions 50 are each formed to extend between the hole step portion 48C of the base hole 48 and the one cylinder end 46A of the second base cylindrical portion 46 in the direction of the cylinder center line C of the switching base 22. The first rib portions 50 are fixed to the base cylindrical portions 45 and 46 and the fixing cylindrical portion 49, and are formed integrally with the base cylindrical portions 45 and 46 and the fixing cylindrical portion 49. The first rib portions 50 each have a rib width hA in the peripheral direction of the switching base 22.

The first rib portions 50 each include a rib flat surface 50A that is flush with the cylinder end surface 49A of the fixing cylindrical portion 49 (or the hole step portion 48C).

As shown in FIG. 13, FIG. 14 and FIG. 15(*b*), the second rib portions 51 are each arranged in the large-diameter hole portion 48B of the base hole 48 between each of the base cylindrical portions 45 and 46 and the fixing cylindrical portion 49 (in the annular space Y).

The second rib portions 51 are arranged with an angular interval of 180 degrees in the peripheral direction of the switching base 22 (including the base cylindrical portions 45 and 46). The second rib portions 51 are each located at a center between the first rib portions 50 in the peripheral direction of the switching base 22, and are arranged at positions respectively corresponding to the base regulating grooves 56 and 57 (the other two base regulating grooves).

The second rib portions 51 are each formed to extend between the hole step portion 48C of the base hole 48 and the one cylinder end 46A of the second base cylindrical portion 46 in the direction of the cylinder center line C of the switching base 22. The second rib portions 51 are fixed to the base cylindrical portions 45 and 46 and the fixing cylindrical portion 49, and are formed integrally with the base cylindrical portions 45 and 46 and the fixing cylindrical portion 49. The second rib portions 51 each have a rib width hB in the peripheral direction of the switching base 22. The rib width hB of each of the second rib portions 51 is larger than the rib width hA of each of the first rib portions 50 (rib width hB>rib width hA).

The second rib portions 51 each include a rib flat surface 51A that is flush with the cylinder end surface 49A of the fixing cylindrical portion 49 (or the hole step portion 48C).

This configuration, as shown in FIG. 13(*b*) and FIG. 14(*b*), in the annular space Y, allows a plurality of (four) base inflow passages Z to be defined between the first rib portions 50 and the second rib portions 51 in the peripheral direction. The base inflow passages Z are each formed to extend in the direction of the cylinder center line C of the switching base 22, and are each opened to the large-diameter hole portion 48B of the base hole 48 and the one cylinder end 46A of the second base cylindrical portion 46.

As shown in FIG. 13(*a*), FIG. 14(*a*), and FIG. 15(*b*), the base protrusions 59 and 60 are fixed to the other cylinder end 45B side of the first base cylindrical portion and the base annular plate 47, and are formed integrally with the first base cylindrical portion 45 and the base annular plate 47.

The base protrusions 59 and 60 are arranged between the base hole 48 (or the small-diameter hole portion 48A) and the outer peripheral surface of the base annular plate 47 in the direction orthogonal to the cylinder center line C of the switching base 22.

The base protrusions 59 are arranged with an angular interval of 180 degrees in the peripheral direction of the switching base 22. The base protrusions 59 and 60 are arranged (in a concyclic manner) on a circle that has a center along the cylinder center line C of the switching base 22 and is located on an outer side of the base hole 48.

The base protrusions 59 and 60 are each formed to protrude from the other cylinder end 45B of the first base cylindrical portion 45 and the base annular plate 47 in the direction of the cylinder center line C of the switching base 22.

As shown in FIG. 14(*a*), one base protrusion 59 is arranged between the base regulating grooves 55 and 56 in the peripheral direction (circumferential direction) of the switching base 22.

The base protrusion 59 includes a first base regulating flat surface 59A located at a base distance HA from a base longitudinal straight line LX that is orthogonal to the cylinder center line C of the switching base 22 and passes a center of the base regulating groove 55. The first base regulating flat surface 59A is formed in parallel to the base longitudinal straight line LX.

The base protrusion 59 includes a second base regulating flat surface 59B located at the base distance HA from a base transverse straight line LY that is orthogonal to the cylinder center line C of the switching base (or the base longitudinal straight line LX) and passes a center of each of the base regulating grooves 56 and 57. The second base regulating flat surface 59B is formed in parallel to the base transverse straight line LY.

As shown in FIG. 14(*a*), the other one base protrusion 60 is arranged between the base regulating grooves 56 and 57 in the peripheral direction (circumferential direction) of the switching base 22.

The base protrusion 60 includes a third base regulating flat surface 60A located at a base distance HB from the base transverse straight line LY. The third base regulating flat surface 60A is formed in parallel to the base transverse straight line LY.

The base protrusion 60 includes a fourth base regulating flat surface 60B located at the base distance HB from the base longitudinal straight line LX. The fourth base regulating flat surface 60B is formed in parallel to the base longitudinal straight line LX. The base distance HB is a dimension (distance) equal to the base distance HA (base distance HA=base distance HB).

As shown in FIG. 4 and FIG. 15, the sealing gasket 23 is made of an elastic material such as synthetic rubber, and is formed into an annular shape. The sealing gasket 23 is externally fitted to the first base cylindrical portion 45 of the switching base 22, and is fitted in the sealing groove 54. The sealing gasket 23 is arranged in the sealing groove 54 so as to protrude from the outer peripheral surface of the first base cylindrical portion 45.

As shown in FIG. 4 and FIG. 15, the sealing ring 24 is made of an elastic material such as synthetic rubber, and is formed into an annular shape. The sealing ring 24 is externally fitted to the first base cylindrical portion 45 of the switching base 22, and is fitted in the sealing groove 53. The sealing ring 24 is arranged in the sealing groove 53 so as to protrude from the outer peripheral surface of the first base cylindrical portion 45.

As shown in FIG. 16 to FIG. 18, the switching valve seat element 25 (the switching valve seat) is made of a synthetic resin and formed into a cylindrical shape. The switching valve seat element 25 includes a valve seat cylindrical portion 62, a valve seat disk 63, a plurality of (a pair of) valve seat holes 64 and 65, a plurality of (a pair of) first regulating protrusions 66, a plurality of (a pair of) second regulating protrusions 67, and a plurality of (a pair of) spring receiving protruding portions 68.

As shown in FIG. 16, FIG. 17(*b*), and FIG. 18, the valve seat cylindrical portion 62 is formed into a cylindrical shape.

As shown in FIG. 15(*b*) and FIG. 17(*a*), an outer diameter D1 of the valve seat cylindrical portion 62 is smaller than a hole diameter d1 of the small-diameter hole portion 68A of the base hole 48 (or the switching base 22) (outer diameter D1<hole diameter d1).

As shown in FIG. 16 to FIG. 18, the valve seat cylindrical portion 62 has a sealing groove 69. The sealing groove 69 is formed into an annular groove, and is arranged concentrically with the valve seat cylindrical portion 62 with a cylinder center line D (a center line) of the switching valve seat element 25 (or the valve seat cylindrical portion 62) being a center. The sealing groove 69 is formed along an entire outer peripheral surface of the valve seat cylindrical portion 62. The sealing groove 69 has a groove depth in a direction orthogonal to the cylinder center line D of the switching valve seat element 25 (or the valve seat cylindrical portion 62), and is opened in the outer peripheral surface of the valve seat cylindrical portion 62.

As shown in FIG. 17(*a*), the valve seat disk 63 has a plate diameter equal to the outer diameter D1 of the valve seat cylindrical portion 62, and is formed into a circular shape. The valve seat disk 63 is arranged concentrically with the valve seat cylindrical portion 62 with the cylinder center line D of the switching valve seat element 25 (or the valve seat cylindrical portion 62) being a center. The valve seat disk 63 is formed integrally with the valve seat cylindrical portion 62 so as to close one cylinder end 62A of the valve seat cylindrical portion 62.

As shown in FIG. 17(*a*), the valve seat holes 64 and 65 are each a circular hole having a hole diameter d4, and are formed in the valve seat disk 63. As shown in FIG. 17(*a*), the valve seat holes 64 and 65 are arranged (in a concyclic manner) on a circle CA having a circle diameter D5 and a center along the cylinder center line D of the switching valve seat element 25. Each of the valve seat holes 64 and 65 is arranged so that a hole center line E thereof is located on the circle CA.

As shown in FIG. 16(*a*) and FIG. 17, the valve seat holes 64 and 65 are arranged with an angular interval of 180 degrees in the peripheral direction of the switching valve seat element 25 (or the valve seat cylindrical portion 62).

The valve seat holes 64 and 65 are each formed to pass through the valve seat disk 63 in a direction of the cylinder center line D of the switching valve seat element 25, and are each opened in a disk front flat surface 63A and a disk back flat surface 63B of the valve seat disk 63. The valve seat holes 64 and 65 communicate with an inside of the valve seat cylindrical portion 62.

As shown in FIG. 16, FIG. 17(*b*), and FIG. 18(*b*), the first regulating protrusions 66 are arranged (in a concyclic manner) on a circle that has a center along the cylinder center line D of the switching valve seat element 25 (or the valve seat cylindrical portion 62) and is located between the valve seat hole 64 and the outer peripheral surface of the valve seat cylindrical portion 62. The first regulating protrusions 66 are formed integrally with the other cylinder end 62B of the valve seat cylindrical portion 62 so as to be located on the valve seat hole 64 side.

The first regulating protrusions 66 are arranged on both sides of a valve seat straight line LB that is orthogonal to the cylinder center line D of the switching valve seat element 25 and passes the hole center line E of each of the valve seat holes 64 and 65. As shown in FIG. 17(*b*), each of the first regulating protrusions 66 is arranged at a distance HC/2 from the valve seat straight line LB.

This configuration, as shown in FIG. 17(*b*), allows the first regulating protrusions 66 to be arranged with an insertion interval HC in the peripheral direction of the switching valve seat element 25. The insertion interval HC is larger than the rib width hA of each of the first rib portions 50 (of the switching base 22) and smaller than the rib width hB of each of the second rib portions 51 (the rib width hA<the insertion interval HC<the rib width hB).

In the direction of the cylinder center line D of the switching valve seat element 25, the first regulating protrusions 66 are each formed to protrude from the other cylinder end 62B of the valve seat cylindrical portion 62 and extend away from the valve seat disk 63.

As shown in FIG. 17(*b*) and FIG. 18(*a*), the second regulating protrusions 67 are arranged on the same circle on which the first regulating protrusions 66 are arranged. Each of the second regulating protrusions 67 is arranged with an angular interval of 180 degrees in the peripheral direction of the switching valve seat element with respect to one of the first regulating protrusions 66, and are located on the valve seat hole 65 side.

The second regulating protrusions 67 are arranged on the both sides of the valve seat straight line LB. Each of the second regulating protrusions 67 is arranged at the distance HC/2 from the valve seat straight line.

This configuration allows the second regulating protrusions 67 to be arranged with the insertion interval HC in the peripheral direction of the switching valve seat element 25.

In the direction of the cylinder center line D of the switching valve seat element 25, the second regulating protrusions 67 are each formed to protrude from the other cylinder end 62B of the valve seat cylindrical portion 62 and extend away from the valve seat disk 63.

As shown in FIG. 16(*b*), FIG. 17(*b*), and FIG. 18(*b*), the spring receiving protruding portions 68 are located in the valve seat cylindrical portion 62, and are arranged between the valve seat holes 64 and 65. The spring receiving protruding portions 68 are arranged with an angular interval of 180 degrees in the peripheral direction of the switching valve seat element 25.

The spring receiving protruding portions 68 are arranged concentrically with the valve seat cylindrical portion 62 with the cylinder center line D of the switching valve seat element 25 being a center. As shown in FIG. 17(*b*), the spring receiving protruding portions 68 are each formed into an arc shape so as to have a radius r2 from the cylinder center line D (the center line) of the switching valve seat element 25. The radius r2 of each of the spring receiving protruding portions 68 is smaller than a distance (length) between the cylinder center line D of the switching valve seat element 25 and the valve seat hole 64.

The spring receiving protruding portions 68 are formed integrally with the valve seat disk 63. The spring receiving protruding portions 68 are formed to protrude from the disk back flat surface 63B of the valve seat disk 63 into the valve seat cylindrical portion 62 in the direction of the cylinder center line D of the switching valve seat element 25.

As shown in FIG. 4 and FIG. 18, the sealing ring 26 is made of an elastic material such as synthetic rubber, and is formed into an annular shape. The sealing ring 26 is externally fitted to the valve seat cylindrical portion 62 of the switching valve seat element 25, and is fitted in the sealing groove 69. The sealing ring 26 is arranged in the sealing groove 69 so as to protrude from the outer peripheral surface of the valve seat cylindrical portion 62.

As shown in FIG. 19 to FIG. 25, the switching valve element 27 is made of a synthetic resin and formed into a cylindrical shape. The switching valve element 27 includes a first valve element cylindrical portion 71 (a large-diameter cylindrical portion), a valve element annular plate 72, a second valve element cylindrical portion 73 (a small-diameter cylindrical portion), a valve element disk 74, a central cylindrical portion 75, a plurality of (a pair of) cylindrical valve elements 76 and 77, a plurality of (a pair of) valve element flow passages 78 and 79, a plurality of (a pair of) first valve element protruding portions 80, a plurality of (a pair of) second valve element protruding portions 81, a plurality of outer outflow holes 82, a plurality of (a pair of) first handle regulating protruding portions 83, and a plurality of (a pair of) second handle regulating protruding portions 85.

As shown in FIG. 19 to FIG. 25, the first valve element cylindrical portion 71 is formed into a cylindrical shape. As shown in FIG. 10 and FIG. 20, an outer diameter D2 of the first valve element cylindrical portion 71 is smaller than a hole diameter d2 of the medium-diameter hole portion 33B of the handle hole 33 (of the switching handle 21) (the outer diameter D2<the hole diameter d2). As shown in FIG. 17(*a*) and FIG. 23, an inner diameter d3 of the first valve element cylindrical portion 71 is larger than the outer diameter D1 of the valve seat cylindrical portion 62 and the valve seat disk 63 (of the switching valve seat element 25) (inner diameter d3>outer diameter D1).

As shown in FIG. 19 to FIG. 25, the valve element annular plate 72 is formed into an annular shape. The valve element annular plate 72 has the outer diameter D2 equal to the outer diameter of the first valve element cylindrical portion 71.

The valve element annular plate 72 is arranged concentrically with the first valve element cylindrical portion 71 with a cylinder center line F (a center line) of the switching valve element 27 (or the first valve element cylindrical portion 71) being a center. The valve element annular plate 72 is formed integrally with the first valve element cylindrical portion 71 so as to close one cylinder end 71A of the first valve element cylindrical portion 71.

As shown in FIG. 19 to FIG. 24, the second valve element cylindrical portion 73 is arranged concentrically with the first valve element cylindrical portion 71 with the cylinder center line F of the switching valve element 27 (or the first valve element cylindrical portion 71) being a center. The second valve element cylindrical portion 73 is arranged along an inner periphery of the valve element annular plate 72, and is formed integrally with the valve element annular plate 72.

The second valve element cylindrical portion 73 is formed to protrude from the valve element annular plate 72 in a direction of the cylinder center line F of the switching valve element 27. An outer diameter D3 of the second valve element cylindrical portion 73 is smaller than the inner diameter d3 of the first valve element cylindrical portion 71 (the outer diameter D3<the inner diameter d3).

The second valve element cylindrical portion 73 has a shower outflow hole 87. The shower outflow hole 87 is arranged concentrically with the second valve element cylindrical portion 73 with the cylinder center line F of the switching valve element 27 being a center. The shower outflow hole 87 is formed to pass through the second valve element cylindrical portion 73 in the direction of the cylinder center line F of the switching valve element 27 (or the first valve element cylindrical portion 71). The shower outflow hole 87 is opened to one cylinder end 73A and the other cylinder end 73B of the second valve element cylindrical portion 73.

As shown in FIG. 19(*a*), FIG. 20, FIG. 23, and FIG. 24, the shower outflow hole 87 includes a large-diameter hole portion 87A and a small-diameter hole portion 87B. The large-diameter hole portion 87A is opened to the protruding-side cylinder end 73A (one cylinder end) of the second valve element cylindrical portion 73. The small-diameter hole portion 87B is reduced in diameter at a hole step portion 87C as compared to the large-diameter hole portion 87A, and is opened to the other cylinder end 73B of the second valve element cylindrical portion 73.

As shown in FIG. 19 to FIG. 21 and FIG. 23 to FIG. 25, the valve element disk 74 is formed into a circular shape. The valve element disk 74 is arranged concentrically with the second valve element cylindrical portion 73 with the cylinder center line F of the switching valve element 27 being a center. The valve element disk 74 is arranged in the small-diameter hole portion 83B of the second valve element cylindrical portion 73 to close the other cylinder end 73B of the second valve element cylindrical portion 73. The valve element disk 74 is formed integrally with the second valve element cylindrical portion 73.

As shown in FIG. 19(*b*), FIG. 20, and FIG. 23 to FIG. 25, the central cylindrical portion 75 is arranged concentrically with the valve element cylindrical portions 71 and 73 with the cylinder center line F of the switching valve element 27 being a center. The central cylindrical portion 75 is arranged in the second valve element cylindrical portion 73 (or in the shower outflow hole 87). In a direction orthogonal to the cylinder center line F of the switching valve element 27, the central cylindrical portion 75 is arranged at a center of each of the valve element cylindrical portions 71 and 73 with an annular space between an inner peripheral surface of the second valve element cylindrical portion 73 and the central cylindrical portion 75.

As shown in FIG. 23 and FIG. 24, the central cylindrical portion 75 is formed integrally with the valve element disk 74 so that one cylinder end 75A of the central cylindrical portion 75 is fixed to a disk back flat surface 74B of the valve element disk 74. The central cylindrical portion 75 is formed to extend from the disk back flat surface 74B of the valve element disk 74 into the first valve element cylindrical portion 71 in the direction of the cylinder center line F of the switching valve element 27. The central cylindrical portion 75 is formed to protrude from the first valve element cylindrical portion 71 in the direction of the cylinder center line F of the switching valve element 27.

As shown in FIG. 19(*b*) and FIG. 21 to FIG. 24, the cylindrical valve elements 76 and 77 are each formed into a cylindrical shape. The cylindrical valve elements 76 and 77 are arranged in the second valve element cylindrical portion 73 (or in the first valve element cylindrical portion 71).

As shown in FIG. 21(*a*), the cylindrical valve elements 76 and 77 are arranged (in a concyclic manner) on a circle CB that has a circle diameter D6 and a center along the cylinder center line F of the switching valve element 27 (or the first valve element cylindrical portion 71), and is located between the central cylindrical portion 75 and the second valve element cylindrical portion 73. The cylindrical valve elements 76 and 77 are arranged adjacent to the central cylindrical portion 75 so that a cylinder center line G of each of the cylindrical valve elements 76 and 77 is located on the circle CB. The circle diameter D6 of the circle CB, on which the cylindrical valve elements 76 and 77 are arranged, is equal to the circle diameter D5 of the circle CA, on which the valve seat holes 64 and 65 are arranged (the circle diameter D6=the circle diameter D5).

The cylindrical valve elements 76 and 77 are formed integrally with the central cylindrical portion 75.

The cylindrical valve elements 76 and 77 are formed integrally with the valve element disk 74 so as to be fixed to the disk back flat surface 74B of the valve element disk 74. The cylindrical valve elements 76 and 77 are each formed to extend from the disk back flat surface 74B of the valve element disk 74 into the first valve element cylindrical portion 71 in the direction of the cylinder center line F of the switching valve element 27 (or the first valve element cylindrical portion 71). The cylindrical valve elements 76 and 77 are each formed to protrude from the first valve element cylindrical portion 71 in the direction of the cylinder center line F of the switching valve element 27.

Cylinder ends 76A and 77A of the cylindrical valve elements 76 and 77 and a cylinder end 75A of the central cylindrical portion 75, which protrude from the first valve element cylindrical portion 71, are formed into flat end surfaces that are flush with each other.

As shown in FIG. 19(*b*), FIG. 20, FIG. 21(*a*), and FIG. 24, the cylindrical valve element 76 has a valve element hole 88 and a sealing groove 89.

As shown in FIG. 19(*b*), FIG. 20, FIG. 21(*a*), FIG. 24, and FIG. 25, the valve element hole 88 is formed into a circular hole having a hole diameter d5. The valve element hole 88 is arranged concentrically with the cylindrical valve element 76 with the cylinder center line G of the cylindrical valve element 76 being a center. The valve element hole 88 is formed to extend from one cylinder end 76A of the cylindrical valve element 76 to the valve element disk 74 in a direction of the cylinder center line G (the center line) of the cylindrical valve element 76, and is opened to the one cylinder end 76A of the cylindrical valve element 76. The valve element hole 88 is closed by the valve element disk 84 in the direction of the cylinder center line G of the cylindrical valve element 76.

The hole diameter d5 of the valve element hole 88 is larger than the hole diameter d4 of each of the valve seat holes 64 and 65 (the hole diameter d5<the hole diameter d4).

As shown in FIG. 19(*b*) and FIG. 21(*a*), the sealing groove 89 is an annular groove, and is formed on the one cylinder end 76A side of the cylindrical valve element 76. The sealing groove 89 is arranged concentrically with the cylindrical valve element 76 with the cylinder center line G of the cylindrical valve element 76 being a center. The sealing groove 89 is arranged on an outer side of the valve element hole 88 in a direction orthogonal to the cylinder center line G of the cylindrical valve element 76. The sealing groove 89 has a groove depth in the direction of the cylinder center line G of the cylindrical valve element 76, and is opened to-the one cylinder end 76A of the cylindrical valve element 76.

As shown in FIG. 19(*b*), FIG. 20, FIG. 21(*a*), FIG. 24, and FIG. 25, the cylindrical valve element 77 has a valve element hole 90 and a sealing groove 91.

As shown in FIG. 19(*b*), FIG. 20, FIG. 21(*a*), FIG. 24, and FIG. 25, the valve element hole 90 is formed into a circular hole having the hole diameter d5. The valve element hole 90 is arranged concentrically with the cylindrical valve element 77 with the cylinder center line G of the cylindrical valve element 77 being a center. The valve element hole 90 is formed to extend from one cylinder end 77A of the cylindrical valve element 77 to the valve element disk 74 in a direction of the cylinder center line G (the center line) of the cylindrical valve element 77, and is opened to the one cylinder end 77A of the cylindrical valve element 77. The valve element hole 90 is closed by the valve element disk 74 in the direction of the cylinder center line G of the cylindrical valve element 77.

As shown in FIG. 19(*a*) and FIG. 21(*a*), the sealing groove 91 is an annular groove, and is formed on the one cylinder end 77A side of the cylindrical valve element 77. The sealing groove 91 is arranged concentrically with the cylindrical valve element 77 with the cylinder center line G of the cylindrical valve element 77 being a center. The sealing groove 91 is arranged on an outer side of the valve element hole 90 in the direction orthogonal to the cylinder center line G of the cylindrical valve element 77. The sealing groove 91 has a groove depth in the direction of the cylinder center line G of the cylindrical valve element 77, and is opened to the one cylinder end 77A of the cylindrical valve element 77.

As shown in FIG. 19(*a*), FIG. 20, FIG. 21(*a*), and FIG. 22 to FIG. 25, the valve element flow passage 78 is formed in the valve element disk 74 within the small-diameter hole portion 87B of the shower outflow hole 87. As shown in FIG. 20, on a valve element transverse straight line LC that is orthogonal to the cylinder center line F of the switching valve element 27 and passes the cylinder center line G of each of the cylindrical valve elements 76 and 77, the valve element flow passage 78 is formed in one of halves of the valve element disk 74 (the upper half of the valve element disk 74) divided by the valve element transverse straight line LC.

The valve element flow passage 78 is opened inside of the valve element hole 88 on the one cylinder end 76A side of the cylindrical valve element 76. The valve element flow passage 78 is formed to extend helically along an outer peripheral surface of the central cylindrical portion 75 while inclining toward a disk front flat surface 74A of the valve element disk 74 from a portion on the one cylinder end 76A side of the cylindrical valve element 76 on which the valve element flow passage 78 is opened inside of the valve element hole 88.

The valve element flow passage 78 is formed to extend to a position above the cylindrical valve element 77 (or above the valve element hole 90) and with an angular interval of 90 degrees from the portion on the one cylinder end 76A side of the cylindrical valve element 76, on which the valve element flow passage 78 is opened inside of the valve element hole 88, in the peripheral direction of the switching valve element 27. The valve element flow passage 78 is located at the position above the cylindrical valve element 77 in the disk front flat surface 74A of the valve element disk 74.

The valve element flow passage 78 is opened in the disk front flat surface 74A of the valve element disk 74 between the portion on the one cylinder end 76A side of the cylindrical valve element 76 and the cylindrical valve element 77, and communicates with the small-diameter hole portion 87B of the shower outflow hole 87.

In the upper half of the valve element disk 74, the valve element flow passage 78 is formed by recessing (or protruding) a portion of the valve element disk 74 adjacent to the central cylindrical portion 75 into a helical shape toward the one cylinder end 76A side of the cylindrical valve element 76 along the outer peripheral surface of the central cylindrical portion 75.

Thus, the valve element flow passage 78 is formed into a helical flow passage extending from the portion on the one cylinder end 76A side of the cylindrical valve element 76 to the position above the cylindrical valve element 77 (or above the valve element hole 90) along the outer peripheral surface of the central cylindrical portion 75.

As shown in FIG. 19(*a*), FIG. 20, FIG. 21(*a*), and FIG. 22 to FIG. 25, the valve element flow passage 79 is formed in the valve element disk 74 within the small-diameter hole portion 87B of the shower outflow hole 87. As shown in FIG. 20, the valve element flow passage 79 is formed in the other one of halves of the valve element disk 74 (the lower half of the valve element disk 74) divided by the valve element transverse straight line LC.

The valve element flow passage 79 is opened inside of the valve element hole 90 on the one cylinder end 77A side of the cylindrical valve element 77. The valve element flow passage 79 is formed to extend helically along the outer peripheral surface of the central cylindrical portion 75 while inclining toward the disk front flat surface 74A of the valve element disk 74 from a portion on the one cylinder end 77A side of the cylindrical valve element 77 on which the valve element flow passage 79 is opened inside of the valve element hole 90.

The valve element flow passage 79 is formed to extend to a position above the cylindrical valve element 76 (or above the valve element hole 88) and with an angular interval of 90 degrees from the portion on the one cylinder end 77A side of the cylindrical valve element 77, on which the valve element flow passage 79 is opened inside of the valve element hole 90, in the peripheral direction of the switching valve element 27. The valve element flow passage 79 is located at the position above the cylindrical valve element 76 in the disk front flat surface 74A of the valve element disk 74.

The valve element flow passage 79 is opened in the disk front flat surface 74A of the valve element disk 74 between the portion on the one cylinder end 77A side of the cylindrical valve element 77 and the cylindrical valve element 76, and communicates with the small-diameter hole portion 87B of the shower outflow hole 87.

In the lower half of the valve element disk 74, the valve element flow passage 79 is formed by recessing (or protruding) a portion of the valve element disk 74 adjacent to the central cylindrical portion 75 into a helical shape toward the one cylinder end 77A side of the cylindrical valve element 77 along the outer peripheral surface of the central cylindrical portion 75.

Thus, the valve element flow passage 79 is formed into a helical flow passage extending from the portion on the one cylinder end 77A side of the cylindrical valve element 77 to the position above the cylindrical valve element 76 (or above the valve element hole 88) along the outer peripheral surface of the central cylindrical portion 75.

As shown in FIG. 19 to FIG. 22, FIG. 24, and FIG. 25, the first valve element protruding portions 80 are formed on the first valve element cylindrical portion 71. The valve element protruding portions 80 are arranged with an angular interval of 180 degrees in the peripheral direction of the switching valve element 27 on the valve element transverse straight line LC. The first valve element protruding portions 80 are each formed to protrude from an outer peripheral surface of the first valve element cylindrical portion 71 in a direction orthogonal to the cylinder center line F (the center line) of the switching valve element 27 (or in the direction of the valve element transverse straight line LC). A protruding amount of each of the first valve element protruding portions 80 is set smaller than the groove depth of each of the first retaining grooves 35 (of the switching handle 21).

The first valve element protruding portions 80 are each formed to have a width hC/2 on each side thereof with respect to the valve element longitudinal straight line LC, and have a protruding width hC in the peripheral direction of the switching valve element 27. The protruding width hC of each of the first valve element protruding portions 80 is set smaller than the groove width hA of each of the first retaining grooves 35 (of the switching handle 21).

As shown in FIG. 19, FIG. 22, and FIG. 24, the first valve element protruding portions 80 are each formed to extend from the first valve element cylindrical portion 71 to the one cylinder end 76A side of the cylindrical valve element 76 and the one cylinder end 77A side of the cylindrical valve element 77 in the direction of the cylinder center line F of the switching valve element 27.

As shown in FIG. 19 to FIG. 23 and FIG. 25, the second valve element protruding portions 81 are formed on the first valve element cylindrical portion 71. The second valve element protruding portions 81 are arranged with an angular interval of 180 degrees in the peripheral direction of the switching valve element 27. The second valve element protruding portions 81 are arranged on a valve element longitudinal straight line LD that is orthogonal to the cylinder center line F of the switching valve element 27 and the valve element transverse straight line LC. The second valve element protruding portions 81 are each formed to protrude from the outer peripheral surface of the first valve element cylindrical portion 71 in the direction orthogonal to the cylinder center line F of the switching valve element 27 (or in a direction of the valve element longitudinal straight line LD). A protruding amount of each of the second valve element protruding portions 81 is set smaller than the groove depth of each of the second retaining grooves 36 (of the switching handle 21).

The second valve element protruding portions 81 are each formed to have a width hD/2 on each side thereof with respect to the valve element longitudinal straight line LD, and have a protruding width hD in the peripheral direction of the switching valve element 27. The protruding width hD of each of the second valve element protruding portions 81 is set smaller than the groove width hB of each of the second retaining grooves 36 (of the switching handle 21).

As shown in FIG. 19 to FIG. 21 and FIG. 23 to FIG. 25, the plurality of outer outflow holes 82 are composed by, for example, forming twelve holes in the valve element annular plate 72. The outer outflow holes 82 are arranged (in a concyclic manner) on a circle having a center along the cylinder center line F (the center line) of the switching valve element 27. The outer outflow holes 82 are arranged at equal angular intervals (equal pitches), for example, with angular intervals of 30 degrees in the peripheral direction of the switching valve element 27.

The outer outflow holes 82 are formed to pass through the valve element annular plate 72 in the direction of the cylinder center line F of the switching valve element 27, and are opened in a disk front flat surface 72A and a disk back flat surface 72B of the valve element annular plate 72.

This configuration allows the outer outflow holes 82 to communicate with an inside of the first valve element cylindrical portion 71 on an outer side of each of the cylindrical valve elements 76 and 77.

As shown in FIG. 19(*b*), FIG. 21(*b*), FIG. 22, FIG. 24(*b*), and FIG. 25, the first handle regulating protruding portions 83 are formed on the disk back flat surface 72B of the valve element annular plate 72 and the disk back flat surface 74B of the valve element disk 74.

The first handle regulating protruding portions 83 are formed to extend between the outer peripheral surface of the cylindrical valve element 76 and the inner peripheral surface of the first valve element cylindrical portion 71, and are formed integrally with the cylindrical valve element 76 and the first valve element cylindrical portion 71.

The first handle regulating protruding portions 83 are arranged on both sides of the valve element transverse straight line LC in the peripheral direction of the switching valve element 27. The first handle regulating protruding portions 83 each include a valve element regulating flat surface 83A located at a valve element distance HD from the valve element transverse straight line LC. The valve element regulating flat surface 83A is formed in parallel to the valve element transverse straight line LC. The valve element distance HD is equal to the base distance HA of the base protrusion 59 and the base distance HB of the base protrusion 60 (of the switching base 22).

The first handle regulating protruding portions 83 are each formed to protrude from the disk back flat surface 72B of the valve element annular plate 72 and the disk back flat surface 74B of the valve element disk 74 toward the one cylinder end 76A side of the cylindrical valve element 76 in the direction of the cylinder center line F of the switching valve element 27.

As shown in FIG. 19(*b*), FIG. 21(*b*), FIG. 22(*b*), and FIG. 25, the second handle regulating protruding portions 85 are formed on the disk back flat surface 72B of the valve element annular plate 72 and the disk back flat surface 74B of the valve element disk 74.

The second handle regulating protruding portions 85 are formed to extend between the outer peripheral surface of the cylindrical valve element 77 and the inner peripheral surface of the first valve element cylindrical portion 71, and are formed integrally with the cylindrical valve element 77 and the first valve element cylindrical portion 71.

The second handle regulating protruding portions 85 are arranged on the both sides of the valve element transverse straight line LC in the peripheral direction of the switching valve element 27. The second handle regulating protruding portions 85 each include a valve element regulating flat surface 85A located at the valve element distance HD from the valve element transverse straight line LC. The valve element regulating flat surface 85A is formed in parallel to the valve element transverse straight line LC.

The second handle regulating protruding portions 85 are formed to protrude from the disk back flat surface 72B of the valve element annular plate 72 and the disk back flat surface 74B of the valve element disk 74 toward the one cylinder end 77A side of the cylindrical valve element 77 in the direction of the cylinder center line F of the switching valve element 27.

As shown in FIG. 4 and FIG. 24, the sealing rings 28 are each made of an elastic material such as synthetic rubber, and are each formed into an annular shape.

The sealing rings 28 are fitted in the sealing groove 89 of the cylindrical valve element 76 and the sealing groove 91 of the cylindrical valve element 77, respectively. The sealing rings 28 are arranged in the sealing grooves 89 and 91 so as to protrude from the cylinder end 76A of the cylindrical valve element 76 and the cylinder end 77A of the cylindrical valve element 77.

As shown in FIG. 30 to FIG. 41, the flow passage switching means 2 is accommodated (arranged) in the shower space 7C and the outflow passage 10 (or the shower cylindrical portion 8) of the shower main body 1.

In the flow passage switching means 2, as shown in FIG. 26 to FIG. 29, the switching base 22 is inserted into the switching handle 21 so that a handle unit HU is assembled.

As shown in FIG. 26, FIG. 27, and FIG. 29, the switching base 22 is inserted from the one cylinder end 46A of the second base cylindrical portion 46 into the handle hole 33 (or into the large-diameter hole portion 33A) of the switching handle 21.

The switching base 22 is arranged so that the base annular plate 47 is inserted in the medium-diameter hole portion 33B of the switching handle 21, and that the first base cylindrical portion 45 and the sealing gasket 23 are inserted in the small-diameter hole portion 33C of the switching handle 21. As shown in FIG. 26 to FIG. 29, the switching base 22 is inserted in the handle hole 33 so that one of the first rib portions 50 and the base regulating groove 55 are arranged at positions corresponding to the first retaining groove 35 which is formed on the handle protrusion 37 of the switching handle 21, to the handle protrusion 37, and to the shower protruding portion 38.

The base annular plate 47 is brought into abutment against the second hole step portion 33E of the switching handle 21 in the medium-diameter hole portion 33B of the handle hole 33, thereby placing the switching base 22 concentrically with the switching handle 21.

When the switching base 22 is placed in the switching handle 21, the one cylinder end 46A of the second base cylindrical portion 46 of the switching base 22 and the sealing ring 24 (or the sealing groove 54) are arranged to protrude from the one cylinder end 31A of the first handle cylindrical portion 31 of the switching handle 21, and extend in the direction of the cylinder center line B of the switching handle 21.

Further, when the switching base 22 is placed in the switching handle 21, as shown in FIG. 29, the sealing gasket 23 is brought into press-contact with the inner peripheral surface of the small-diameter hole portion 33C (or the handle hole 33) of the switching handle 21, thereby sealing the small-diameter hole portion 33C of the handle hole 33 in a liquid-tight manner. Due to an elastic force of the sealing gasket 23, a gap is defined between the outer peripheral surface of the base annular plate 47 of the switching base 22 and the medium-diameter hole portion 33B of the switching handle 21.

Thus, the switching handle 21 is freely turn around the switching base 22.

The switching handle 21 is turned under a state in which the small-diameter hole portion 33C of the handle hole 33 is in sliding contact with the sealing gasket 23 in the switching base 22.

As shown in FIG. 29, the large-diameter hole portion 33A (or the handle hole 33) of the switching handle 21 communicates with the base inflow passages Z through the small-diameter hole portion 48A (or the base hole 48) of the switching base 22.

As shown in FIG. 26 and FIG. 29, the base protrusions 59 and 60 of the switching base 22 are arranged to protrude in the medium-diameter hole portion 33B (or in the handle hole 33) of the switching handle 21.

Thus, in the flow passage switching means 2, the switching base 22 is placed in the switching handle 21 so that the handle unit HU is assembled.

In the flow passage switching means 2, as shown in FIG. 30 to FIG. 32, the handle unit HU (including the switching handle 21 and the switching base 22) is arranged in the shower space 7C and the outflow passage 10 (or in the shower cylindrical portion 8) of the shower main body 1.

As shown in FIG. 30, the handle unit HU is inserted from the second base cylindrical portion 46 of the switching base 22 into the shower space 7C and the outflow passage 10 of the shower main body 1 (or the head portion 7). The handle unit HU is arranged concentrically with the center line A of the outflow passage 10 (or the shower cylindrical portion 8).

As shown in FIG. 30 to FIG. 32, the handle unit HU is inserted in the shower main body 1 so that the shower protruding portion 38, the handle protrusion 37, one of first retaining grooves 35 of the switching handle 21 and the base regulating groove 55 of the switching base 22 are arranged at positions corresponding to the reference protruding portion 14 (or the highest point 7*a*) of the head portion 7.

With regard to the handle unit HU, the second base cylindrical portion 46 of the switching base 22 is inserted into the shower cylindrical portion 8 (or into the outflow passage 10) from the cylinder end 46A, and the first handle cylindrical portion 31 of the switching handle 21 is inserted into the guide protruding portion 12 and the shower space 7C.

In the handle unit HU, as shown in FIG. 32, the second base cylindrical portion 46 of the switching base 22 is accommodated in the shower cylindrical portion 8 (or in the outflow passage 10) so that the fixing protruding portions 11 of the shower main body 1 are inserted in the base regulating grooves 55, 56, and 57, respectively.

Thus, the switching base 22 is mounted to the head portion 7 of the shower main body 1 so as to be unturnable.

As shown in FIG. 30 to FIG. 32, the first rib portions 50 of the switching base 22 are arranged at positions corresponding to the reference protruding portion 14 of the shower main body 1.

In the handle unit HU, the second base cylindrical portion 46 of the switching base 22 is inserted in the outflow passage 10 under a state in which the sealing ring 24 is held in press-contact with the inner peripheral surface of the shower cylindrical portion 8 (or the outflow passage 10). The handle unit HU is placed on the handle portion 6 under a state in which the one cylinder end 46A of the second base cylindrical portion 46 is held in abutment against the hole step portion 100 of the outflow passage 10.

In the handle unit HU, as shown in FIG. 30, the fixing cylindrical portion 49 of the switching base 22 is inserted in the outflow passage 10 (or in the shower cylindrical portion 8), and is arranged under a state in which the base protruding portion 13 of the shower main body 1 is press-fitted in the medium-diameter hole portion 58C of the bolt receiving hole 58.

Thus, the bolt receiving hole 58 of the switching base 22 communicates with the screw hole 15 of the base protruding portion 13.

In the handle unit HU, as shown in FIG. 30, the first handle cylindrical portion 31 of the switching handle 21 is inserted in the guide protrusion 12 and the shower space 7C of the shower main body 1. The switching handle 21 is arranged under a state in which the guide protruding portion 12 of the shower main body 1 is inserted in the handle groove 40. The guide protrusion 12 of the shower main body 1 is inserted into the handle groove 40 without contact with the switching handle 21. The switching handle 21 is arranged under a state in which the protrusion end surface 37A of the handle protrusion 37 is held in abutment against the one cylinder end 8A of the shower cylindrical portion 8.

When the handle unit HU is thus arranged in the shower space 7C and the outflow passage 10 of the shower main body 1, as shown in FIG. 30 to FIG. 32, the base inflow passages Z of the switching base 22 communicate with the outflow passage 10 on the dome top 7A side of the head portion 7, and communicate with the inflow passage 9 of the handle portion 6 through the outflow passage 10.

In the handle unit HU, as shown in FIG. 30 to FIG. 32, the medium-diameter hole portion 33B of the switching handle 21 communicates with the outflow passage through the base inflow passages Z and the small-diameter hole portion 48A (or the base hole 48) of the switching base 22.

In the flow passage switching means 2, as shown in FIG. 33 and FIG. 34, when the handle unit HU (including the switching handle 21 and the switching base 22) is arranged in the shower main body 1 (or in the shower space 7C and the outflow passage 10), the switching base 22 is fixed to the shower main body 1 (or the head portion 7) with the fixing screw bolt 29.

As shown in FIG. 33 and FIG. 34, the fixing screw bolt 29 is inserted in the fixing cylindrical portion 49 of the switching base 22.

A bolt shank 29A is inserted into the large-diameter hole portion 58A and the small-diameter hole portion 58B (or the bolt receiving hole 58) of the fixing cylindrical portion 49 so that the fixing screw bolt 29 is screwed into the screw hole 15 of the base protruding portion 13 (or the shower main body 1). A bolt head 29B is inserted into the large-diameter hole portion 58A of the fixing cylindrical portion 49 so that the fixing screw bolt 29 is arranged to be held in abutment against the hole step portion 58D.

Through turning of the fixing screw bolt 29, the second base cylindrical portion 46 of the switching base 22 is fastened to the base protruding portion 13.

Thus, as shown in FIG. 33, the switching base 22 of the handle unit HU is fixed to the shower main body 1 (or the head portion 7) with the fixing screw bolt 29.

The switching handle 21 of the handle unit HU is mounted to the shower main body so as to be freely turnable.

In the switching base 22 of the handle unit HU, as shown in FIG. 34, the first base regulating flat surface 59A of the base protrusion 59 is arranged at the base distance HA from the shower protruding portion 38 of the shower main body 1.

As shown in FIG. 33 and FIG. 34, when the switching base 22 of the handle unit HU of the flow passage switching means 2 is fixed to the shower main body 1 with the fixing screw bolt 29, the coil spring 30 is arranged in the switching base 22.

As shown in FIG. 33 and FIG. 34, the coil spring 30 is arranged concentrically with the center line A of the outflow passage 10, and is inserted in the switching base 22. The coil spring 30 is inserted in the large-diameter hole portion 58A of the bolt receiving hole 58 of the fixing cylindrical portion 49 (of the switching base 22). The coil spring 30 is externally fitted to the bolt head 29B of the fixing screw bolt 29, and is inserted in the large-diameter hole portion 58A of the bolt receiving hole 58. The coil spring 30 is arranged so that one spring end thereof is held in abutment against the hole step portion 58D of the bolt receiving hole 58.

Thus, as shown in FIG. 33 and FIG. 34, in the direction of the center line A of the outflow passage 10 (or the cylinder center line B of the switching handle 21), the coil spring 30 is arranged to protrude from the hole step portion 58D of the fixing cylindrical portion 49 into the small-diameter hole portion 48A (or into the base hole 48) of the switching base 22.

In the flow passage switching means 2, as shown in FIG. 35 to FIG. 37, the switching valve seat element 25 is accommodated (arranged) in the handle unit HU (or the switching base 22) arranged in the shower main body 1.

As shown in FIG. 35 to FIG. 37, the switching valve seat element 25 is arranged concentrically with the cylinder center line C of the switching base 22, and is inserted into the small-diameter hole portion 48A (or into the base hole 48) of the switching base 22 from the first regulating protrusions 66 and the second regulating protrusions 67.

The switching valve seat element 25 is inserted in the small-diameter hole portion 48A of the switching base 22 under a state in which the first rib portions 50 of the switching base are located between the first regulating protrusions 66 (within the base distance HA) and between the second regulating protrusions 67 (within the base distance HA).

As shown in FIG. 35 to FIG. 37, the switching valve seat element 25 is arranged in the switching base 22 under a state in which the valve seat disk 63 and the valve seat cylindrical portion 61 are inserted in the small-diameter hole portion 48A (or in the base hole 48) of the switching base 22. At this time, the sealing ring 26 on the switching valve seat element 25 (or the valve seat cylindrical portion 62) is held in press-contact with the inner peripheral surface of the small-diameter hole portion 48A of the base hole 48, thereby sealing the small-diameter hole portion 48A in a liquid-tight manner.

As shown in FIG. 35 and FIG. 36, the switching valve seat element 25 is inserted in the small-diameter hole portion 48A of the switching base 22 under a state in which the other spring end side of the coil spring 30 is received within the spring receiving protruding portions 68 and the other spring end of the coil spring 30 is held in abutment against the disk back flat surface 63B of the valve seat disk 63.

The switching valve seat element 25 is inserted in the small-diameter hole portion 48A of the switching base 22 while compressing the coil spring 30, which is received within the spring receiving protruding portions 68, toward the switching base 22 side.

As shown in FIG. 35 and FIG. 37, the switching valve seat element 25 is arranged in the small-diameter hole portion 48A of the switching base 22 under a state in which the first rib portion 50 of the switching base 22 is press-fitted between the first regulating protrusions 66 and the first rib portion 50 of the switching base 22 is press-fitted between the second regulating protrusions 67.

Thus, the switching valve seat element 25 is arranged in the switching base 22 and the shower main body 1 (or the head portion 7) so as to be unturnable. The switching valve seat element 25 is freely movable in the direction of the cylinder center C of the switching base 22.

As shown in FIG. 5 to FIG. 37, the valve seat holes 64 and 65 of the switching valve seat element 25 are arranged at positions corresponding to the reference protruding portion 14 of the shower main body 1 and the shower protruding portion 38 of the switching handle 21, and communicate with the small-diameter hole portion 48A of the switching base 22.

As shown in FIG. 36 and FIG. 37, the valve seat holes 64 and 65 of the switching valve seat element 25 communicate with the outflow passage 10 and the inflow passage 9 through the base inflow passages Z of the switching base 22.

In the flow passage switching means 2, as shown in FIG. 38 to FIG. 41, the switching valve element 27 (switching valve) is arranged in the handle unit HU (or in the switching handle 21) mounted to the shower main body 1.

As shown in FIG. 38 to FIG. 41, the switching valve element 27 is arranged concentrically with the cylinder center line B of the switching handle 21, and is inserted into the large-diameter hole portion 33A and the medium-diameter hole portion 33B (or into the handle hole 33) of the switching handle 21 from the cylindrical valve elements 76 and 77 (or from the first handle regulating protruding portions 83 and the second handle regulating protruding portions 85).

As shown in FIG. 38 and FIG. 39, the switching valve element 27 is arranged in the switching handle 21 of the handle unit HU under a state in which the first valve element cylindrical portion 71 is inserted in the medium-diameter hole portion 33B (or in the handle hole 33) of the switching handle 21.

As shown in FIG. 38, FIG. 39, and FIG. 41, the switching valve element 27 is arranged in the switching handle 21 of the handle unit HU under a state in which the first valve element protruding portions 80 are respectively inserted in the first retaining grooves 35 of the switching handle 21 and the second valve element protruding portions 81 are respectively inserted in the second retaining grooves 36 of the switching handle 21.

Thus, the switching valve element 27 is mounted to the switching handle 21 so as to be unturnable, and is turned together with the switching handle 21.

As shown in FIG. 38 and FIG. 40, the switching valve element 27 is arranged in the switching handle 21 under a state in which the cylindrical valve elements 76 and 77 are held in abutment against the disk front flat surface 63A of the valve seat disk 63 of the switching valve seat element 25. Each of the cylindrical valve elements 76 and 77 is held in abutment against the disk front flat surface 63A of the valve seat disk 63 through intermediation of the sealing ring 28. As shown in FIG. 68, the valve seat disk 63 of the switching valve seat element 25 is urged by a spring force of the coil spring 30 toward the sealing rings 28 in the cylindrical valve elements 76 and 77.

As shown in FIG. 38 to FIG. 40, the first valve element protruding portions 80 are respectively inserted in the first retaining grooves 35 of the switching handle 21 so that the cylindrical valve elements 76 and 77 of the switching valve element 27 are arranged at positions corresponding to the valve seat holes 64 and 65 of the switching valve seat element 25, respectively.

Thus, as shown in FIG. 68 and FIG. 70, the valve element holes 88 and 90 of the cylindrical valve elements 76 and 77 of the switching valve element 27 are opened in the valve seat holes 64 and 65, respectively.

The cylindrical valve elements 76 and 77 (or the valve element holes 88 and 90) communicate with the outflow passage 10 and the inflow passage 9 through the valve seat holes 64 and 65 of the switching valve seat element 25 and the base flow passages Z of the switching base 22.

As shown in FIG. 38, FIG. 39, and FIG. 41, when the first valve element protruding portions 80 are inserted in the first retaining grooves 35 of the switching handle 21, respectively, the switching valve element 27 is arranged so that the valve element regulating flat surface 83A of one of the first handle regulating protruding portions 83 is held in abutment against the base protrusion 59 (or the first base regulating flat surface 59A) of the switching base 22, and that the valve element regulating flat surface 85A of one of the second handle regulating protruding portions 85 is held in abutment against the base protrusion 60 (or the fourth base regulating flat surface 60B) of the switching base 22.

Thus, as shown in FIG. 41, the switching handle 21 and the switching valve element 27 are freely turnable between the base protrusions 59 and 60 of the switching base 22 within an angular range of 90 degrees.

As shown in FIG. 38 and FIG. 39, the second valve element cylindrical portion 73 of the switching valve element 27 is opened in the large-diameter hole portion 33A of the switching handle 21, and allows the valve element flow passages 78 and 79 (in the disk front flat surface 74A of the valve element disk 74) to communicate with an inside of the large-diameter hole portion 33A (or an inside of the handle hole 33) of the switching handle 21.

The valve element flow passages 78 and 79 of the switching valve element 27 communicate with the outflow passage 10 and the inflow passage 9 through the valve element holes 88 and 90, the valve seat holes 64 and 65 of the switching valve seat element 25, and the base flow passages Z of the switching base 22.

The valve element flow passages 78 and 79 communicate with the large-diameter hole portion 33A (or the handle hole 33) of the switching handle 21 through the shower outflow hole 87 of the second valve element cylindrical portion 73.

As shown in FIG. 38 and FIG. 39, the outer outflow holes 82 of the switching valve element 27 are opened between the valve element annular plate 72 and the valve element disk 74 of the switching valve seat element 25, and opened in the large-diameter hole portion 33A (or in the handle hole 33) of the switching handle 21.

With this configuration, the outer outflow holes 82 communicate with the outflow passage 10 and the inflow passage 9 through the valve seat holes 64 and 65 of the switching valve element 27 and the base inflow passages Z of the switching base 22.

Thus, as shown in FIG. 30 to FIG. 41, the flow passage switching means 2 are arranged in the shower main body 1 (or in the head portion 7), and is mounted to the shower main body 1.

In the shower head X, as shown in FIG. 1 to FIG. 4 and FIG. 42 to FIG. 45, the shower nozzle 3 (spray nozzle) is mounted to the other end 1B of the shower main body 1 (or the circular end 7B of the head portion 7).

As shown in FIG. 42 to FIG. 45, the shower nozzle 3 is made of a synthetic resin and formed into a cylindrical shape.

The shower nozzle 3 includes a nozzle outer cylindrical portion 95, a shower nozzle plate 96, a shower cylindrical portion 97 (nozzle inner cylindrical portion), a plurality of air bubble-liquid mixture jetting holes 98, and a sealing ring 103.

As shown in FIG. 42, FIG. 44, and FIG. 45, the nozzle outer cylindrical portion 95 is formed into a cylindrical shape, and includes a sealing groove 99 and a threaded portion 100.

As shown in FIG. 42 and FIG. 44, the sealing groove 99 is formed into an annular groove, and is arranged on one cylinder end 95A side of the nozzle outer cylindrical portion 95 in a direction of a cylinder center line H of the shower nozzle 3. The sealing groove 99 is arranged concentrically with the nozzle outer cylindrical portion 95 with the cylinder center line H (the center line) of the shower nozzle 3 (or the nozzle outer cylindrical portion 95) being a center. The sealing groove 99 is formed along an entire outer peripheral surface of the nozzle outer cylindrical portion 95. The sealing groove 99 has a groove depth in a direction orthogonal to the cylinder center line H of the shower nozzle 3, and is opened in the outer peripheral surface of the nozzle outer cylindrical portion 95.

As shown in FIG. 42, FIG. 44, and FIG. 45, the threaded portion 100 is arranged on the other cylinder end 95B side of the nozzle outer cylindrical portion 95 in the direction of the cylinder center line H of the shower nozzle 3. The threaded portion 100 is arranged between the sealing groove 99 and the other cylinder end of the nozzle outer cylindrical portion 95 in the direction of the cylinder center line H of the shower nozzle 3. The threaded portion 100 is formed along the entire outer peripheral surface of the nozzle outer cylindrical portion 95.

As shown in FIG. 42 to FIG. 45, the shower nozzle plate 96 (spray nozzle plate) is formed into a circular plate. The shower nozzle plate 96 is arranged concentrically with the nozzle outer cylindrical portion 95 with the cylinder center line H of the shower nozzle 3 being a center.

As shown in FIG. 43, the shower nozzle plate 96 has a plate diameter D7 equal to an outer diameter of the nozzle outer cylindrical portion 95, and closes the one cylinder end 95A of the nozzle outer cylindrical portion 95.

The shower nozzle plate 96 is fixed to the one cylinder end 95A of the nozzle outer cylindrical portion 95, and is formed integrally with the nozzle outer cylindrical portion 95.

As shown in FIG. 42(*b*), FIG. 44(*b*), and FIG. 45, the shower cylindrical portion 97 is formed into a cylindrical shape.

The shower cylindrical portion 97 (spray cylindrical portion) is arranged concentrically with the nozzle outer cylindrical portion 95 and the shower nozzle plate 96 with the cylinder center line H of the shower nozzle 3 being a center. The shower cylindrical portion 97 is arranged in the nozzle outer cylindrical portion 95 with a mist annular space YM between an inner peripheral surface of the nozzle outer cylindrical portion 95 and the shower cylindrical portion 97 in the direction orthogonal to the cylinder center line H of the shower nozzle 3.

One cylinder end 97A of the shower cylindrical portion 97 is closed by the shower nozzle plate 96, and the shower cylindrical portion 97 is formed integrally with the shower nozzle plate 96. The shower cylindrical portion 97 is formed to protrude from a disk back flat surface 96B of the shower nozzle plate 96 into the nozzle outer cylindrical portion 95 in the direction of the cylinder center line H of the shower nozzle 3.

As shown in FIG. 42(*b*), FIG. 44(*b*), and FIG. 45, the shower cylindrical portion 97 is formed to be increased in diameter at a sealing step portion 101 on the shower nozzle plate 96 side. The sealing step portion 101 is formed into a circular shape, and is arranged concentrically with the shower cylindrical portion 97 with the cylinder center line H of the shower nozzle 3 being a center. The sealing step portion 101 is formed along an entire outer peripheral surface of the shower cylindrical portion 97.

As shown in FIG. 42(*b*), FIG. 44(*b*), and FIG. 45, the shower cylindrical portion 97 has a nozzle hole 102.

As shown in FIG. 44(*b*) and FIG. 45, the nozzle hole 102 is formed into a circular hole. The nozzle hole 102 is arranged concentrically with the shower cylindrical portion 97 with the cylinder center line H (the center line) of the shower nozzle 3 being a center. The nozzle hole 102 is formed to extend from the disk back flat surface 96B of the shower nozzle plate 96 to the other cylinder end 97B of the shower cylindrical portion 97 in the direction of the cylinder center line H of the shower nozzle 3, and is opened to the other cylinder end 97B.

As shown in FIG. 42(*b*), FIG. 44(*b*), and FIG. 45, the nozzle hole 102 includes a large-diameter hole portion 102A, a medium-diameter hole portion 102B, and a small-diameter hole portion 102C.

The large-diameter hole portion 102A is opened to the one cylinder end 97B of the shower cylindrical portion 97. The medium-diameter hole portion 102B is arranged between the large-diameter hole portion 102A and the small-diameter hole portion 102C. The medium-diameter hole portion 102B is reduced in diameter at a first hole step portion 102D as compared to the large-diameter hole portion 102A, and is formed to extend toward the shower nozzle plate 96 side. The small-diameter hole portion 102C is reduced in diameter at a second hole step portion 102E as compared to the medium-diameter hole portion 102B, and is formed to extend to the shower nozzle plate 96 (or the disk back flat surface 96B).

With this configuration, the shower cylindrical portion 97 defines an air bubble mixing space BR into which the liquid flows from the other cylinder end 97B. The air bubble mixing space BR is defined in the shower cylindrical portion 97 by the nozzle hole 102.

As shown in FIG. 44(*b*), the shower cylindrical portion 97 has the hole diameter d5 at the small-diameter hole portion 102C (or the nozzle hole 102), and has a hole length L1 at the small-diameter hole portion 102C in the direction of the cylinder center line H of the shower nozzle 3.

As shown in FIG. 42, FIG. 43, FIG. 44(*b*), and FIG. 45, the plurality of air bubble-liquid mixture jetting holes 98 are formed into circular throttle holes (nozzle throttle holes). Through the air bubble-liquid mixture jetting holes 98, the air bubble-liquid mixture is jetted out of the air bubble mixing space BR.

The air bubble-liquid mixture jetting holes 98 are formed in the shower nozzle plate 96. The air bubble-liquid mixture jetting holes 98 are formed to pass through the shower nozzle plate 96 in the direction of the cylinder center line H of the shower nozzle 3, and are opened into the air bubble mixing space BR in the shower cylindrical portion 97.

As shown in FIG. 43, the plurality of air bubble-liquid mixture jetting holes 98 are arranged (in a concyclic manner) on each of a plurality of circles CD, CE, and CF having different radii r3, r4, and r5 (r3<r4<r5) of the circles with the cylinder center line H (the center line) of the shower nozzle 3 being a center. On each of the circles CD, CE, and CF, the air bubble-liquid mixture jetting holes 98 are arranged at equal intervals (equal pitches) in the peripheral direction of the shower nozzle 3.

As shown in FIG. 44 and FIG. 45, the sealing ring 103 is made of an elastic material such as synthetic rubber, and is formed into an annular shape.

The sealing ring 103 is externally fitted to the nozzle outer cylindrical portion 95, and is fitted in the sealing groove 99. The sealing ring 103 is arranged in the sealing groove 99 so as to protrude from the outer peripheral surface of the nozzle outer cylindrical portion 95.

In the shower head X, the air bubble-liquid mixture generating means 4 (the air bubble generating unit) is configured to generate the air bubble-liquid mixture by mixing the air (air bubbles) into the liquid.

As shown in FIG. 2, FIG. 4, and FIG. 42 to FIG. 49, the air bubble-liquid mixture generating means 4 includes a flow-adjustment piece 111 and a plurality of (three) air introduction passages 112.

As shown in FIG. 46 to FIG. 49, the flow-adjustment piece 111 is made of a synthetic resin and formed into a cylindrical shape. The flow-adjustment piece 111 includes a flow-adjustment cylindrical portion 113, a flow-adjustment nozzle disk 114, a flow-adjustment annular plate 115, a plurality of (four) flow-adjustment-piece plates 116, and a plurality of liquid throttle holes 117.

As shown in FIG. 46 to FIG. 49, the flow-adjustment cylindrical portion 113 is formed into a cylindrical shape.

As shown in FIG. 46 to FIG. 49, the flow-adjustment nozzle disk 114 is a circular plate, and is formed to have a plate diameter equal to an outer diameter of the flow-adjustment cylindrical portion 113. The flow-adjustment nozzle disk 114 is arranged concentrically with the flow-adjustment cylindrical portion 113 with a cylinder center line J (a center line) of the flow-adjustment piece 111 (or the flow-adjustment cylindrical portion 113) being a center. The flow-adjustment nozzle disk 114 closes one cylinder end 113A of the flow-adjustment cylindrical portion 113, and is fixed to the flow-adjustment cylindrical portion 113. The flow-adjustment nozzle disk 114 is formed integrally with the flow-adjustment cylindrical portion 113.

As shown in FIG. 46 to FIG. 49, the flow-adjustment annular plate 115 is formed into an annular shape. The flow-adjustment annular plate 115 is arranged concentrically with the flow-adjustment cylindrical portion 113 and the flow-adjustment nozzle disk 114 with the cylinder center line J of the flow-adjustment piece 111 being a center. The flow-adjustment annular plate 115 is arranged on the other cylinder end 1136 side of the flow-adjustment cylindrical portion 113.

The flow-adjustment annular plate 115 is arranged at the other cylinder end 1136 of the flow-adjustment cylindrical portion 113 along an entire outer peripheral surface of the flow-adjustment cylindrical portion 113, and is formed integrally with the flow-adjustment cylindrical portion 113. The flow-adjustment annular plate 115 is formed to protrude from the outer peripheral surface of the flow-adjustment cylindrical portion 113 in a direction orthogonal to the cylinder center line J of the flow-adjustment piece 111 (or the flow-adjustment cylindrical portion 113).

As shown in FIG. 46 to FIG. 49, the four flow-adjustment-piece plates 116 are formed on the flow-adjustment nozzle disk 114.

The flow-adjustment-piece plates 116 are each formed into a rectangular shape (rectangle). The flow-adjustment-piece plates 116 are arranged at equal angular intervals of 90 degrees in the circumferential direction of the flow-adjustment nozzle disk 114 (or the flow-adjustment piece 111).

The flow-adjustment-piece plates 116 are formed to protrude by a plate width HS from a disk front flat surface 114A of the flow-adjustment nozzle disk 114 in a direction of the cylinder center line J (the center line) of the flow-adjustment piece 111. The flow-adjustment-piece plates 116 are each formed to protrude in a direction orthogonal to the flow-adjustment nozzle disk 114 so as to be away from the other cylinder end 1136 of the flow-adjustment cylindrical portion 113.

As shown in FIG. 46(*a*) and FIG. 47, the flow-adjustment-piece plates 116 are each formed to extend by a plate length LS from the plate center line J of the flow-adjustment nozzle disk 114 (or the cylinder center line of the flow-adjustment piece 111) toward the outer peripheral surface side of the flow-adjustment nozzle disk 114 (or the outer peripheral surface side of the flow-adjustment cylindrical portion 113). The flow-adjustment-piece plates 116 are formed to extend in the direction orthogonal to the plate center line J of the flow-adjustment nozzle disk 114 with gaps along the outer peripheral surface of the flow-adjustment nozzle disk 114.

The flow-adjustment-piece plates 116 each have a plate thickness TS in the peripheral direction of the flow-adjustment nozzle disk 114 (or the peripheral direction of the flow-adjustment piece 111).

As shown in FIG. 46(*a*), FIG. 47, FIG. 48, and FIG. 49(*b*), the flow-adjustment-piece plates 116 each include flow-adjustment flat surfaces 116A and 116B, and a flow inclined surface 118.

The flow-adjustment flat surfaces 116A and 116B are each formed into a rectangular shape so as to be parallel to each other with an interval equal to the plate thickness TS in the peripheral direction of the flow-adjustment nozzle disk 114.

As shown in FIG. 48(*b*), in the direction of the cylinder center line J of the flow-adjustment piece 111, the flow inclined surface 118 is formed to extend and incline from a protruding end 116D of each of the flow-adjustment-piece plates 116 (or one of plate ends) toward one flow-adjustment flat surface 116A and the flow-adjustment nozzle disk 114 (or the disk front flat surface 114A). For example, the flow inclined surface 118 is formed into an arc shape to protrude with a radius rX between the protruding end 116D of each of the flow-adjustment-piece plates 116 and the one flow-adjustment flat surface 116A.

As shown in FIG. 46, FIG. 47, and FIG. 49(*a*), the plurality of liquid throttle holes 117 are formed in the flow-adjustment nozzle disk 114 between the flow-adjustment-piece plates 116. Each of the liquid throttle holes 117 is formed to pass through the flow-adjustment nozzle disk 114 in the direction of the cylinder center line J of the flow-adjustment piece 111 (or the plate center line J of the flow-adjustment nozzle disk 114), and is opened in the disk front flat surface 114A and a disk back flat surface 114B of the flow-adjustment nozzle disk 114. The liquid throttle holes 117 are formed to pass through the flow-adjustment nozzle disk 114 so that a hole center line M of each of the liquid throttle holes 117 is arranged in parallel to the plate center line J of the flow-adjustment nozzle disk 114. The liquid throttle holes 117 are opened in the disk back flat surface 114B of the flow-adjustment nozzle disk 114, and communicate with an inside of the flow-adjustment cylindrical portion 113.

The liquid throttle holes 117 are each formed into a conical hole having a diameter gradually reducing from the disk back flat surface 114B toward the disk front flat surface 114A of the flow-adjustment nozzle disk 114 in the direction of the plate center line J of the flow-adjustment nozzle disk 114 (or the cylinder center line of the flow-adjustment piece 111).

As shown in FIG. 47, the plurality of liquid throttle holes 117 are arranged on each of a plurality of circles CG, CH, and CI having different radii, r6, r7, and r8 (r6<r6<r7), of the circles with the plate center line J of the flow-adjustment nozzle disk 114 being a center.

On each of the circles CG, CH, and CI, the plurality of liquid throttle holes 117 are arranged at equal intervals (equal pitches) in the peripheral direction (circumferential direction) of the flow-adjustment nozzle disk 114 (or the flow-adjustment piece 111).

As shown in FIG. 48(*b*), the flow-adjustment piece 111 has a piece height HP extending between the protruding end 116D of each of the flow-adjustment-piece plates 116 and the other cylinder end 113B of the flow-adjustment cylindrical portion 113 in the direction of the cylinder center line J of flow-adjustment piece 111. The piece height HP is set smaller than the hole length L1 of the small-diameter hole portion 102C of the shower cylindrical portion 97.

In the air bubble-liquid mixture generating means 4, as shown in FIG. 42 to FIG. 45, the plurality of (three) air introduction passages 112 are formed in the shower nozzle 3.

The air introduction passages 112 are arranged on a circle CJ that has a center along the cylinder center line H (the center line) of the shower nozzle 3 and is located on an outer side of the air bubble-liquid mixture jetting holes 98. The air introduction passages 112 are arranged at equal angular intervals of 120 degrees in the peripheral direction of the shower nozzle 3 (or the shower cylindrical portion 97).

The air introduction passages 112 are opened in a disk front surface 96A of the shower nozzle plate 96. As shown in FIG. 44(*b*), the air introduction passages 112 are formed to extend from the disk front surface 96A of the shower nozzle plate 96 toward the other cylinder end 97B side of the shower cylindrical portion 97 in the direction of the cylinder center line H of the shower nozzle 3. The air introduction passages 112 are formed on the cylinder end 97B side of the shower cylindrical portion 97 to pass through the shower cylindrical portion 97 in the direction orthogonal to the cylinder center line H of the shower nozzle 3.

The air introduction passages 112 are opened into the air bubble mixing space BR in the shower cylindrical portion 97. The air introduction passages 112 are adjacent to the second hole step portion 112E of the shower cylindrical portion 97, and are opened in the medium-diameter hole portion 102B (or in the nozzle hole 102).

As shown in FIG. 50 and FIG. 51, the flow-adjustment piece 111 of the air bubble-liquid mixture generating means 4 is incorporated in the shower nozzle 3.

The flow-adjustment piece 111 is arranged concentrically with the shower cylindrical portion 97 with the cylinder center line H of the shower nozzle 3 being a center. The flow-adjustment piece 111 is arranged in the air bubble mixing space BR in the shower cylindrical portion 97. The flow-adjustment piece 111 is press-fitted (inserted) into the nozzle hole 102 (or into the large-diameter hole portion 102A and the medium-diameter hole portion 102B) of the shower cylindrical portion 97 from the flow-adjustment-piece plates 116.

The flow-adjustment cylindrical portion 113 of the flow-adjustment piece 111 is press-fitted (inserted) into the medium-diameter hole portion 102B of the shower cylindrical portion 97. The flow-adjustment cylindrical portion 113 is press-fitted (inserted) into the medium-diameter hole portion 102B (or the nozzle hole 102) of the shower cylindrical portion 97 with a gap between the disk back flat surface 114B of the flow-adjustment nozzle disk 114 and the second hole step portion 102E of the nozzle hole 102 in the cylinder center line H of the shower nozzle 3. At this time, as shown in FIG. 50(*a*), the flow-adjustment piece 11 is press-fitted into the shower cylindrical portion 97 so that one of the flow-adjustment-piece plates 116 is arranged at a center of one of the air introduction passages 112 in the peripheral direction of the shower nozzle 3.

The flow-adjustment annular plate 115 of the flow-adjustment piece 111 is press-fitted (inserted) into the large-diameter hole portion 102A of the shower cylindrical portion 97, and is brought into abutment against the first hole step portion 102D.

Thus, as shown in FIG. 51, the flow-adjustment nozzle disk 114 of the flow-adjustment piece 111 is arranged in the air bubble mixing space BR in the shower cylindrical portion 97 at a distance from the disk back flat surface 96B of the shower nozzle plate 96 in the direction of the cylinder center line H of the shower nozzle 3. The flow-adjustment nozzle disk 114 and the flow-adjustment annular plate 115 seal the other cylinder end 97B of the shower cylindrical portion 97 in a liquid-tight manner, and are fixed to the shower cylindrical portion 97.

As shown in FIG. 50(*b*), the flow-adjustment-piece plates 116 of the flow-adjustment piece 111 are arranged in the air bubble mixing space BR between the shower nozzle plate 96 and the flow-adjustment nozzle disk 114.

As shown in FIG. 51(*b*), the flow-adjustment-piece plates 116 are arranged to protrude from the flow-adjustment nozzle disk 114 toward the shower nozzle plate 96 in the direction of the cylinder center line H of the shower nozzle 3 (or the cylinder center line J of the flow-adjustment piece 111) with a mixing gap GP between the disk back flat surface 96B of the shower nozzle plate 96 and the protruding end 116D. As shown in FIG. 51(*b*), the flow-adjustment-piece plates 116 are arranged to extend from the plate center line J of the flow-adjustment nozzle disk 114 (or the cylinder center line H of the shower nozzle 3) toward the shower cylindrical portion 97. The flow-adjustment-piece plates 116 are arranged with a gap between the inner peripheral surface of the shower cylindrical portion 97 and the flow-adjustment-piece plates 116.

As shown in FIG. 50(*a*), the liquid throttle holes 117 of the flow-adjustment piece 111 are arranged so that the hole center line M of each of the liquid throttle holes 117 is parallel to the cylinder center line H (the center line) of the shower cylindrical portion 97 (or the shower nozzle 3). The liquid throttle holes 117 are opened into the air bubble mixing space BR between the shower nozzle plate 96 and the flow-adjustment nozzle disk 114.

As shown in FIG. 51(*b*), in a space between the protruding end 116D of each of the flow-adjustment-piece plates 116 and the disk front flat surface 114A of the flow-adjustment nozzle disk 114 in the direction of the cylinder center line H of the shower nozzle 3, the air introduction passages 112 are opened into the air bubble mixing space BR in the direction orthogonal to the cylinder center line H of the shower cylindrical portion 97. As shown in FIG. 50(*b*), the air introduction passages 112 are adjacent to the disk front flat surface 114A of the flow-adjustment nozzle disk 114, and are opened into the air bubble mixing space BR.

With this configuration, through the air introduction passages 112, the air flows into the air bubble mixing space BR from the direction orthogonal to the hole center line M of each of the liquid throttle holes 117.

As shown in FIG. 44(*b*) and FIG. 51(*a*), each of the air introduction passages 112 is opened into the air bubble mixing space BR as a rectangular hole (an oblong hole) having an opening width (a hole width) AH in the peripheral direction of the shower cylindrical portion 97 (or the shower nozzle 3) and an opening height (hole height) AL in the direction H of the cylinder center line H of the shower cylindrical portion 97 (or the shower nozzle 3). The opening width AH of each of the air introduction passages 112 is larger than the plate width HS of each of the flow-adjustment-piece plates 116.

Thus, as shown in FIG. 50 and FIG. 51, the air bubble-liquid mixture generating means 4 is arranged so that the flow-adjustment piece 111 is incorporated in the shower nozzle 3 (or in the shower cylindrical portion 97).

In the shower head X, the mist generating means 5 (the mist generating unit) is configured to form the liquid into the mist of liquid droplets in which the air bubbles are mixed.

As shown in FIG. 1 to FIG. 5, FIG. 43 to FIG. 45, and FIG. 52 to FIG. 55, the mist generating means 5 includes a plurality of mist throttle holes 121, a mist ring body 122, and a sealing ring 130.

As shown in FIG. 42(*a*), FIG. 43, FIG. 44(*b*), and FIG. 45, the plurality of mist throttle holes 121 are formed in the shower nozzle plate 96 (or the shower nozzle 3). The number of the mist throttle holes 121 is, for example, twelve.

As shown in FIG. 43(*a*), the mist throttle holes 12 are arranged in the shower nozzle plate 96 on the outer side of the air bubble-liquid mixture jetting holes 98. The mist throttle holes 121 are arranged (in a concyclic manner) on a circle CK that has a center along the cylinder center line H (the center line) of the shower nozzle 3 (or the shower cylindrical portion 97) and is located on the outer side of the air bubble-liquid mixture jetting holes 98.

As shown in FIG. 43, the mist throttle holes 121 are arranged at equal angular intervals (equal pitches) of 30 degrees in the peripheral direction of the shower nozzle 3 (or the shower cylindrical portion 97).

With this configuration, the plurality of mist throttle holes 121 are arranged in the shower nozzle 3 on the outer side of the air bubble-liquid mixture jetting holes 98 (or the air bubble-liquid mixture generating means 4).

As shown in FIG. 42, FIG. 43, FIG. 44(*b*), and FIG. 45, the mist throttle holes 121 are each formed to pass through the shower nozzle plate 96 in the direction of the cylinder center line H of the shower nozzle 3, and are opened in the disk front surface 96A and the disk back flat surface 96B of the shower nozzle plate 96. The mist throttle holes 121 are arranged on the outer side of the air introduction passages 112 (or the air bubble-liquid mixture jetting holes 98) in a direction orthogonal to the cylinder center direction H of the shower nozzle 3, and are opened into the mist annular space YM.

As shown in FIG. 44(*b*), the mist throttle holes 121 are each formed into a conical hole having a diameter gradually reducing from the disk back flat surface 96B toward the disk front surface 96A of the shower nozzle plate 96 in the direction of the cylinder center line H of the shower nozzle 3.

As shown in FIG. 44, the mist throttle holes 121 each have a hole length ML in the direction of the cylinder center line H of the shower nozzle 3. As shown in FIG. 45, the mist throttle holes 121 each have a hole diameter dM at the disk front surface 96A of the shower nozzle plate 96, and has a hole diameter dF at the disk back flat surface 96B (hole diameter dM>hole diameter dF).

As shown in FIG. 52 to FIG. 55, the mist ring body 122 includes a guide ring 123 and a plurality of mist guides 124.

As shown in FIG. 52 to FIG. 55, the guide ring 123 is made of a synthetic resin and formed into an annular shape. As shown in FIG. 43 and FIG. 54(*a*), the guide ring 123 has a center circle CL having a ring diameter D8 equal to the diameter of the circle CK on which the mist throttle holes 121 are arranged.

As shown in FIG. 52 to FIG. 55, the guide ring 123 includes a plurality of guide protrusions 125. The number of the guide protrusions 125 is, for example, twelve, the same as the number of the mist throttle holes 121.

The guide protrusions 125 are arranged on the circle CL of the guide ring 123. The guide protrusions 125 are arranged at equal angular intervals of 30 degrees in the circumferential direction of the guide ring 123. The guide protrusions 125 are formed to protrude in a direction orthogonal to a center line K of the mist ring body 122 (or the guide ring 123), and are formed integrally with the guide ring 123.

As shown in FIG. 52 to FIG. 55, the plurality of mist guides 124 are each made of a synthetic resin and formed into a conical spiral (conical helix or spiral having a truncated cone shape). As shown in FIG. 52(*b*), the mist guides 124 each include a cone upper surface 124A, a cone bottom flat surface 124B, a cone side surface 124C, and a plurality of spiral surfaces, for example, first and second spiral surfaces 127 and 128 (helical surfaces). The number of the mist guides 124 is twelve, the same as the number of the mist throttle holes 121.

The first and second spiral surfaces 127 and 128 are each formed into the same spiral shape. The first and second spiral surfaces 127 and 128 are arranged between the cone bottom flat surface 124B and the cone upper surface 124A to cross the cone side surface 124C.

The first and second spiral surfaces 127 and 128 are arranged so as to be point symmetrical with respect to a cone center line L. The second spiral surface 128 is arranged at a position turned about the cone center line L by an angle of 180 degrees from a position of the first spiral surface 127.

The first and second spiral surfaces 127 and 128 are each formed into a spiral shape having a diameter gradually reducing from the cone bottom flat surface 124B toward the cone upper surface 124A, and are formed to extend to the cone upper surface 124A.

The first and second spiral surfaces 127 and 128 are arranged so as to be opposed to each other at the cone upper surface 124A.

As shown in FIG. 54(*a*), the mist guides 124 each have a guide height GL in a direction of the cone center line L. The guide height GL is set smaller than the hole length ML of each of the mist throttle holes 121.

As shown in FIG. 55(*a*), the mist guides 124 each have a maximum bottom width GH at the cone bottom flat surface 124B. The maximum bottom width GH is set smaller than the hole diameter dM of each of the mist throttle holes 121.

As shown in FIG. 52 to FIG. 55, the mist guides 124 are fixed to the guide ring 123, and are formed integrally with the guide ring 123. As shown in FIG. 53(*a*), the mist guides 124 are arranged on the circle CL of the guide ring 123. Each of the mist guides 124 is arranged so that the cone center line L (guide center line) thereof is located on the circle CL of the guide ring 123. The mist guides 124 are arranged between the guide protrusions 125 at equal angular intervals of 30 degrees in the peripheral direction of the guide ring 123. Each of the mist guides 124 is arranged so that a surface end of the first spiral surface 127 and a surface end of the second spiral surface 128 are respectively located at (aligned with) an outer peripheral surface and an inner peripheral surface of the guide ring 123 at the cone bottom flat surface 124B.

As shown in FIG. 52, FIG. 54(*b*), and FIG. 55, each of the mist guides 124 is fixed (formed) integrally with the guide ring 123 so that the cone bottom flat surface 124B is held in abutment against the guide ring 123. In each of the mist guides 124, as shown in FIG. 55, the cone bottom flat surface 124B is fixed to the guide ring 123 so as to protrude from the inner peripheral surface and the outer peripheral surface of the guide ring 123 in the direction orthogonal to the center line K of the mist ring body 122 (or the guide ring 123).

With this configuration, the mist guides 124 and the guide ring 123 form the mist ring body 122. The mist ring body 122 includes the guide ring 123, the mist guides 124, and the guide protrusions 125 formed integrally with each other.

In the mist generating means 5, as shown in FIG. 56 and FIG. 57, the mist ring body 122 (including the guide ring 123 and the mist guides 124) is incorporated in the shower nozzle 3.

As shown in FIG. 56 and FIG. 57, the mist ring body 122 is arranged concentrically with the shower cylindrical portion 97 with the cylinder center line H (the center line) of the shower nozzle 3 (or the shower cylindrical portion 97) being a center. The mist ring body 122 is arranged in the mist annular space YM so that the guide ring 123 is externally fitted to the shower cylindrical portion 97. Thus, the guide ring 123 is arranged on the outer side of the air bubble-liquid mixture jetting holes 98.

As shown in FIG. 56 and FIG. 57, the mist ring body 122 is arranged so that the mist guides 124 are inserted in the mist throttle holes 121, respectively. The mist ring body 122 is arranged so that the cone upper surface 124A of each of the mist guides 124 is directed toward each of the mist throttle holes 121 in the mist annular space YM.

Each of the mist guides 124 is inserted into each of the mist throttle holes 121 from the cone upper surface 124A. Each of the mist guides 124 is arranged in each of the mist throttle holes 121 so that the cone center line L is aligned with a hole center line N of each of the mist throttle holes 121. Each of the mist guides 124 is inserted into each of the mist throttle holes 121 from the cone upper surface 124A with a gap between the cone side surface 124C and a conical inner peripheral surface 121A of each of the mist throttle holes 121. Each of the mist guides 124 is fitted in each of the mist throttle holes 121 so that the cone bottom flat surface 124B side (or the cone side surface 124C on the cone bottom flat surface 124B side) is held in abutment against the conical inner peripheral surface 121A of each of the mist throttle holes 121.

Thus, each of the mist guides 124 is fitted in each of the mist throttle holes 121 so as to define first and second mist flow passages 51 and 52 each having a spiral shape between the first and second spiral surfaces 127 and 128 and the conical inner peripheral surface 121A of each of the mist throttle holes 121 and between the cone side surface 124C and the conical inner peripheral surface 121A. Each of the mist guides 124 and each of the mist throttle holes 121 define the first and second mist flow passages 51 and 52 each having a spiral shape (helical shape) along the first and second spiral surfaces 127 and 128. As shown in FIG. 57(*b*), the first and second mist flow passages 51 and 52 are each defined in a spiral shape between the first and second spiral surfaces 127 and 128 and the conical inner peripheral surface 121A of each of the mist throttle holes 121 and between the cone side surface 124C of each of the mist guides 124 and the conical inner peripheral surface 121A. The first and second mist flow passages 51 and 52 are each defined in a spiral shape to extend from the cone bottom flat surface 124B to the cone upper surface 124A of the mist guide 124 in the direction of the cylinder center line H of the shower nozzle 3, and are opened in each of the mist throttle holes 121 and in the disk back flat surface 96B of the shower nozzle plate 96.

As shown in FIG. 56 and FIG. 57, along with insertion of the mist guides 124 into the mist throttle holes 121, the guide ring 123 and the guide protrusions 125 are brought into abutment against the disk back flat surface 126B of the shower nozzle plate 96 through the mist annular space YM.

As shown in FIG. 57(*a*), the sealing ring 130 is externally fitted to the shower cylindrical portion 97 of the shower nozzle 3, and is brought into abutment against the sealing step portion 101. The sealing ring 130 is externally fitted to the shower cylindrical portion 97 so as to protrude from the outer peripheral surface of the shower cylindrical portion 97 into the mist annular space YM in the direction orthogonal to the cylinder center line H of the shower nozzle 3.

Thus, the sealing ring 130 is freely brought into abutment against the guide protrusions 125 of the mist ring body 122, thereby preventing the mist ring body 122 from slipping off.

As shown in FIG. 50, FIG. 51, FIG. 56, and FIG. 57, the flow-adjustment piece 111 and the mist ring body 122 (including the guide ring 123 and the mist guides 124) are incorporated in the shower nozzle 3. Thus, the shower nozzle 3, the air bubble-liquid mixture generating means 4, and the mist generating means 5 form a nozzle unit NU.

As shown in FIG. 58 to FIG. 60, the nozzle unit NU (including the shower nozzle 3, the air bubble-liquid mixture generating means 4, and the mist generating means 5) is arranged in the flow passage switching means 2 (or in the switching handle 21) fitted in the shower main body 1 (or the head portion 7).

As shown in FIG. 58, the nozzle unit NU is arranged so that the flow-adjustment piece 111 (or the disk back flat surface 114B of the flow-adjustment nozzle disk 114) is directed toward the large-diameter hole portion 33A (or the handle hole 33) of the switching handle 21. The nozzle unit NU is arranged concentrically with the switching handle 21 with the cylinder center line B of the switching handle 21 being a center.

As shown in FIG. 58, the nozzle unit NU is inserted into the large-diameter hole portion 33A of the switching handle 21 from the other cylinder end 95B of the nozzle outer cylindrical portion 95 of the shower nozzle 3.

The nozzle unit NU is arranged so that the threaded portion 100 of the shower nozzle 3 is screwed into the threaded portion 34 of the switching handle 21. Through turning of the nozzle unit NU, the nozzle outer cylindrical portion 95 of the shower nozzle 3 is received in the large-diameter hole portion 33A (or in the handle hole) of the switching handle 21. The shower nozzle 3 is turned until the other cylinder end 95B of the nozzle outer cylindrical portion 95 is brought into abutment against the first valve element protruding portions 80 of the switching valve element 27.

At this time, the sealing ring 103 of the shower nozzle 3 is brought into in press-contact with the large-diameter hole portion 33A of the switching handle 21, thereby sealing the large-diameter hole portion 33A in a liquid-tight manner.

Thus, the shower nozzle 3 of the nozzle unit NU is fixed to the switching handle 21, and is fitted to the other end 1B of the shower main body 1.

In the shower nozzle 3, the shower nozzle plate 96 defines a liquid inflow space RP in the outflow passage 10. The liquid inflow space RP is a space sealed in a liquid-tight manner, and the liquid is caused to flow into the liquid inflow space RP through the outflow passage 10.

In the nozzle unit NU, as shown in FIG. 58, the shower cylindrical portion 97 of the shower nozzle 3 and the flow-adjustment piece 111 are inserted into the large-diameter hole portion 87A (or into the shower outflow hole 87/into the second valve element cylindrical portion 73) of the switching valve element 27 within the liquid inflow space RP. The shower cylindrical portion 97 and the flow-adjustment piece 111 are arranged with a gap between the other cylinder end 97B and the valve element disk 74 (or the disk front flat surface 74A) in the direction of the cylinder center line F of the switching valve element 27. Within the liquid inflow space RP, the sealing ring 130 of the shower nozzle 3 is inserted into the large-diameter hole portion 87A (or into the shower outflow hole 87) of the switching valve element 27, and is brought into abutment against the hole step portion 87C of the switching valve element 27. In the large-diameter hole portion 87A, the sealing ring 130 is brought into press-contact with the inner peripheral surface of the second valve element cylindrical portion 73, thereby sealing the large-diameter hole portion 87A of the switching valve element 27 in a liquid-tight manner.

Thus, the shower cylindrical portion 97 of the shower nozzle 3 is inserted in the large-diameter hole portion 87A (or the shower outflow hole 87) of the switching valve element 27 so as to protrude toward the outflow passage 10 side (into the liquid inflow space RP). The liquid (liquid in a liquid inflow space PR) having flowed out through the outflow passage 10 and having flowed out through the switching valve element 27 is caused to flow from the other cylinder end 97B (or the liquid throttle holes 117 of the flow-adjustment piece 111) into the air bubble mixing space BR in the shower cylindrical portion 97.

When the shower nozzle 3 of the nozzle unit NU is fixed to the switching handle 21, the shower nozzle 3, the flow-adjustment piece 111 (of the air bubble-liquid mixture generating means 4), the mist ring body 122 (of the mist generating means 5), and the switching valve element 27 are freely turnable together with the switching handle 21 with respect to the switching valve seat element 25, the switching base 22, and the shower main body 1.

As shown in FIG. 58, the flow-adjustment piece 111 of the air bubble-liquid mixture generating means 4 is arranged with a gap between the valve element disk 74 (or the disk front flat surface 74A) of the switching valve element 27 and the flow-adjustment piece 111, and is inserted in the large-diameter hole portion 87A (or in the second valve element cylindrical portion 73) of the switching valve element 27.

Thus, as shown in FIG. 60, the liquid throttle holes 117 are each opened to the outflow passage 10 side (in the liquid inflow space RP), and are each opened in the large-diameter hole portion 87A of the switching valve element 27 and the air bubble mixing space BR. The liquid (liquid in the liquid inflow space RP) having flowed out through the outflow passage 10 and having flowed out through the switching valve element 27 is jetted into the air bubble mixing space BR through the liquid throttle holes 117.

As shown in FIG. 58, the flow passage switching means 2 is arranged between the flow-adjustment piece 111 of the air bubble-liquid mixture generating means 4 and the outflow passage 10 and in the outflow passage 10 of the shower main body 1.

In the flow passage switching means 2, the switching valve seat element 25 and the switching valve element 27 are arranged between the flow-adjustment piece 111 and the outflow passage 10 and within the liquid inflow space RP, and the switching base 22 is arranged in the outflow passage 10.

As shown in FIG. 59, the mist generating means 5 is configured to form the liquid (liquid caused to flow out through the outflow passage 10) caused to flow into the mist generating means 5 through the flow passage switching means 2 (or the switching valve element 27) into the mist of liquid droplets in which the air bubbles are mixed.

In the mist generating means 5, the mist throttle holes 121 are each opened to the outflow passage 10 side and in the liquid inflow space RP between the shower nozzle plate 96 and the flow passage switching means 2 (or the switching valve element 27).

With this configuration, the mist throttle holes 121 are each formed to pass through the shower nozzle plate 96 while gradually reducing a diameter from the outflow passage 10 side (or the liquid inflow space BR side).

The mist throttle holes 121 each communicate with the outflow passage 10 through the outer outflow holes 82 of the switching valve element 27, the valve seat holes 64 and 65 of the switching valve seat element 25, and the base inflow passages Z of the switching base 22 (or the liquid inflow space PR).

In the mist generating means 5, as shown in FIG. 59, the mist ring body 122 is arranged so that the guide ring 123 is held in abutment against the one cylinder end 73A of the second valve element cylindrical portion 73.

The guide ring 123 and the guide protrusions 125 are brought into abutment against the disk back flat surface 96B of the shower nozzle plate 96 from the outflow passage 10 side (or the liquid inflow space PR side or the mist annular space YM side).

As shown in FIG. 59, the first and second mist flow passages 51 and 52 are opened between the flow passage switching means 2 and the shower nozzle 3, and communicate with the outflow passage 10.

When the shower nozzle 3 is turned, the switching valve element 27 and the switching valve seat element 25 are pressed toward the switching base 22 side, thereby compressing the coil spring 30. The compressed coil spring 30 urges the switching valve seat element 25 to the switching valve element 27 by a spring force, thereby bringing the valve seat disk 63 (or the disk front flat surface 63A) into press-contact with the sealing rings 28 of the cylindrical valve elements 76 and 77.

Thus, the sealing rings 28 connect the valve element hole 88 of the cylindrical valve element 76 and the valve element hole 90 of the cylindrical valve element 77 to the valve seat holes 64 and 65 in a liquid-tight manner, respectively.

When the nozzle unit NU (including the shower nozzle 3, the air bubble-liquid mixture generating means 4, and the mist generating means 5) and the flow passage switching means 2 (including the switching handle 21, the switching base 22, the switching valve seat element 25, and the switching valve element 27) are thus mounted to the shower main body 1 (or the head portion 7), as shown in FIG. 1 to FIG. 3 and FIG. 58 to FIG. 60, the shower head X is at the shower position P1.

At the shower position P1, as shown in FIG. 1 to FIG. 3 and FIG. 58 to FIG. the switching handle 21 is arranged so that the shower protruding portion 38 overlaps the reference protruding portion 14 (or the highest point 7$a$) of the shower main body 1.

At the shower position P1, as shown in FIG. 40, the switching valve element 27 is arranged so that the valve element hole 88 of the cylindrical valve element 76 and the valve element hole 90 of the cylindrical valve element 77 are opened (valve-opened) toward the valve seat holes 64 and 65 of the switching valve seat element 25, respectively.

At the shower position P1, the flow passage switching means 2 connects the liquid throttle holes 117 of the air bubble-liquid mixture generating means 4 to the outflow passage 10. The liquid throttle holes 117 of the flow-adjustment piece 111 each communicate with the outflow passage 10 of the shower main body 1 through the valve element flow passages 78 and 79 and the valve element holes 88 and 90 of the switching valve element 27, the valve seat holes 64 and 65 of the switching valve seat element 25, and the base inflow passages Z of the switching base 22.

At the shower position P1, as shown in FIG. 41, the switching valve element 27 is arranged so that the valve element regulating flat surface 83A of one of the first handle regulating protruding portions 83 and the valve element regulating flat surface of one of the second handle regulating protruding portions 85 are held in abutment against the first base regulating flat surface 59A of the base protrusion 59 and the fourth base regulating flat surface 60B of the base protrusion 60 of the switching base 22, respectively.

As shown in FIG. 2, FIG. 58, and FIG. 59, the shower head X at the shower position P1 causes the liquid to flow into the inflow passage 9 of the shower main body 1 (or the handle portion 6).

The liquid having flowed into the inflow passage 9 is caused to flow into the outflow passage 10. Through the outflow passage 10, the liquid having flowed from the inflow passage 9 is caused to flow out. As shown in FIG. 37 and FIG. 59, the liquid flows through the outflow passage 10 into the base inflow passages Z of the switching base 22, and then flows into the valve seat holes 64 and 65 of the switching valve seat element 25 in the liquid inflow space PR.

As shown in FIG. 59, the liquid having flowed into the valve seat holes 64 and 65 flows into the valve element hole 88 of the cylindrical valve element 76 and the valve element hole 89 of the cylindrical valve element 77 of the switching valve element 27.

In the switching valve element 27, as shown in FIG. 39, the liquid flows from the valve element holes 88 and 89 through the valve element flow passages 78 and 79 each having a helical shape into the shower outflow hole 87 in the second valve element cylindrical portion 73.

At this time, as shown in FIG. 39, the liquid is caused to helically flow through the valve element flow passages 78 and 79 each having a helical shape, and flow into the entire shower outflow hole 87 of the second valve element cylindrical portion 73.

The liquid having flowed into the shower outflow hole 87 is jetted into the air bubble mixing space BR through the liquid throttle holes 117 of the flow-adjustment piece 111 (or the air bubble-liquid mixture generating means 4). Thus, through the liquid throttle holes 117, the liquid having flowed out through the outflow passage 10 is jetted into the air bubble mixing space BR.

At this time, as shown in FIG. 60, through the liquid throttle holes 117 of the flow-adjustment piece 111, the liquid in the shower outflow hole 87 (or in the liquid inflow space PR) is jetted into the air bubble mixing space BR toward the air bubble-liquid mixture jetting holes 98 of the shower nozzle plate 96. The liquid is jetted between the flow-adjustment-piece plates 116 in the air bubble mixing space BR. In the air bubble mixing space BR, the liquid is jetted between the shower nozzle plate 96 and the flow-adjustment nozzle disk 114 while flowing (being adjusted in flow) in parallel to the cylinder center line H of the shower cylindrical portion 97 (or the shower nozzle 3).

When the liquid is jetted into the air bubble mixing space BR, due to the jet of the liquid, the air is introduced through the air introduction passages 112 into the air bubble mixing space BR. Through the air introduction passages 112, the air is caused to flow between the flow-adjustment-piece plates 116 in the air bubble mixing space BR.

As shown in FIG. 60, in the air bubble mixing space BR, the air introduction passages 112 cause the air to flow toward the disk front flat surface 74A of the valve element disk 74 that is adjacent to the liquid throttle holes 117 of the flow-adjustment piece 111. In the air bubble mixing space BR, the air is caused to flow (jet) between the flow-adjustment-piece plates 116 of the flow-adjustment piece 111 through the air introduction passages 112. The air is caused to flow (jet) into the air bubble mixing space BR from the direction orthogonal to the hole center line M of each of the liquid throttle holes 117.

Thus, the air introduced into the air bubble mixing space BR is mixed into the liquid at the same time as the liquid is jetted through the liquid throttle holes 117.

In the air bubble mixing space BR, the liquid and the air flow turbulently by being introduced by the protruding ends 116D along the flow inclined surfaces 118 of the flow-adjustment-piece plates 116, and then flow into the mixing gap GP between the protruding ends 116D of the flow-adjustment-piece plates 116 and the shower nozzle plate 96.

Thus, on the protruding end 116D side protruding toward the shower nozzle 3 (or the shower nozzle plate 96), each of the flow-adjustment-piece plates 116 causes the liquid jetted through the liquid throttle holes 117 to flow turbulently and flow into the mixing gap GP.

In the mixing gap GP within the air bubble mixing space BR, due to the turbulent flow, the air mixed into the liquid is broken (divided) into micrometer-sized air bubbles (microbubbles) and nanometer-sized air bubbles (ultrafine bubbles).

The micrometer-sized air bubbles (microbubbles) and the nanometer-sized air bubbles (ultrafine bubbles) mix with and dissolve in the liquid.

The liquid (air bubble-liquid mixture), in which the micrometer-sized air bubbles and the nanometer-sized air bubbles are mixed, is jetted to the outside through the air bubble-liquid mixture jetting holes 98 of the shower nozzle plate 96. Through the air bubble-liquid mixture jetting holes 98, the air bubble-liquid mixture is jetted out of the air bubble mixing space BR.

As shown in FIG. 61, in the shower head X at the shower position P1, the switching handle 21 is turned by an angle of 90 degrees with respect to the shower main body 1 (or the switching base 22 and the switching valve seat element 25) so that the mist protruding portion 39 is arranged at the reference protruding portion 14 of the shower main body 1.

The switching valve element 27 (of the flow passage switching means 2), the shower nozzle 3, the flow-adjustment piece 111 (of the air bubble-liquid mixture generating means 4), and the mist ring body 122 (of the mist generating means 5) are turned at the same time as the switching handle 21 is turned.

Thus, the shower head X is turned from the shower position P1 to the mist position P2.

At the mist position P2, as shown in FIG. 63 and FIG. 64, the valve element hole 88 of the cylindrical valve element 76 and the valve element hole 90 of the cylindrical valve element 77 of the switching valve element 27 are closed (valve-closed) by the valve seat disk 63 (or the disk front flat surface 63A) of the switching valve seat element 25.

At this time, along with turning of the switching valve element 27, the sealing rings 28 are brought into slide-contact with the valve seat disk 63 (or the disk front flat surface 63A) of the switching valve seat element 25 so that the cylindrical valve elements 76 and 77 are closed. Due to the spring force of the coil spring 30, the valve seat disk 63 of the switching valve seat element 25 is held in press-contact with the sealing rings 28 in the closed cylindrical valve elements 76 and 77.

Thus, the sealing rings 28 seal the valve element holes 88 and 90 in a liquid-tight manner, and block (close) the valve element holes 88 and 90 from the valve seat holes 64 and 65 of the switching valve seat element 25.

At the mist position P2, the flow passage switching means 2 connects the mist throttle holes 121 (of the mist ring body 122) of the mist generating means 5 to the outflow passage 10. The mist throttle holes 121 (of the mist ring body 122) communicate with the outflow passage 10 of the shower main body 1 through the liquid inflow space RP between the switching valve element 27 and the shower nozzle 3, the outer outflow holes 82 of the switching valve element 27, the valve seat holes 64 and 65 of the switching valve seat element 25, and the base inflow passages Z of the switching base 22.

At the mist position P2, as shown in FIG. 65, the switching valve element 27 is arranged so that the valve element regulating flat surface 83A of one of the first handle regulating protruding portions 83 and the valve element regulating flat surface of one of the second handle regulating protruding portions 85 are held in abutment against the second base regulating flat surface 59B of the base protrusion 59 and the third base regulating flat surface 60A of the base protrusion 60 of the switching base 22, respectively.

As shown in FIG. 62, the shower head X at the mist position P2 causes the liquid to flow into the inflow passage 9 of the shower main body 1 (or the handle portion 6).

The liquid having flowed into the inflow passage 9 is caused to flow into the outflow passage 10. Through the outflow passage 10, the liquid having flowed from the inflow passage 9 is caused to flow out. As shown in FIG. 37 and FIG. 62, the liquid flows through the outflow passage 10 into the base inflow passages Z of the switching base 22, and then flows into the valve seat holes 64 and 65 of the switching valve seat element 25 in the liquid inflow space PR.

As shown in FIG. 62, the liquid having flowed into the valve seat holes 64 and 65 flows through the outer outflow holes 82 of the switching valve element 27 into the liquid inflow space PR in the shower nozzle plate 96.

The liquid flows through the liquid inflow space PR into the mist throttle holes 121.

As shown in FIG. 66, the liquid having flowed into the mist throttle holes 121 flows through the first and second mist flow passages 51 and 52 each having a spiral shape, and then flows out of the mist throttle holes 121. Further, the mist of liquid droplets is jetted to the outside through the mist throttle holes 121.

The liquid is increased in pressure by flowing through the first and second mist flow passages 51 and 52 each having a spiral shape, and is jetted into the mist throttle holes 121 through the first and second mist flow passages 51 and 52.

Thus, the liquid jetted into the mist throttle holes 121 through the first and second mist flow passages 51 and 52 flows turbulently at high pressure. Further, when the mist of liquid droplets is jetted through the mist throttle holes 121, an outlet side of each of the mist throttle holes 121 (side from which the mist of liquid droplets is jetted) is brought into a negative pressure state.

With the outlet side of each of the mist throttle holes 121 brought into the negative pressure state, when the liquid, which is jetted into the mist throttle holes 121 through the first and second mist flow passages 51 and 52 and flows turbulently at high pressure, passes through the outlet portion of each of the mist throttle holes 121, the air bubbles are separated due to reduced pressure, and the air that is taken in at the time of jetting is broken (divided) by the turbulent flow. Thus, the liquid is formed into the mist of liquid droplets in which the micrometer-sized air bubbles (microbubbles) and the nanometer-sized air bubbles (ultrafine bubbles) are mixed and dissolved.

Further, at the cone upper surface 124A of each of the mist guides 124, the liquid is jetted into each of the mist throttle holes 121 through the first and second mist flow passages 51 and 52 opposed to each other, and collides with the mist guide 124 and the shower nozzle plate 96, thereby being formed into the mist of liquid droplets in which a sufficient volume of air bubbles is mixed. The mist of liquid droplets in which the air bubbles are mixed is jetted through each of the mist throttle holes 121. Through each of the mist throttle holes 121, the mist of liquid droplets in which the air bubbles are mixed is jetted to the outside.

Thus, the mist generating means 5 forms the liquid having flowed out through the outflow passage 10 into the mist of liquid droplets in which the air bubbles are mixed.

The shower head X is thus set to the shower position P1 or the mist position P2 through forward and reverse turning of the switching handle 21 within an angle range of 90 degrees.

At this time, as shown in FIG. 41 and FIG. 65, the base protrusions 59 and 60 of the switching base 22 and the first and second handle regulating protruding portions 83 and 85 of the switching valve element 27 regulate the turning of the switching handle 21 within the angle range of 90 degrees.

When the shower head X is switched to the shower position P1 or the mist position P2, the shower head X can jet the air bubble-liquid mixture at the shower position P1, and can jet the mist of liquid droplets, in which the air bubbles are mixed, at the mist position P2.

In the shower head X, the number of the flow-adjustment-piece plates 116 is not limited to four. It is only required that the number of the flow-adjustment-piece plates 116 be plural, for example, three, five, or six and so on. The plurality of flow-adjustment-piece plates 116 are formed on the flow-adjustment nozzle disk 114 at equal intervals in the peripheral direction of the flow-adjustment nozzle disk 114.

In the shower head X, the number of the spiral surfaces of the mist guide 124 is not limited to two. It is only required that the number of the spiral surfaces of the mist guide 124 be plural, for example, three, four, or five and so on. The plurality of spiral surfaces are formed on the mist guide 124 (or the cone side surface 124C) at equal intervals in the peripheral direction with the cone center line L of the mist guide 124 being a center.

EXAMPLES

For the shower head X, a "shower test" of generating the air bubble-liquid mixture (air bubble-water mixture) was carried out under a condition in which the shower nozzle 3 and the liquid generating means 4 (including the flow-adjustment piece 111 and the air introduction passages 112) were used.

For the shower head X, a "mist test" of generating the mist of liquid droplets (mist of water droplets) was carried out under a condition in which the mist generating means 5 (including the mist throttle holes 121 and the mist guides 124) was used.

In the "shower test" and the "mist test", similarly to the description with reference to FIG. 26 to FIG. 41, the flow passage switching means 2 (including the switching handle 21, the switching base 22, the switching valve seat element 25, and the switching valve element 27) was arranged in the shower main body 1.

<1> "Shower Test"

The "shower test" was carried out in Example 1, Example 2, Example 3, and Comparative Example 1.

(1) Shower Nozzle

The "shower nozzle 3" was common (the same) in Example 1, Example 2, Example 3, and Comparative Example 1.

The "shower nozzle 3" in Example 1, Example 2, Example 3, and Comparative Example 1 is described with reference to FIG. 43 to FIG. 45.

The "shower nozzle 3" in Example 1, Example 2, Example 3, and Comparative Example 1 has the following configuration.

Total number of the air bubble-liquid mixture jetting holes 98: 36

Hole diameter of each of the air bubble-liquid mixture jetting holes 98 (conical hole): 1.4 mm (opened in the disk front surface 96A)

Hole diameter of each of the air bubble-liquid mixture jetting holes 98 (conical hole): 1.8 mm (opened in the disk back flat surface 96B.)

Radius r3 of the circle CD: 3.5 mm.

Radius r4 of the circle CE: 6.2 mm.

Radius r5 of the circle CF: 8.7 mm.

Number of the air bubble-liquid mixture jetting holes 98 arranged on the circle CD: 6 (arranged at equal pitches in the peripheral direction of the shower cylindrical portion 97)

Number of the air bubble-liquid mixture jetting holes 98 arranged on the circle CE: 12 (arranged at equal pitches in the peripheral direction of the shower cylindrical portion 97)

Number of the air bubble-liquid mixture jetting holes 98 arranged on the circle CF: 18 (arranged at equal pitches in the peripheral direction of the shower cylindrical portion 97)

Inner diameter d5 of the small-diameter hole portion of the handle hole 33: 6.2 mm (2) Flow-adjustment Piece The "flow-adjustment piece 111" in Example 1 is described with reference to FIG. 47, FIG. 48, and FIG. 67.

The "flow-adjustment piece 111" in Example 1 has the following configuration.

Total number of the liquid throttle holes 117: 40

Hole diameter da of each of the liquid throttle holes 117: 0.6 mm (opened in the disk front flat surface 114A)

Hole diameter db of each of the liquid throttle holes 117: 1.0 mm (opened in the disk back flat surface 1146)

Radius r6 of the circle CG: 4.0 mm

Radius r7 of the circle CH: 6.0 mm

Radius r8 of the circle CI: 9.0 mm

Number of the liquid throttle holes 117 arranged on the circle CG: 8 (arranged at equal pitches in the peripheral direction of the flow-adjustment nozzle disk 114 so that two holes are formed in each region between the flow-adjustment-piece plates 116)

Number of the liquid throttle holes 117 arranged on the circle CH: 12 (arranged at equal pitches in the peripheral direction of the flow-adjustment nozzle disk 114 so that three holes are formed in each region between the flow-adjustment-piece plates 116)

Number of the liquid throttle holes 117 arranged on the circle CI: 20 (arranged at equal pitches in the peripheral direction of the flow-adjustment nozzle disk 114 so that five holes are formed in each region between the flow-adjustment-piece plates 116)

Piece height of the flow-adjustment piece 111: 8.2 mm

Number of the flow-adjustment-piece plates 116: 4 (arranged at equal angular intervals of 90 degrees in the peripheral direction of the flow-adjustment nozzle disk 114)

Plate width HS of the flow-adjustment-piece plate 116: 4.0 mm

Plate length LS of the flow-adjustment-piece plate 116: 9.2 mm

Plate thickness TS of the flow-adjustment-piece plate 116: 1.4 mm

Radius rX (of the arc) of the flow inclined surface 118: 1.0 mm

The "flow-adjustment piece 111" in Example 2 is described with reference to FIG. 47, FIG. 48, and FIG. 68.

The "flow-adjustment piece 111" in Example 2 has the following configuration.

Total number of the liquid throttle holes 117: 48

Hole diameter da of each of the liquid throttle holes 117: 0.6 mm (opened in the disk front flat surface 114A)

Hole diameter db of each of the liquid throttle holes 117: 1.0 mm (opened in the disk back flat surface 1146)

Radius r6 of the circle CG: 2.0 mm

Radius r7 of the circle CH: 4.0 mm

Radius r8 of the circle CI: 6.0 mm

Radius r9 of the circle CM: 9.0 mm

Number of the liquid throttle holes 117 arranged on the circle CG: 4 (arranged at equal pitches in the peripheral direction of the flow-adjustment nozzle disk 114 so that one hole is formed in each region between the flow-adjustment-piece plates 116)

Number of the liquid throttle holes 117 arranged on the circle CH: 8 (arranged at equal pitches in the peripheral direction of the flow-adjustment nozzle disk 114 so that two holes are formed in each region between the flow-adjustment-piece plates 116)

Number of the liquid throttle holes 117 arranged on the circle CI: 16 (arranged at equal pitches in the peripheral direction of the flow-adjustment nozzle disk 114 so that four holes are formed in each region between the flow-adjustment-piece plates 116)

Number of the liquid throttle holes 117 arranged on the circle CM: 20 (arranged at equal pitches in the peripheral direction of the flow-adjustment nozzle disk 114 so that five holes are formed in each region between the flow-adjustment-piece plates 116)

The "flow-adjustment piece 111" in Example 2 is the same as the "flow-adjustment piece 111" in Example 1 with regard to the piece height of the flow-adjustment piece 111, the number of the flow-adjustment-piece plates 116, the plate width HS of each of the flow-adjustment-piece plates 116, the plate length LS of each of the flow-adjustment-piece plates 116, the plate thickness TS of each of the flow-adjustment-piece plates 116, and the radius rX (of the arc) of the flow inclined surface 118.

The "flow-adjustment piece 111" in Example 3 is described with reference to FIG. 47, FIG. 48, and FIG. 69.

The "flow-adjustment piece 111" in Example 3 has the following configuration.

Total number of the liquid throttle holes 117: 52

Hole diameter da of each of the liquid throttle holes 117: 0.6 mm (opened in the disk front flat surface 114A)

Hole diameter db of each of the liquid throttle holes 117: 1.0 mm (opened in the disk back flat surface 1146)

Radius r6 of the circle CG: 2.0 mm

Radius r7 of the circle CH: 4.0 mm

Radius r8 of the circle CI: 6.0 mm

Radius r9 of the circle CM: 9.0 mm

Number of the liquid throttle holes 117 arranged on the circle CG: 4 (arranged at equal pitches in the peripheral direction of the flow-adjustment nozzle disk 114 so that one hole is formed in each region between the flow-adjustment-piece plates 116)

Number of the liquid throttle holes 117 arranged on the circle CH: 8 (arranged at equal pitches in the peripheral direction of the flow-adjustment nozzle disk 114 so that two holes are formed in each region between the flow-adjustment-piece plates 116)

Number of the liquid throttle holes 117 arranged on the circle CI: 16 (arranged at equal pitches in the peripheral direction of the flow-adjustment nozzle disk 114 so that four holes are formed in each region between the flow-adjustment-piece plates 116)

Number of the liquid throttle holes 117 arranged on the circle CM: 24 (arranged at equal pitches in the peripheral direction of the flow-adjustment nozzle disk 114 so that six holes are formed in each region between the flow-adjustment-piece plates 116)

The "flow-adjustment piece 111" in Example 3 is the same as the "flow-adjustment piece 111" in Example 1 with regard to the piece height of the flow-adjustment piece 111, the number of the flow-adjustment-piece plates 116, the plate width HS of each of the flow-adjustment-piece plates 116, the plate length LS of each of the flow-adjustment-piece plates 116, the plate thickness TS of each of the flow-adjustment-piece plates 116, and the radius rX (of the arc) of the flow inclined surface 118.

Unlike the "flow-adjustment piece" in Example 1, Example 1, and Example 3, the "flow-adjustment piece" in Comparative Example 1 is a "flow-adjustment piece without a flow-adjustment-piece plate", in which the flow-adjustment-piece plates are not formed on the flow-adjustment nozzle disk.

The "flow-adjustment piece" in Comparative Example 1 is the same as that in Example 1 with regard to the number of the liquid throttle holes, the hole diameter of each of the liquid throttle holes, the radii r6 to r8 of the circles CG to CI, and the number of the liquid throttle holes arranged on each of the circles CG to CI.

(3) Air Introduction Passage

The "air introduction passage 112" is common (the same) in Example 1, Example 2, Example 3, and Comparative Example 1.

The "air introduction passage 112" in Example 1, Example 2, Example 3, and Comparative Example 1 is described with reference to FIG. 43 and FIG. 44.

The "air introduction passage 112" in Example 1, Example 2, Example 3, and Comparative Example 1 has the following configuration.

Number of the air introduction passages: 3

Radius of the circle CJ: 12.25 mm

The air introduction passages 112 were arranged on the circle CJ, and were arranged at equal angular intervals (equal pitches) of 120 degrees in the circumferential direction of the circle CJ (or the shower nozzle 3).

(4) Air Bubble Mixing Space and Mixing Gap

Similarly to the description with reference to FIG. 50 and FIG. 51, the "flow-adjustment piece" in Example 1, Example 2, Example 3, and Comparative Example 1 was inserted in the air bubble mixing space BR (or in the shower cylindrical portion 97), and was fixed to the shower nozzle 3.

The "air bubble mixing space BR" is common (the same) in Example 1, Example 2, Example 3, and Comparative Example 1, and has the following configuration.

Hole diameter d5 of the air bubble mixing space: 6.2 mm

Hole length LK of the air bubble mixing space: 7.0 mm

The "mixing gap GP" is common (the same) in Example 1, Example 2, and Example 3, and has the following configuration.

Mixing gap GP: 2.8 mm (5) Arrangement and Opening Dimension of Air Introduction Passage Similarly to the description with reference to FIG. 44 and FIG. 51, the "air introduction passage" in Example 1, Example 2, Example 3, and Comparative Example 1 was opened adjacent to the flow-adjustment nozzle disk 114 (or the disk front flat surface 114A).

The "air introduction passage" in Example 1, Example 2, Example 3, and Comparative Example 1 has the following configuration.

Opening width AH: 5.05 mm

Opening height AL: 0.8 mm

The opening width is a dimension in the peripheral direction of the shower cylindrical portion. The opening height is a dimension in the direction of the cylinder center line of the shower cylindrical portion.

(6) Liquid, Static Liquid Pressure (Hydrostatic Pressure) of Liquid, and Liquid Feeding Rate (Water Feeding Rate)

The "liquid", "static liquid pressure (hydrostatic pressure) of the liquid", and a "liquid feeding rate (water feeding rate)" are the same in Example 1, Example 2, Example 3, and Comparative Example 1.

In Example 1, Example 2, Example 3, and Comparative Example 1, the following is employed.

Liquid: tap water (water),

Static liquid pressure (hydrostatic pressure) of the liquid (water): 0.2 MPa (megapascals)

Liquid feeding rate (water feeding rate) of the liquid (water): 9.2 liters/minute (9.2 liters per minute)

In Example 1, Example 2, Example 3, and Comparative Example 1, under a condition in which the "hydrostatic pressure" was 0.2 MPa and the "water feeding rate" was 9.2 liters/minute, the tap water was caused to flow into the inflow passage and jetted through the air bubble-liquid mixture jetting holes.

(7) Measurement of Quantity of Air Bubbles

In the "shower test", the air bubble-water mixture was jetted through the air bubble-liquid mixture jetting holes, and a quantity of air bubbles mixed into the air bubble-water mixture was measured.

In Example 1, the quantity of air bubbles (bubble quantity) including the micrometer-sized air bubbles (microbubbles) and the nanometer-sized air bubbles (ultrafine bubbles) was measured in a case in which the air bubble-water mixture was jetted at a rate of 8 liters/minute and a rate of 10 liters/minute.

In Example 2, the quantity of air bubbles (bubble quantity) including the microbubbles and the ultrafine bubbles was measured in a case in which the air bubble-water mixture was jetted at a rate of 10 liters/minute.

In Example 3, the quantity of air bubbles (bubble quantity) including the microbubbles and the ultrafine bubbles was measured in a case in which the air bubble-water mixture was jetted at a rate of 10 liters/minute.

In Comparative Example 1, the quantity of air bubbles (bubble quantity) including the microbubbles and the ultrafine bubbles was measured in a case in which the air bubble-water mixture was jetted at a rate of 10 liters/minute.

In Example 1, Example 2, Example 3, and Comparative Example 1, the quantity of air bubbles (bubble quantity) contained per a milliliter (ml) of the air bubble-water mixture was measured.

In Example 1, Example 2, Example 3, and Comparative Example 1, a total quantity of microbubbles and a microbubble diameter of the microbubbles largest in quantity were measured.

In Example 1, Example 2, Example 3, and Comparative Example 1, a total quantity of ultrafine bubbles and an ultrafine bubble diameter of ultrafine bubbles largest in quantity were measured.

In Example 1, a minimum microbubble diameter and a quantity of microbubbles each having the minimum microbubble diameter were measured.

Measurement results of the microbubbles in Example 1, Example 2, Example 3, and Comparative Example 1 are shown in "Table 1".

TABLE 1

Measurement results of microbubbles in "shower test"

| | Diameter of the microbubbles largest in quantity | Quantity of the microbubbles largest in quantity | Total quantity of microbubbles |
|---|---|---|---|
| Example 1 (10 L/min.) | 28.67 | 6,060 | 8,492 |
| Example 1 (8 L/min.) | 29.12 | 3,918 | 4,634 |
| Example 2 | 27.75 | 2,653 | 3,509 |
| Example 3 | 27.92 | 4,707 | 6,023 |
| Comparative Example 1 | 7.19 | 595 | 1,722 |

Diameter of the microbubbles: micrometer
Quantity of the microbubbles largest in quantity: number of the microbubbles/milliliter
Total quantity of microbubbles: total number of microbubbles/milliliter In Example 1, the minimum microbubble diameter was 4.44 micrometers (μm), and a quantity of the microbubbles smallest in quantity was 1,200/milliliter.

In Example 1, as shown in "Table 1", at the rate of 10 liters/minute, the diameter of the microbubbles largest in quantity was 28.67 micrometers (μm), the quantity of the microbubbles largest in quantity was 6,060/milliliter, and the total quantity of microbubbles was 8,492/milliliter.

In Example 1, as shown in "Table 1", at the rate of 8 liters/minute, the diameter of the microbubbles largest in quantity was 29.12 micrometers (μm), the quantity of the microbubbles largest in quantity was 3,918/milliliter, and the total quantity of microbubbles was 4,634/milliliter.

In Example 2, as shown in "Table 1", the diameter of the microbubbles largest in quantity was 27.92 micrometers (μm), the quantity of the microbubbles largest in quantity was 2,653/milliliter, and the total quantity of microbubbles was 3,509/milliliter.

In Example 3, as shown in "Table 1", the diameter of the microbubbles largest in quantity was 27.92 micrometers (μm), the quantity of the microbubbles largest in quantity was 4,707/milliliter, and the total quantity of microbubbles was 6,023/milliliter.

In Comparative Example 1, as shown in "Table 1", the diameter of the microbubbles largest in quantity was 7.19 micrometers (μm), the quantity of the microbubbles largest in quantity was 595/milliliter, and the total quantity of microbubbles was 1,722/milliliter.

In Example 1, Example 2, and Example 3, as compared to Comparative Example 1, the diameter of the microbubbles largest in quantity can be increased.

In Example 1, Example 2, and Example 3, as compared to Comparative Example 1, a sufficient volume of the microbubbles largest in quantity can be mixed into water (liquid). In particular, in Example 1, at the rate of 10 liters/minute, the diameter of the microbubbles largest in quantity was 28.67 micrometers (μm), and the quantity of the microbubbles largest in quantity was 6,060/milliliter. Thus, as compared to Example 2, Example 3, and Comparative Example 1, the sufficient volume of the microbubbles largest in quantity can be mixed into water (liquid), and hence significant effects can be expected.

In Example 1, Example 2, and Example 3, as compared to Comparative Example 1, the sufficient volume of microbubbles can be mixed into water (liquid).

Thus, when the plurality of flow-adjustment-piece plates 116 are formed on the flow-adjustment nozzle disk 114 as in the "flow-adjustment piece" in Example 1, Example 2, and Example 3, the sufficient volume of microbubbles can be mixed into water (liquid).

Measurement results of the ultrafine bubbles in Example 1, Example 2, Example 3, and Comparative Example 1 are shown in "Table 2".

TABLE 2

Measurement results of ultrafine bubbles in "shower test"

| | Diameter of the ultrafine bubbles largest in quantity | Quantity of the ultrafine bubbles largest in quantity | Total quantity of ultrafine bubbles |
|---|---|---|---|
| Example 1 (10 L/min.) | 98 | 1,400,000 | 27,000,000 |
| Example 1 (8 L/min.) | 136.9 | 730,000 | 13,000,000 |
| Example 2 | 134.5 | 290,000 | 5,400,000 |
| Example 3 | 128.8 | 1,600,000 | 3,800,000 |
| Comparative Example 1 | 150.8 | 440,000 | 6,500,000 |

Diameter of the ultrafine bubbles: nanometer
Quantity of the ultrafine bubbles largest in quantity: number of the ultrafine bubbles/milliliter
Total quantity of ultrafine bubbles: total number of ultrafine bubbles/milliliter In Example 1, as shown in "Table 2", at the rate of 10 liters/minute, the diameter of ultrafine bubbles largest in quantity was 98 nanometers (nm), the quantity of ultrafine bubbles largest in quantity was 140,000/milliliter, and the total quantity of ultrafine bubbles was 27,000,000/milliliter.

In Example 1, as shown in "Table 2", at the rate of 8 liters/minute, the diameter of ultrafine bubbles largest in quantity was 136.9 nanometers (nm), the quantity of ultrafine bubbles largest in quantity was 730,000/milliliter, and the total quantity of ultrafine bubbles was 13,000,000/milliliter.

In Example 2, as shown in "Table 2", the diameter of ultrafine bubbles largest in quantity was 134.5 nanometers (nm), the quantity of ultrafine bubbles largest in quantity was 290,000/milliliter, and the total quantity of ultrafine bubbles was 5,400,000/milliliter.

In Example 3, as shown in "Table 2", the diameter of ultrafine bubbles largest in quantity was 128.8 nanometers (nm), the quantity of ultrafine bubbles largest in quantity was 160,000/milliliter, and the total quantity of ultrafine bubbles was 3,800,000/milliliter.

In Comparative Example 1, as shown in "Table 2", the diameter of ultrafine bubbles largest in quantity was 150.8 nanometers (nm), the quantity of ultrafine bubbles largest in quantity was 440,000/milliliter, and the total quantity of ultrafine bubbles was 6,500,000/milliliter.

In Example 1, Example 2, and Example 3, the diameter of ultrafine bubbles largest in quantity was 90 to 136.9 nanometers, and the quantity of ultrafine bubbles largest in quantity was 140,000 to 730,000/milliliter. Thus, the sufficient volume of ultrafine bubbles largest in quantity can be mixed into water (liquid).

In Example 1, Example 2, and Example 3, the total quantity of ultrafine bubbles was 730,000 to 2,700,000/milliliter. Thus, the sufficient volume of ultrafine bubbles can be mixed into water (liquid).

In particular, in Example 1, as compared to Example 2, Example 3, and Comparative Example 1, the sufficient volume of ultrafine bubbles largest in quantity can be mixed into water (liquid).

In Example 1, as compared to Example 2, Example 3, and Comparative Example 1, the sufficient quantity of ultrafine bubbles in total can be mixed into water (liquid).

<2> "Mist Test"

The mist test was carried out in Example 4 and Comparative Example 2.

(1) Mist Throttle Hole

The "mist throttle hole" was common (the same) in Example 4 and Comparative Example 2.

The "mist throttle hole 121 (conical hole)" in Example 4 and Comparative Example 2 is described with reference to FIG. 43 and FIG. 44.

The "mist throttle hole 121" in Example 4 has the following configuration.

Number of the mist throttle holes 121: 12

Radius of the circle CK: 18.4 mm

Hole diameter dM of each of the mist throttle holes 121: 0.96 mm (opened in the disk front surface 96A)

Hole diameter dF of each of the mist throttle holes 121: 4.0 mm (opened in the disk back flat surface 96B)

Hole length of each of the mist throttle holes 121: 5.8 mm

The mist throttle holes 121 were arranged on the circle CK, and were arranged at equal angular intervals (equal pitches) of 30 degrees in the peripheral direction of the circle CK (or the shower nozzle 3).

(2) Mist Guide (Conical Spiral) and Guide Ring

The "mist guide 124" in Example 4 is described with reference to FIG. 52 to FIG. 55.

The "mist guide 124" in Example 4 has the following configuration.

Number of the mist guides: 12

Number of the spiral surfaces: 2 (first and second spiral surfaces)

Guide height GL: 3.5 mm

Maximum bottom width GH: 8.95 mm

Ring diameter D8 of the circle CL of the guide ring 123: 18.4 mm

Each of the mist guides 124 was formed integrally with the guide ring 123 so that the cone center line L thereof was located on the circle CL. The mist guides 124 were arranged on the guide ring 123 at equal angular intervals of 30 degrees in the peripheral direction of the circle CL.

Each of the mist guides 124 was inserted into each of the mist throttle holes 121 from the cone upper surface 124A, and was fitted in each of the mist throttle holes 121 with the gap between the cone side surface 124C and the conical inner peripheral surface 121A of each of the mist throttle holes 121.

Thus, each of the mist guides 124 was fitted to the shower nozzle 3 (or the shower nozzle plate 96), thereby defining the first and second mist flow passages 51 and 52 between the first and second spiral surfaces 127 and 128 and the conical inner peripheral surface 121A of each of the mist throttle holes 121.

In Comparative Example 2, there is employed mist generating means "without a mist guide", in which the mist guides are not inserted into the mist throttle holes, respectively.

(3) Liquid, Static Liquid Pressure (Hydrostatic Pressure) of Liquid, and Liquid Feeding Rate (Water Feeding Rate)

In Example 4 and Comparative Example 2, the following is employed.

Liquid: tap water (water)

Static liquid pressure (hydrostatic pressure) of the liquid (water): 0.2 MPa (megapascals)

Liquid feeding rate (water feeding rate) of the liquid (water): 7.4 liters/minute (7.4 liters per minute)

In Example 4 and Comparative Example 2, under a condition in which the "hydrostatic pressure" was 0.2 MPa and the "water feeding rate" was 7.4 liters/minute, the tap water was caused to flow into the inflow passage and jetted through the mist throttle holes.

(4) Measurement of Quantity of Air Bubbles

In the "mist test", a quantity of air bubbles mixed into a mist of water droplets (liquid droplets) jetted through the mist throttle holes was measured.

In Example 4 and Comparative Example 2, a total quantity of the micrometer-sized air bubbles (microbubbles) and a total quantity of the nanometer-sized air bubbles (ultrafine bubbles) were measured in a case in which the mist of water droplets was jetted at a rate of 4 liters/minute.

In Example 4 and Comparative Example 2, the quantity of air bubbles (bubble quantity) contained per a milliliter (ml) of the mist of water droplets was measured.

In Example 4 and Comparative Example 2, a total quantity of ultrafine bubbles and an ultrafine bubble diameter of ultrafine bubbles largest in quantity were measured.

Measurement results of the microbubbles in Example 4 and Comparative Example 2 are shown in "Table 3".

TABLE 3

Measurement results of microbubbles in "mist test"

| | Diameter of the microbubbles largest in quantity | Quantity of the microbubbles largest in quantity | Total quantity of microbubbles |
|---|---|---|---|
| Example 4 | 11.52 | 21,079 | 27,022 |
| Camparative Example 2 | 3.24 | 1,680 | 2,637 |

Diameter of the microbubbles: micrometer
Quantity of the microbubbles largest in quantity: number of the microbubbles/milliliter
Total quantity of microbubbles: total number of microbubbles/milliliter In Example 4, as shown in "Table 3", the diameter of microbubbles largest in quantity was 11.52 micrometers (μm), the quantity of the microbubbles largest in quantity was 21,079/milliliter, and the total quantity of microbubbles was 27,022/milliliter.

In Comparative Example 2, as shown in "Table 3", the diameter of the microbubbles largest in quantity was 3.24 micrometers (μm), the quantity of the microbubbles largest in quantity was 1,680/milliliter, and the total quantity of microbubbles was 2,637/milliliter.

In Example 4, as compared to Comparative Example 2, a sufficient volume of the microbubbles largest in quantity can be mixed into the mist of water droplets (the liquid droplets).

In Example 4, as compared to Comparative Example 2, the sufficient quantity of microbubbles in total can be mixed into the mist of water droplets (the liquid droplets).

Thus, in the "mist test", when the mist guides each having a conical spiral shape (a truncated conical spiral shape) are fitted in the mist throttle holes, respectively, the sufficient volume of microbubbles can be mixed into the mist of water droplets (liquid droplets).

Measurement results of the ultrafine bubbles in Example 4 and Comparative Example 2 are shown in "Table 4".

TABLE 4

Measurement results of ultrafine bubbles in "mist test"

| | Diameter of the ultrafine bubbles largest in quantity | Quantity of the ultrafine bubbles largest in quantity | Total quantity of ultrafine bubbles |
|---|---|---|---|
| Example 4 | 124.1 | 710,000 | 14,000,000 |
| Comparative Example 2 | 128.1 | 360,000 | 6,600,000 |

Diameter of the ultrafine bubbles: nanometer
Quantity of the ultrafine bubbles largest in quantity: number of the ultrafine bubbles/milliliter
Total quantity of ultrafine bubbles: total number of ultrafine bubbles/milliliter In Example 4, as shown in "Table 4", the diameter of ultrafine bubbles largest in quantity was 124.1 nanometers (nm), the quantity of ultrafine bubbles largest in quantity was 710,000/milliliter, and the total quantity of ultrafine bubbles was 14,000,000/milliliter.

In Comparative Example 2, as shown in "Table 4", the diameter of ultrafine bubbles largest in quantity was 128.1 nanometers (nm), the quantity of ultrafine bubbles largest in quantity was 360,000/milliliter, and the total quantity of ultrafine bubbles was 6,600,000/milliliter.

In Example 4, as compared to Comparative Example 2, a sufficient volume of ultrafine bubbles largest in quantity can be mixed into the mist of water droplets (liquid droplets).

In Example 4, as compared to Comparative Example 2, the sufficient quantity of ultrafine bubbles in total can be mixed into the mist of water droplets (liquid droplets).

INDUSTRIAL APPLICABILITY

The present invention is most suitable for jetting the air bubble-liquid mixture or the mist of liquid droplets.

REFERENCE SIGNS LIST

X shower head
1 shower main body
2 flow passage switching means
3 shower nozzle
4 air bubble-liquid mixture generating means
5 mist generating means
9 inflow passage
10 outflow passage
96 shower nozzle plate
97 shower cylindrical portion
98 air bubble-liquid mixture jetting hole
111 flow-adjustment piece
112 air introduction passage
114 flow-adjustment nozzle disk
116 flow-adjustment-piece plate
117 liquid throttle hole
BR air bubble mixing space
GP mixing gap

The invention claimed is:

1. An air bubble-liquid mixture generating unit arranged on a shower nozzle, the shower nozzle including:

a shower nozzle plate;

a shower cylindrical portion, which has one cylinder end closed by the shower nozzle plate, is formed to protrude to an outflow passage side, and defines an air bubble mixing space into which a liquid having flowed out through the outflow passage side is caused to flow from another cylinder end of the shower cylindrical portion; and a plurality of air bubble jetting holes formed in the shower nozzle plate so as to be opened into the air bubble mixing space, and configured to cause an air bubble-liquid mixture to jet out of the air bubble mixing space;

the air bubble-liquid mixture generating unit configured to generate the air bubble-liquid mixture by mixing the air into the liquid;

the air bubble-liquid mixture generating unit further comprising:

a flow-adjustment piece arranged in the air bubble liquid mixture air bubble mixing space in the shower cylindrical portion;

a plurality of air introduction passages formed in the shower nozzle, and configured to cause the air to flow into the air bubble mixing space therethrough;

wherein the flow-adjustment piece including a flow-adjustment nozzle disk arranged in the air bubble mixing space at a distance from the shower nozzle plate, and fixed to the shower cylindrical portion so as to close the another cylinder end of the shower cylindrical portion;

a plurality of flow-adjustment-piece plates formed on the flow-adjustment nozzle disk arranged at equal intervals in the circumferential direction of the flow-adjustment nozzle disk and arranged in the air bubble mixing space between the shower nozzle plate and the flow-adjustment nozzle disk; and a plurality of liquid throttle holes formed in a portion of the flow-adjustment nozzle disk between the flow-adjustment-piece plates, and configured to cause the liquid having flowed out through the outflow passage to jet into the air bubble mixing space therethrough;

wherein the flow-adjustment-piece plates have a pair of flow-adjustment flat surfaces and a flow inclined surface, have a plate thickness in the circumferential direction of the flow-adjustment nozzle disk, are formed to protrude from the flow-adjustment nozzle disk to the shower nozzle plate having a plate width, and are arranged with a mixing gap between the shower nozzle plate and a protruding end of the flow-adjustment-piece plates, wherein the flow-adjustment-piece plates are arranged to extend from a plate center line of the flow-adjustment nozzle disk toward the outer circumferential side of the flow-adjustment nozzle disk with a plate length;

wherein each of the flow-adjustment flat surfaces is formed in a rectangular shape parallel to the flow-adjustment nozzle disk in the circumferential direction with a plate thickness separated from each other;

wherein the flow inclined surface is formed in an inclined manner while extending from the protruding end of each of the flow-adjustment piece plates toward one of the flow-adjustment flat surfaces and the flow-adjustment nozzle disk;

wherein each of the liquid throttle holes is arranged at intervals in the circumferential direction of the flow-adjustment nozzle disk such that the hole center line of each of the liquid throttle holes is parallel to the plate center line of the flow-adjustment nozzle disk;

wherein each of the liquid throttle holes (1) penetrates the flow-adjustment nozzle disk in the direction of the center line of the plate of the flow-adjustment nozzles disk and (2) is opened on the front surface and the back surface of the plate of the flow-adjustment nozzle disk;

wherein each of the liquid holes is formed in a conical hole gradually reducing in diameter from the rear surface of the flow-adjustment nozzle disk towards the front surface of the disk in the direction of the center line of the flow-adjustment nozzle disk, and is opened in the air bubble mixing space between the shower nozzle plate and the flow-adjustment nozzle disk;

wherein the air introduction passages are opened in the shower nozzle and each of the air introduction passages is equally spaced in the circumferential direction of the shower cylindrical portion; and wherein the air introduction passages are formed to pass through the shower cylindrical portion between the protruding end of each of the flow-adjustment-piece plates and the flow-adjustment nozzle disk in a direction orthogonal to a cylinder center of the shower cylindrical portion, and are opened into the air bubble mixing space.

* * * * *